(12) United States Patent
Kim et al.

(10) Patent No.: US 10,007,134 B2
(45) Date of Patent: Jun. 26, 2018

(54) DISPLAY DEVICE

(71) Applicant: LG ELECTRONICS INC., Seoul (KR)

(72) Inventors: Jaeho Kim, Seoul (KR); Bumgi Min, Seoul (KR); Youngsung Kim, Seoul (KR); Jinha Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/456,190

(22) Filed: Aug. 11, 2014

(65) Prior Publication Data
US 2014/0347597 A1 Nov. 27, 2014

Related U.S. Application Data

(63) Continuation of application No. 14/103,105, filed on Dec. 11, 2013, now abandoned.

(30) Foreign Application Priority Data

Dec. 20, 2012 (KR) .......... 10-2012-0149604
Dec. 20, 2012 (KR) .......... 10-2012-0149605
Dec. 20, 2012 (KR) .......... 10-2012-0149607

(51) Int. Cl.
*G02F 1/1333* (2006.01)
*G02F 1/1335* (2006.01)
(Continued)

(52) U.S. Cl.
CPC ........ *G02F 1/133308* (2013.01); *F21V 15/01* (2013.01); *F21V 15/04* (2013.01);
(Continued)

(58) Field of Classification Search
CPC ......... G02F 1/133308; G02F 1/133536; G02F 2001/133314
See application file for complete search history.

(56) References Cited

U.S. PATENT DOCUMENTS

| | | | | |
|---|---|---|---|---|
| 6,538,709 | B1 | 3/2003 | Kurihara et al. | .............. 349/58 |
| 2005/0024553 | A1* | 2/2005 | Fukuta et al. | .................. 349/58 |

(Continued)

FOREIGN PATENT DOCUMENTS

| | | |
|---|---|---|
| CN | 102043268 A | 5/2011 |
| CN | 102289089 A | 12/2011 |

(Continued)

OTHER PUBLICATIONS

European Search Report issued in Application No. 13005674.0 dated Mar. 26, 2014.
(Continued)

*Primary Examiner* — Elmito Breval
(74) *Attorney, Agent, or Firm* — Ked & Associates, LLP

(57) ABSTRACT

A display device is provided. The display device may include a display panel including a front substrate and a back substrate, a frame positioned behind the display panel, an optical layer positioned between the display panel and the frame, and a supporting film attached to the display panel and connected to the frame. The display device may also include a fastening device for fastening the supporting film to the frame. The display panel may include a front polarizing film attached to a front surface of the front substrate, and a back polarizing film attached to a back surface of the back substrate. The supporting film may be attached to the back polarizing film.

19 Claims, 72 Drawing Sheets

(51) Int. Cl.
  *F21V 15/01* (2006.01)
  *F21V 15/04* (2006.01)
  *H05K 5/02* (2006.01)
  *F16B 5/02* (2006.01)
  *F21V 17/16* (2006.01)
  *H04M 1/02* (2006.01)
  *F16B 5/12* (2006.01)

(52) U.S. Cl.
  CPC ...... *G02F 1/1335* (2013.01); *G02F 1/133536* (2013.01); *G02F 1/133608* (2013.01); *H05K 5/02* (2013.01); *F16B 5/02* (2013.01); *F16B 5/121* (2013.01); *F16B 5/126* (2013.01); *F21V 17/162* (2013.01); *G02F 1/133512* (2013.01); *G02F 2001/13332* (2013.01); *G02F 2001/133311* (2013.01); *G02F 2001/133314* (2013.01); *G02F 2001/133317* (2013.01); *G02F 2001/133567* (2013.01); *G02F 2201/46* (2013.01); *G02F 2201/503* (2013.01); *G02F 2202/28* (2013.01); *H04M 1/0266* (2013.01)

(56) References Cited

U.S. PATENT DOCUMENTS

| | | | |
|---|---|---|---|
| 2009/0310057 A1 | 12/2009 | Kang et al. | 349/58 |
| 2010/0033648 A1 | 2/2010 | Kaganezawa | |
| 2010/0045888 A1 | 2/2010 | Naritomi | |
| 2010/0060816 A1* | 3/2010 | Fukai et al. | 349/58 |
| 2010/0149833 A1 | 6/2010 | Kuromizu | |
| 2011/0032178 A1 | 2/2011 | Lee | |
| 2012/0050639 A1* | 3/2012 | Kim | G02F 1/133308 349/58 |
| 2012/0051087 A1 | 3/2012 | Hsu et al. | |
| 2012/0106048 A1* | 5/2012 | Byeon et al. | 361/679.01 |
| 2012/0113369 A1 | 5/2012 | Kim et al. | |
| 2012/0250294 A1* | 10/2012 | Zhang | 362/97.2 |
| 2013/0021782 A1 | 1/2013 | Yan et al. | 362/97.4 |

FOREIGN PATENT DOCUMENTS

| | | |
|---|---|---|
| CN | 202253129 A | 5/2012 |
| JP | 2005243572 A | 9/2005 |
| TW | 200813566 A | 3/2008 |
| WO | WO 2007/139016 A1 | 12/2007 |
| WO | WO 2010/004822 A1 | 1/2010 |

OTHER PUBLICATIONS

United States Office Action dated Oct. 21, 2014 issued in U.S. Appl. No. 14/103,105.
United States Office Action dated Mar. 20, 2015 issued in U.S. Appl. No. 14/103,105.
U.S. Office Action issued in U.S. Appl. No. 14/103,105 dated Jul. 2, 2015.
"TFT LCD Panel Design and Packaging Techniques"; Mar. 31, 2010; Minbo Tian and Feng Ye; Science Press; pp. 239-242.
Chinese Office Action dated Dec. 4, 2015 issued in Application No. 201310712972.9 (English Translation and Chinese Full Text).
European Search Report dated Jul. 29, 2016 issued in Application No. 16165575.8.

* cited by examiner

DISPLAY DEVICE

CROSS-REFERENCE TO RELATED APPLICATION(S)

This application is a Continuation application of prior U.S. patent application Ser. No. 14/103,105 filed on Dec. 11, 2013, which claims priority under 35 U.S.C. § 119 to Korean Application Nos. 10-2012-0149604, 10-2012-0149605 and 10-2012-0149607, each filed in Korea on Dec. 20, 2012, whose entire disclosures are hereby incorporated by reference.

BACKGROUND

1. Field

Embodiments relate to a display device.

2. Background

Various display devices, such as, for example, liquid crystal displays (LCDs), plasma display panels (PDPs), electroluminescent displays (ELDs), vacuum fluorescent displays (VFDs), and the like may be considered in meeting various demands for display devices. A liquid crystal display panel of the LCD may include a liquid crystal layer, and a thin film transistor (TFT) substrate and a color filter substrate which are positioned opposite each other with the liquid crystal layer interposed therebetween. The LCD may display an image using light provided by a backlight device.

SUMMARY OF THE INVENTION

In one aspect, there is a display device, comprising a display panel including a front substrate and a back substrate, a frame positioned at a rear of the display panel, an optical layer positioned between the display panel and the frame and a supporting film attached to the display panel and connected to the frame.

The display device further comprises at least one fastener configured to fasten the supporting film to the frame.

The display panel further comprises a front polarizing film attached to a front surface of the front substrate and a back polarizing film attached to a back surface of the back substrate, wherein the supporting film is attached to the back polarizing film.

The supporting film comprises a first portion attached to the display panel a second portion positioned on a back surface of the frame and a third portion positioned along a corresponding side of the optical layer.

The third portion of the supporting film includes at least one opening formed therein.

The frame comprises a first long side a second long side opposite the first long side, a first short side extending between the first and second long sides at a first end of the frame, and a second short side opposite the first short side and extending between the first and second long sides at a second end of the frame opposite the first end thereof, wherein the second portion of the supporting film comprises a first back portion positioned along the first short side, a second back portion positioned along the second short side and a third back portion positioned along the first long side.

The display device further comprises an overlap area, wherein the overlap area is formed between the first back portion and the third back portion of the supporting film at a corner formed between the first long side and the first short side of the frame, or the overlap area is formed between the second back portion and the third back portion of the supporting film at a corner formed between the first long side and the second short side of the frame and a hole extending through the overlap area.

The frame includes a protrusion configured to be received in the hole formed in the overlap area, wherein the protrusion formed in the frame includes a fastening hole configured to receive a fastener therein, and wherein the fastener fastens the first back portion, the third back portion, and the protrusion to one another, or fastens the first back portion, the second back portion, and the protrusion to one another, based on where the overlap portion is formed.

The first back portion and the third back portion of the supporting film are separated from each other at a corner formed between the first long side and the first short side of the frame, or the second back portion and the third back portion of the supporting film are separated from each other at a corner formed between the first long side and the second short side of the frame.

The display device further comprises a back cover positioned at a rear of the frame and a side cover which covers the third portion of the supporting film and is connected to the back cover.

The side cover comprises a vertical section extending in a vertical direction and a horizontal section extending horizontally from the vertical section.

The display device further comprises a plate connected to the frame and pressing the second portion of the supporting film.

The supporting film further comprises a first connection portion provided on a first surface of the plate and a second connection portion provided on a second surface of the plate opposite the first surface thereof.

The display device further comprises a fastener configured to fasten the plate to the second portion of the supporting film.

The display device further comprises a fastener configured to fasten the frame, the second portion of the supporting film, and the plate to one another.

The second portion of the supporting film is at least partially positioned between the plate and the frame.

The display device further comprises a fastener configured to fasten the frame and the second portion of the supporting film to each other and another fastener configured to fasten the plate and the frame to each other.

The display device further comprises a buffer provided between the plate and the second portion of the supporting film, wherein the buffer is formed of a material having elasticity.

In other aspect, there is a display device, comprising a back cover, a display panel coupled in the back cover and a backlight device provided between the display panel and the back cover, wherein the display panel comprises a first substrate, a second substrate, a seal provided between the first and second substrates to couple the first and second substrates and seal a space formed therebetween; and a supporting film provided on a surface of the second substrate oriented away from the first substrate, the supporting film comprising a first portion directly contacting the surface of the second substrate, the first portion comprising a transparent portion corresponding to an active area of the display panel and a border portion surrounding the transparent portion and corresponding to an inactive area of the display panel and a second portion extending away from the first portion and not directly contacting the second substrate.

The second portion of the supporting film extends away from the border portion of the first portion of the supporting film, and wherein the second portion of the supporting film comprises a first support portion extending from a first peripheral edge of the first portion of the supporting film and a second support portion extending from a second peripheral edge of the first portion of the supporting film, opposite the first peripheral edge thereof, wherein the first and second support portions are curved or bent so as to extend back over the first portion of the supporting film, and form a space between the first support portion and the first portion of the supporting film, and between the second support portion and the first portion of the supporting film.

The backlight device comprises an optical layer provided on the first portion of the supporting film and a light source module coupled to the optical layer to generate light toward the optical layer, the light source module comprising a frame coupled to the optical layer and one or more light sources mounted on the frame so as to generate light toward the optical layer.

The second portion of the supporting film extends along a peripheral edge portion of the optical layer and is coupled to the frame.

The optical layer comprises a reflective polarizer provided on the first portion of the supporting film, a horizontal prism sheet provided on the reflective polarizer, a vertical prism sheet provided on the horizontal prism sheet and a diffusion plate provided on the vertical prism sheet.

BRIEF DESCRIPTION OF THE DRAWINGS

The embodiments will be described in detail with reference to the following drawings in which like reference numerals refer to like elements wherein.

DETAILED DESCRIPTION

Figure 1:
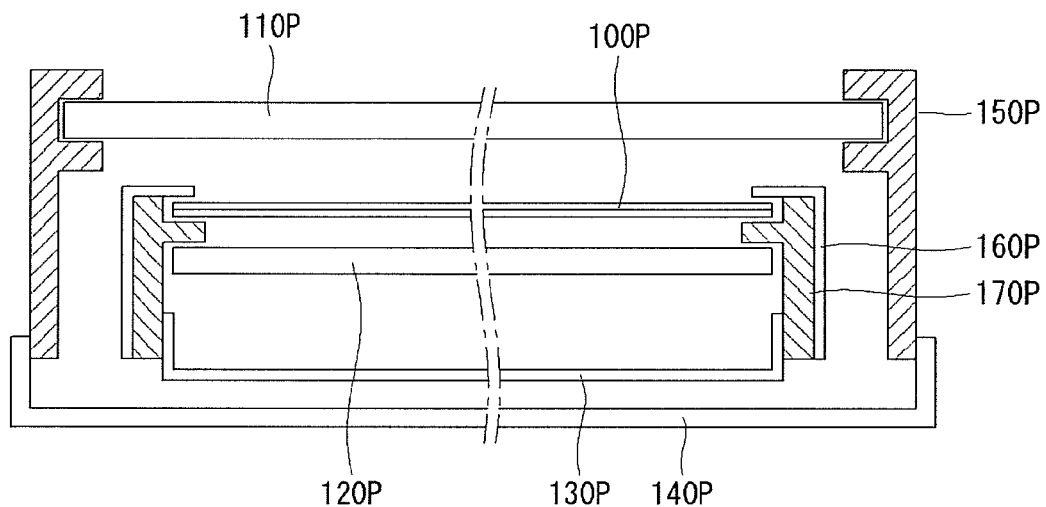
FIG. 1 is a side sectional view of an exemplary display device.

Reference will now be made in detail to various embodiments, examples of which are illustrated in the accompanying drawings. Since the embodiments may be modified in various ways and may have various forms, specific embodiments are illustrated in the drawings and are described in detail. However, it should be understood that embodiments are not limited to the specific exemplary embodiments presented herein, but include all modifications, equivalents and substitutes included within the spirit and technical scope as broadly described herein.

The terms 'first', 'second', etc. may be used to describe various components, but the components are not limited by such terms. The terms are used only for the purpose of distinguishing one component from other components. For example, a first component may be designated as a second component without departing from the scope as broadly described herein. In the same manner, the second component may be designated as the first component.

The term "and/or" encompasses both combinations of the plurality of related items disclosed and any item from among the plurality of related items disclosed.

When an arbitrary component is described as "being connected to "or" being linked to" another component, this should be understood to mean that other component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used herein may be used to describe only specific embodiments or examples, and are not intended to limit the scope as broadly described herein. A singular expression may include a plural expression as long as it does not have an apparently different meaning in context.

Further, the terms "include" and "have" may be understood to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art. The terms defined in a generally used dictionary may be understood to have the same meanings as those used in the context of the art, and are not to be construed to have ideal or excessively formal meanings unless they are obviously specified.

The following exemplary embodiments are provided to those skilled in the art for understanding and completeness. Accordingly, shapes and sizes of elements shown in the drawings may be exaggerated for clarity.

Hereinafter, a liquid crystal display panel is used as an example of a display panel. However, the principles presented herein may be applied to other types of display panels. For example, the principles may be applied to a plasma display panel (PDP), a field emission display (FED) panel, or an organic light emitting display (OLED) panel.

As shown in FIG. 1, a display device may include a display panel 100P including a front substrate and a back substrate, an optical layer 120P disposed behind the display panel 100P, a frame 130P disposed behind the optical layer 120P, first and second fastening parts 160P and 170P for fastening the display panel 100P, the optical layer 120P, and the frame 130P, a protective substrate 110P disposed in the front of the display panel 100P, and a third fastening part 150P for fastening the protective substrate 110P to a back cover 140P disposed behind the frame 130P. This exemplary display device has a relatively complicated structure, making it difficult to achieve a thin profile. Further, visibility may be somewhat reduced due to this structure.

FIGS. 2 to 5 illustrate various aspects of a display device according to an exemplary embodiment as broadly described herein.

Figure 2:
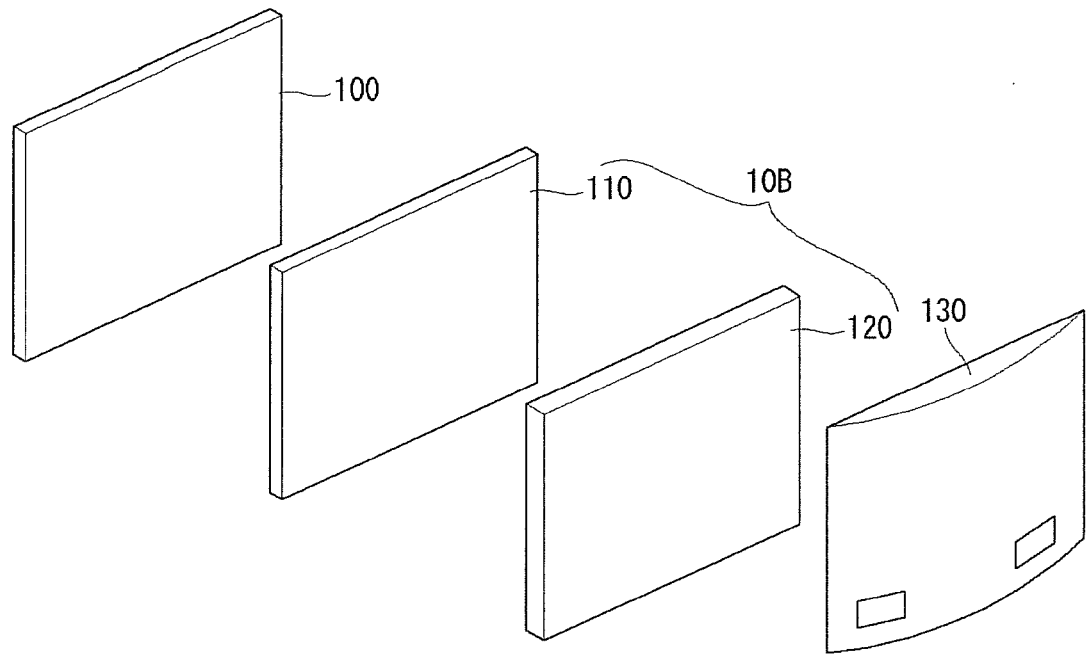
FIGS. 2 to 5 illustrate a configuration of a display device according to an exemplary embodiment as broadly described herein.

As shown in FIG. 2, a display device according to an exemplary embodiment may include a display panel 100, a backlight device 10B including an optical layer 110 and a light source module 120, and a back cover 130. The display device may also include a supporting film 400 (see FIG. 6).

The display panel 100 may include a front substrate and a back substrate which are positioned opposite each other. The optical layer 110 may be disposed between the back substrate of the display panel 100 and the back cover 130. The optical layer 110 may include a plurality of sheets. For example, the optical layer 110 may include at least one of a prism sheet or a diffusion sheet. The backlight device 10B may be positioned to a rear of the optical layer 110, and may include a light guide plate. The light source module 120 may include various kinds of light sources. For example, the light source module 120 may include one of a light emitting diode (LED) chip or a LED package having at least one LED chip. In this instance, the light source may be a colored LED emitting at least one of red, green, or blue light or a white LED.

The backlight device 10B may be one of a direct type backlight device or an edge type backlight device. The back cover 130 may be positioned to a rear of the backlight device 10B to protect the backlight device 10B from an external impact or pressure.

Figure 3:
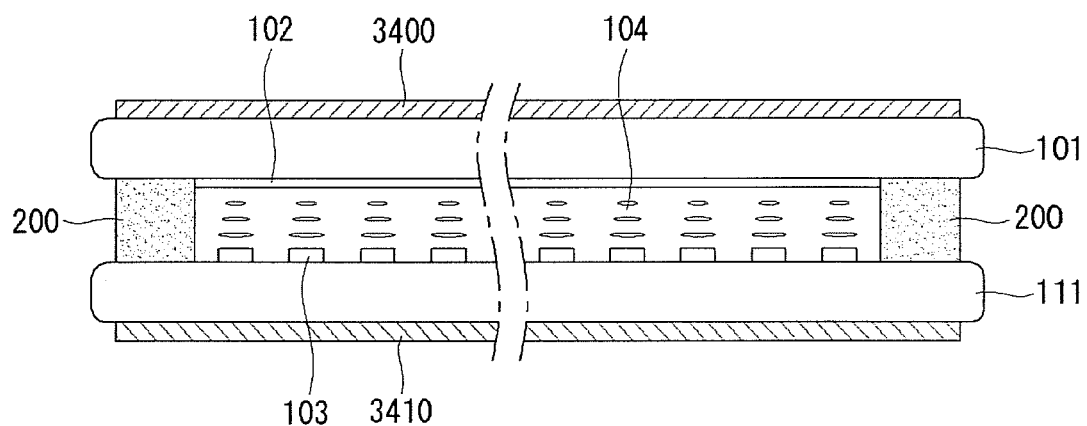

As shown in FIG. 3, the display panel 100 may include a front substrate 101 and a back substrate 111, which are positioned opposite each other and attached to each other to form a uniform cell gap therebetween. A liquid crystal layer 104 may be formed between the front substrate 101 and the back substrate 111. A seal 200 may be formed between the front substrate 101 and the back substrate 111 to seal the liquid crystal layer 104. The seal 200 may be referred to as a sealing portion.

A color filter 102 may be positioned on the front substrate 101 to implement, for example, red, green, and blue colors. The color filter 102 may include a plurality of pixels each including red, green, and blue subpixels. When light is incident on the color filter 102, the color filter 102 may generate an image corresponding to the red, green, or blue color. The pixels may include the red, green, and blue subpixels, but are not limited thereto. For example, white subpixels may be used, and various combination(s) of the subpixels may be used.

A predetermined transistor 103, for example, a thin film transistor (TFT) may be formed on the back substrate 111. The transistor 103 may turn liquid crystals in each pixel on or off. In this instance, the front substrate 101 may be referred to as a color filter substrate, and the back substrate 111 may be referred to as a TFT substrate.

The display panel 100 may further include a front polarizing film 3400 and a back polarizing film 3410. The front polarizing film 3400 may be positioned on a front surface of the front substrate 101 to polarize light passing through the display panel 100. The back polarizing film 3410 may be positioned on a back surface of the back substrate 111 to polarize light passing through the optical layer 110 positioned to the rear of the back substrate 111. In the embodiment disclosed herein, the front polarizing film 3400 may be referred to as a first polarizing film, and the back polarizing film 3410 may be referred to as a second polarizing film.

The liquid crystal layer 104 may include a plurality of liquid crystal molecules, and the arrangement of the liquid crystal molecules may change in response to a driving signal supplied by the transistor 103. Hence, light provided by the backlight device 10B may be incident on the color filter 102 based on changes in the molecular arrangement of the liquid crystal layer 104. As a result, the color filter 102 may implement red, green, and blue light, and thus a predetermined image may be displayed on the front substrate 101 of the display panel 100.

Figure 4:
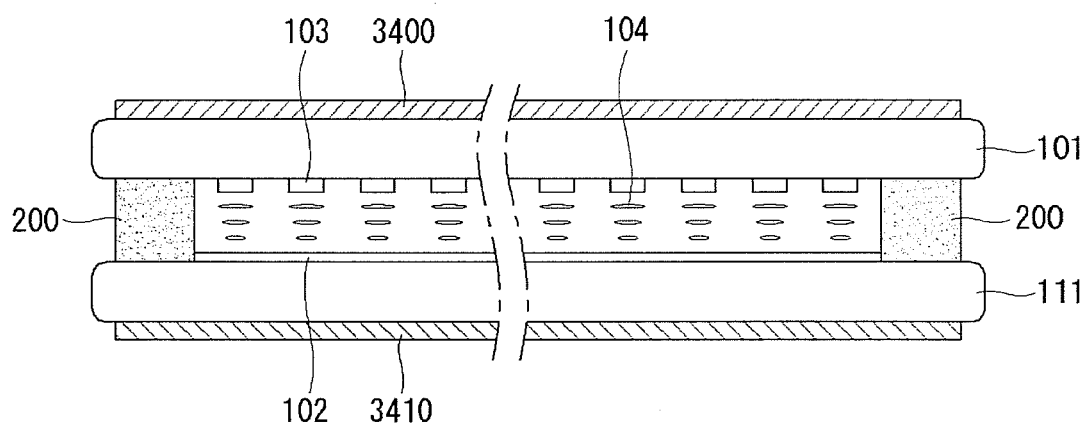

Alternatively, as shown in FIG. 4, a color filter 102 for implementing red, green, and blue colors may be positioned on the back substrate 111, and a predetermined transistor 103, for example, a TFT may be formed on the front substrate 101. The transistor 103 may turn liquid crystals in each pixel on or off. In this instance, the back substrate 111 may be referred to as a color filter substrate, and the front substrate 101 may be referred to as a TFT substrate.

Providing the transistor 103 on the front substrate 101 facilitates installation of a connecting device, such as a cable and/or a flexible printed circuit board, for connecting a driving board to the transistor 103 on the front substrate 101. Further, the driving board may be disposed at the rear of the display panel 100. In this instance, a length of the connecting device for connecting the driving board to the transistor 103 may be reduced.

Figure 5:
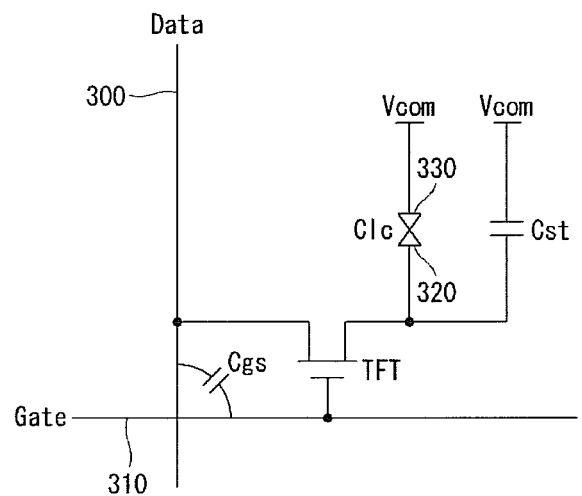

As shown in FIG. 5, each pixel of the display panel 100 may include a data line 300, a gate line 310 crossing the data line 300, and the TFT 103 connected to a crossing of the data line 300 and the gate line 310.

The TFT 103 may supply a data voltage supplied through the data line 300 to a pixel electrode 320 of a liquid crystal cell Clc in response to a gate pulse from the gate line 310. The liquid crystal cell Clc may be driven by an electric field generated by a voltage difference between a voltage of the pixel electrode 320 and a common voltage Vcom applied to a common electrode 330, thereby controlling an amount of light passing through a polarizing plate. A storage capacitor Cst may be connected to the pixel electrode 320 of the liquid crystal cell Clc to hold the voltage of the liquid crystal cell Clc.

Since the above-described structure and the above-described configuration of the display panel 100 are merely exemplary, various elements may be changed, added, or omitted.

FIGS. 6 to 58 illustrate a display device to which a supporting film is applied. In the following description, the descriptions of the configuration and the structure described above are omitted.

Figure 6A:
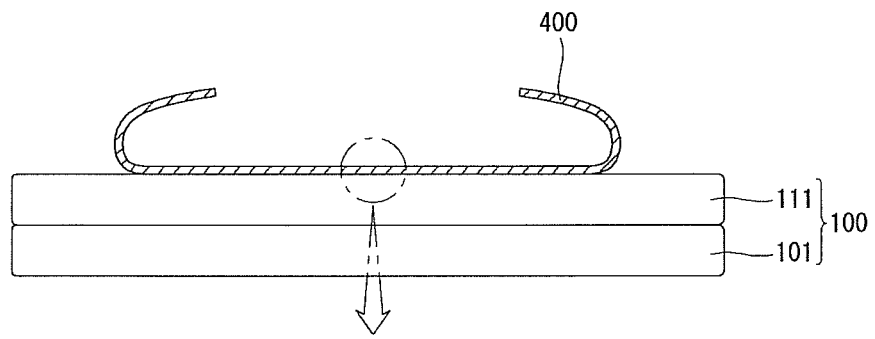
FIGS. 6A to 58B illustrate a configuration of a display device to which a supporting film is applied, in accordance with embodiments as broadly described herein.
Figure 6B:
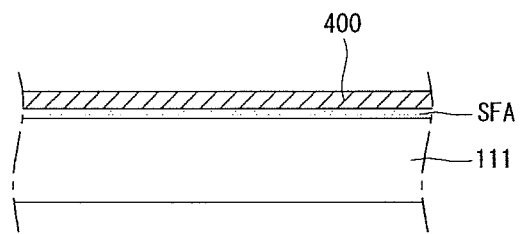

As shown in FIG. 6A, a supporting film 400 may be disposed at the rear of the display panel 100, more specifically, at the rear of the back substrate 111. The supporting film 400 may include a portion attached to the rear of the back substrate 111. More specifically, as shown in FIG. 6B, an adhesive layer SFA may be disposed between the supporting film 400 and the back substrate 111 and may attach the supporting film 400 to the back substrate 111.

In certain embodiments, the supporting film 400 may be connected to a frame.

Figure 7A:
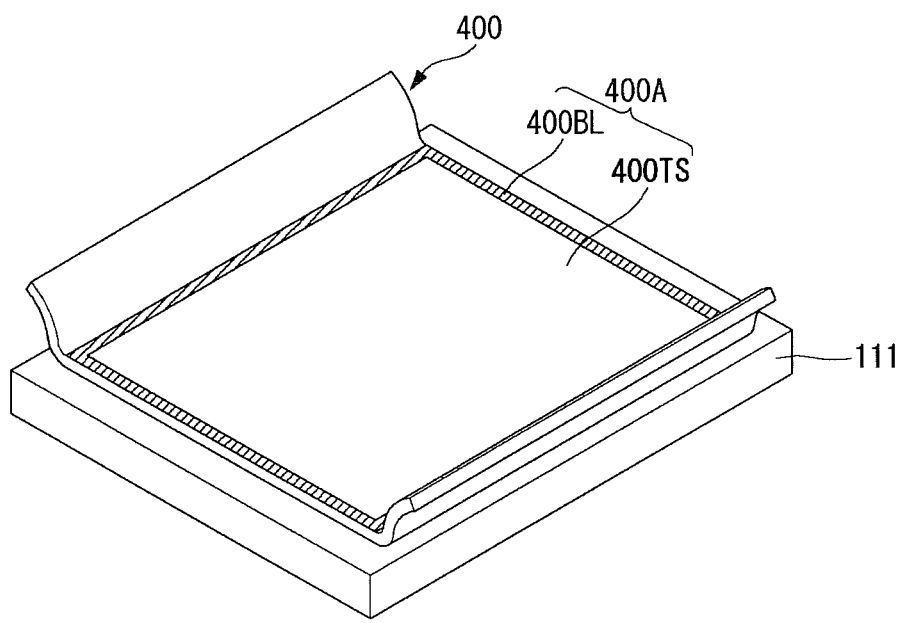

A partial area of the supporting film 400 may be substantially transparent. For example, as shown in FIG. 7A, the supporting film 400 may include a first part 400TS and a second part 400BL which are attached to the back substrate 111 of the display panel 100. The first part 400TS and the second part 400BL attached to the display panel 100 may be together referred to as an attachment part 400A of the supporting film 400.

The second part 400BL may be positioned at an edge of the first part 400TS, and a light transmittance of the first part 400TS may be greater than a light transmittance of the second part 400BL. In certain embodiments, the first part 400TS may be substantially transparent. Further, the second part 400BL may have a shape surrounding the first part 400TS.

Figure 7B:
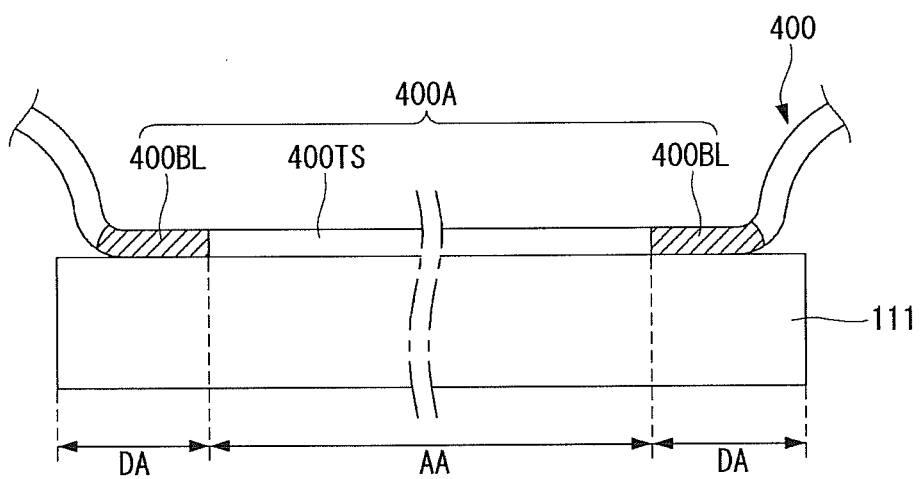

As shown in FIG. 7B, the first part 400TS of the supporting film 400 may correspond to an active area AA of the display panel 100, on which an image is displayed. The second part 400BL of the supporting film 400 may correspond to a dummy area DA positioned outside the active area AA of the display panel 100.

The second part 400BL of the supporting film 400 may be darker than the first part 400TS, so as to reduce reflection of light. For example, the second part 400BL of the supporting film 400 may be almost black, and may include a dye.

Figure 8:
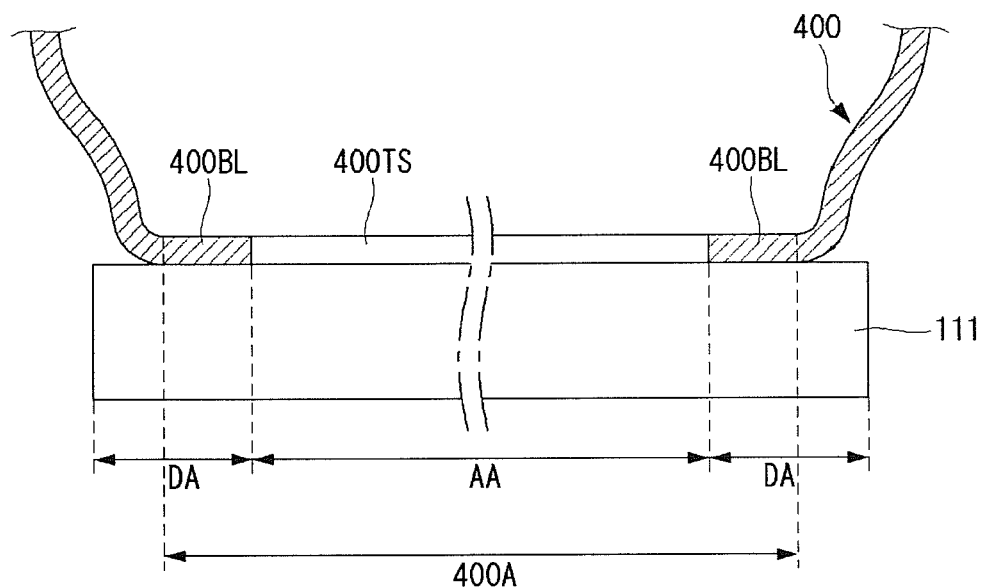

As shown in FIG. 7B, a portion of the supporting film 400 corresponding to the dummy area DA of the display panel 100 may include a dye. Alternatively, as shown in FIG. 8, portions other than a portion of the supporting film 400 corresponding to the active area AA of the display panel 100 may include the dye. In this instance, portions other than the attachment part 400A of the supporting film 400 may include the dye.

Figure 9:
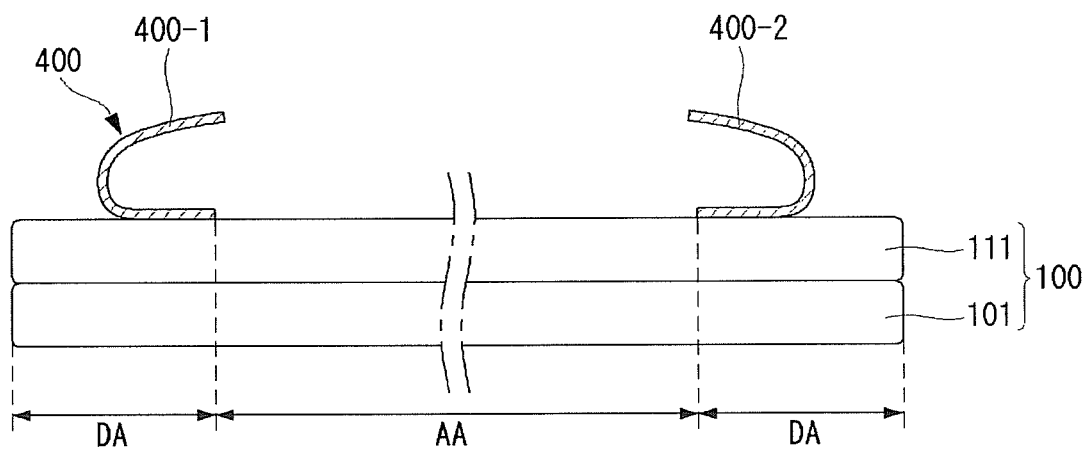
Figure 10:
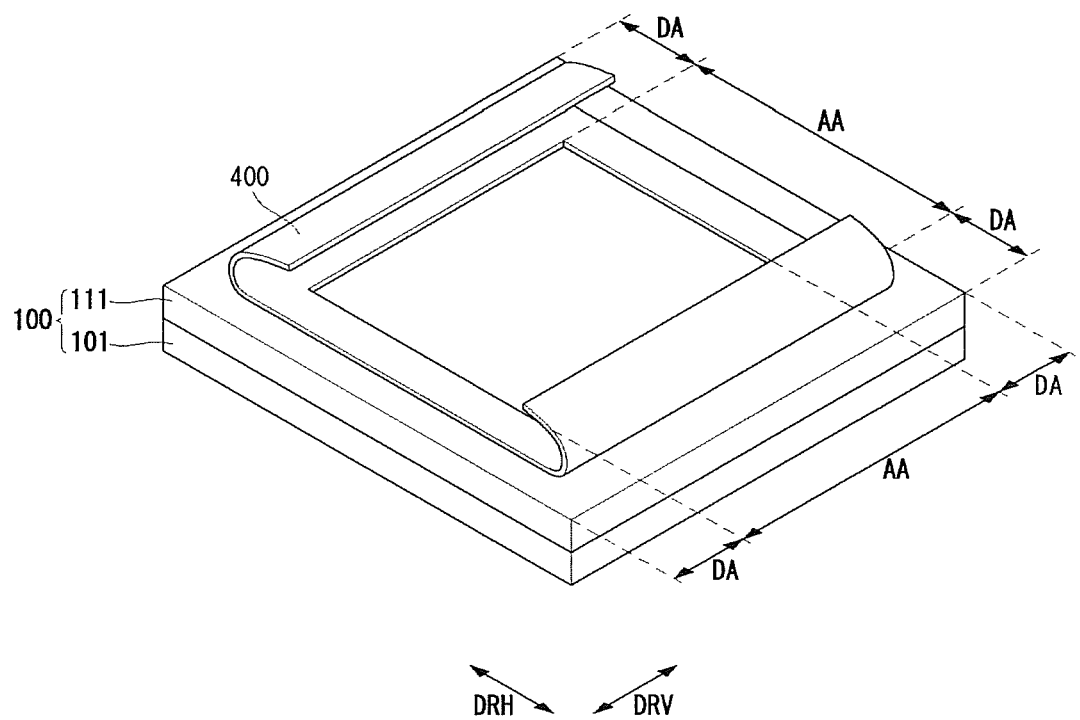

As shown in FIGS. 9 and 10, the supporting film 400 may include a portion attached to the dummy area DA positioned outside the active area AA of the display panel 100. In this instance, the portion of the supporting film 400 corresponding to the active area AA of the display panel 100 may be omitted. As shown in FIG. 9, which is a cross-sectional view of the display panel 100, the supporting film 400 may be divided into a first supporting film 400-1 and a second supporting film 400-2. As shown in FIG. 10, the supporting film 400 may have a shape surrounding the active area AA of the display panel 100.

Figure 11:
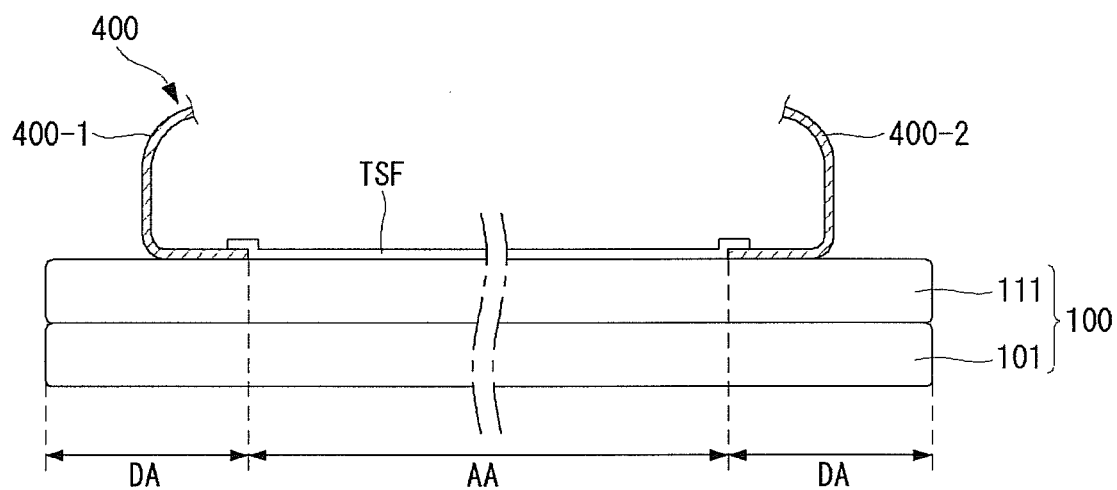

As shown in FIG. 11, the supporting film 400 may further include an active area film TSF attached to the active area AA of the display panel 100.

In certain embodiments, a light transmittance of the active area film TSF may be greater than a light transmittance of the first supporting film 400-1 and a light transmittance of the second supporting film 400-2. A seal strength of the first supporting film 400-1 and a seal strength of the second supporting film 400-2 may be greater than a seal strength of the active area film TSF. The active area film TSF of the supporting film 400 may be substantially transparent.

Figure 12:
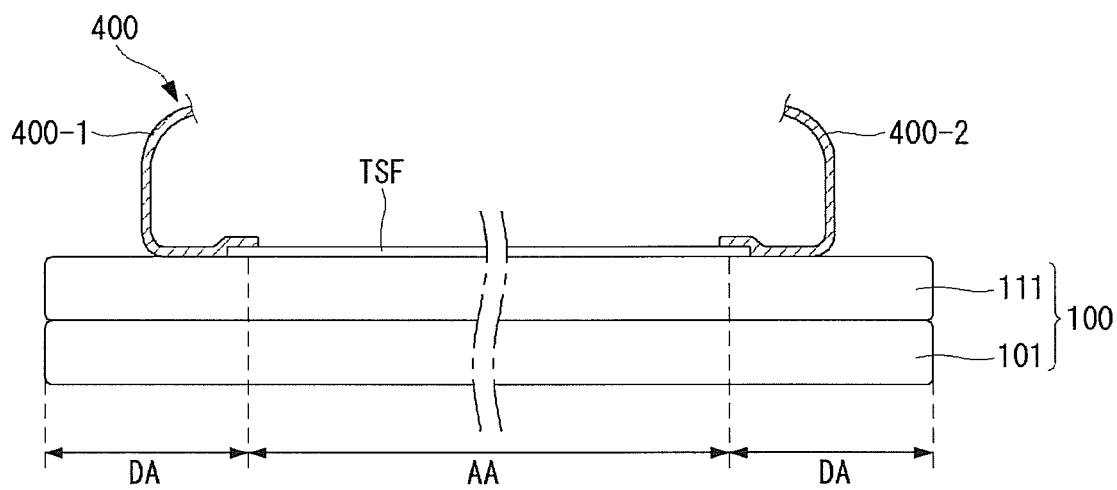

The active area film TSF may cover, or overlap, a portion of each of the first supporting film 400-1 and the second supporting film 400-2, as shown in FIG. 11. Alternatively, as shown in FIG. 12, the first supporting film 400-1 and the second supporting film 400-2 may cover, or overlap, a portion of the active area film TSF.

Figure 13:
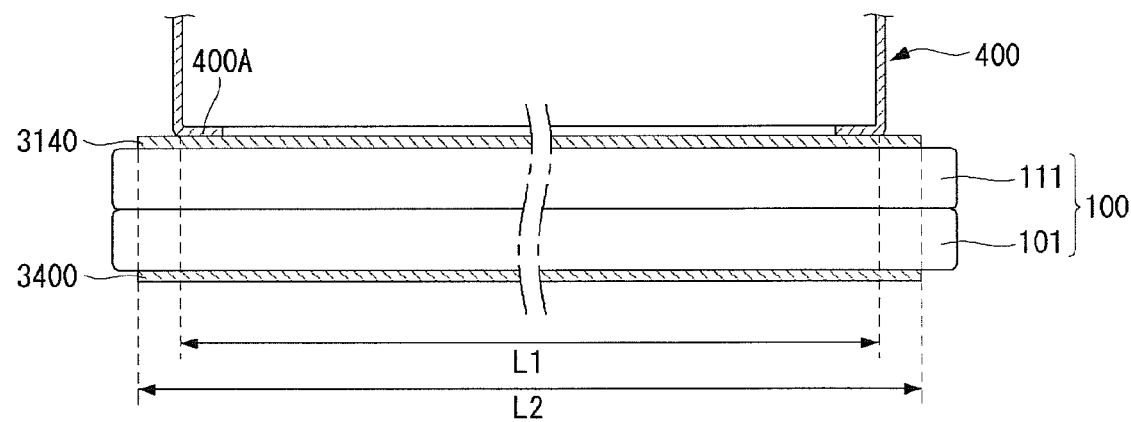

As shown in FIG. 13, the supporting film 400 may be attached to the back polarizing film 3410. In certain embodiments, a width L2 of the back polarizing film 3410 may be greater than a width L1 of the attachment part 400A of the supporting film 400.

Figure 14:
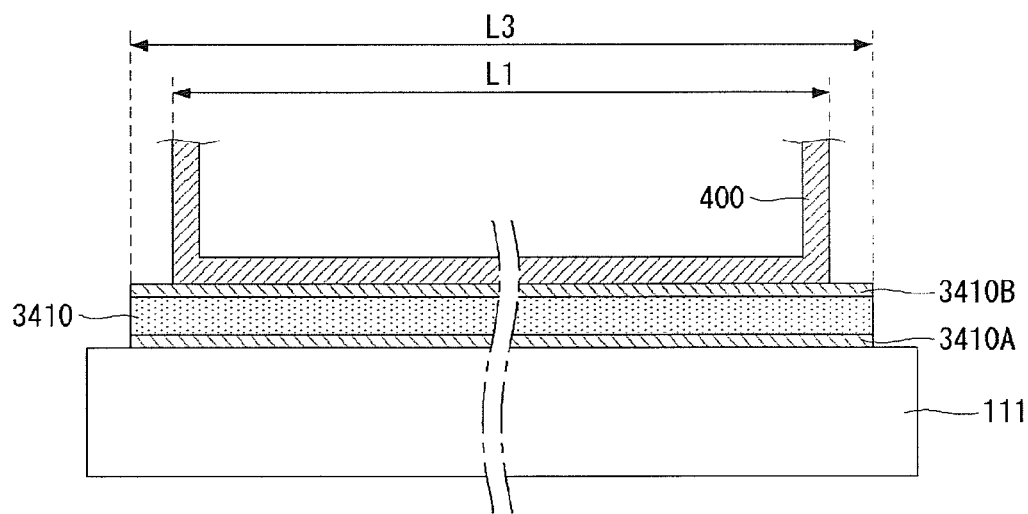

As shown in FIG. 14, a first adhesive layer 3410A may be disposed between the back polarizing film 3410 and the back substrate 111, and a second adhesive layer 34108 may be disposed between the back polarizing film 3410 and the supporting film 400. In other words, the first adhesive layer 3410A may be disposed on a first surface of the back polarizing film 3410, and the second adhesive layer 34108 may be disposed on a second surface of the back polarizing film 3410. In this instance, the width L1 of the attachment part 400A of the supporting film 400 may be less than a width L3 of the second adhesive layer 34108.

In such a configuration, the first adhesive layer 3410A, the back polarizing film 3410, and the second adhesive layer 34108 may be attached to the back substrate 111 using, for example, a laminating method, and then the supporting film 400 may be attached to the second adhesive layer 34108 using the laminating method.

Figure 15A:
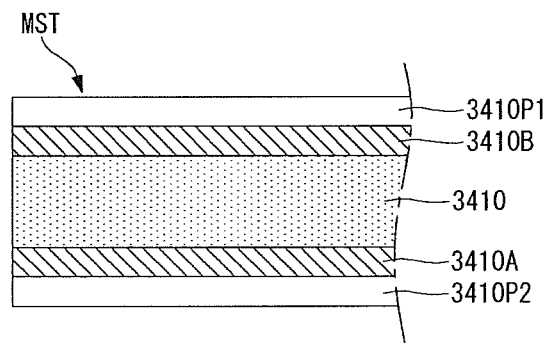

For example, as shown in FIG. 15A, the first adhesive layer 3410A may be disposed on the first surface of the back polarizing film 3410, and the second adhesive layer 3410B may be disposed on the second surface of the back polarizing film 3410. A first protective film 3410P1 may be disposed on the first adhesive layer 3410A, and a second protective film 3410P2 may be disposed on the second adhesive layer 3410B. A mother sheet MST including the first adhesive layer 3410A, the second adhesive layer 3410B, the back polarizing film 3410, the first protective film 3410P1, and the second protective film 3410P2 may be manufactured.

Figure 15B:
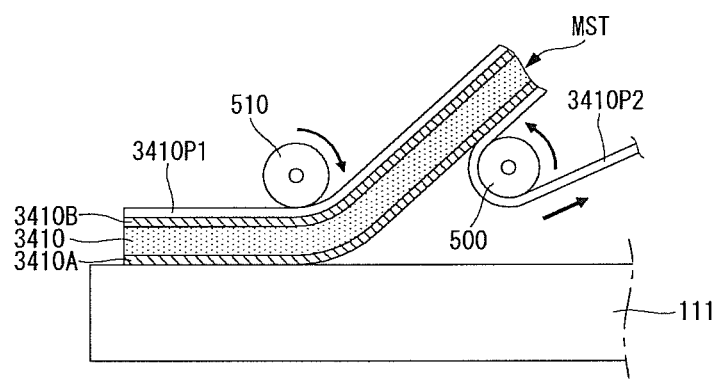

As shown in FIG. 15B, the second protective film 3410P2 may then be peeled using a first roller 500. A pressure may be applied to the first protective film 3410P1 using a second roller 510, thereby attaching the first adhesive layer 3410A to the back substrate 111.

Figure 15C:
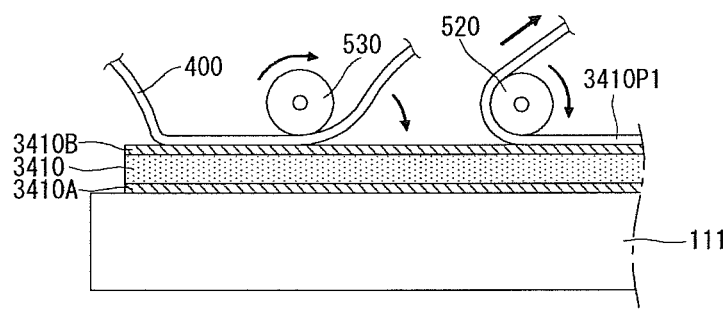

As shown in FIG. 15C, the first protective film 3410P1 may then be peeled using a third roller 520. A pressure may be applied to the supporting film 400 using a fourth roller 530, thereby attaching the supporting film 400 to the second adhesive layer 3410B.

Figure 16:
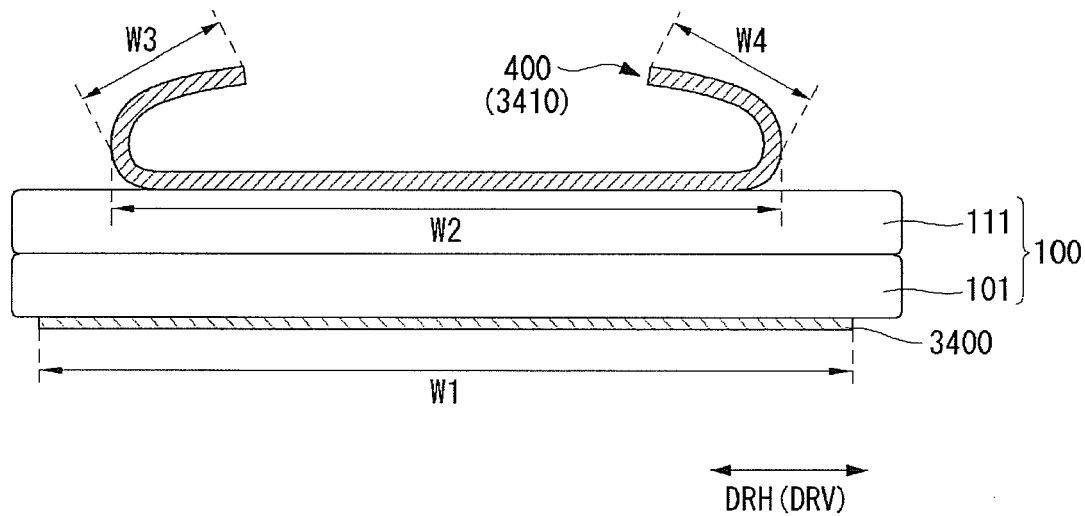

As shown in FIG. 16, in certain embodiments the supporting film 400 may replace the back polarizing film 3410. In other words, the back polarizing film 3410 may serve as the supporting film 400.

Figure 17:
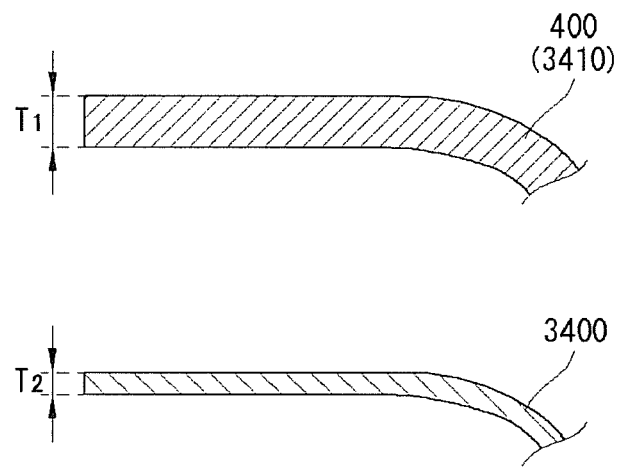

A length W1 of a contact portion between the front polarizing film 3400 and the front substrate 101 may be longer than a length W2 of a contact portion between the supporting film 400 and the back substrate 111. Further, a total length (W2+W3+W4) of the supporting film 400 attached to the back substrate 111 may be longer than a total length W1 of the front polarizing film 3400. In this instance, as shown in FIG. 17, a thickness T1 of the supporting film 400 may be greater than a thickness T2 of the front polarizing film 3400.

Figure 18:
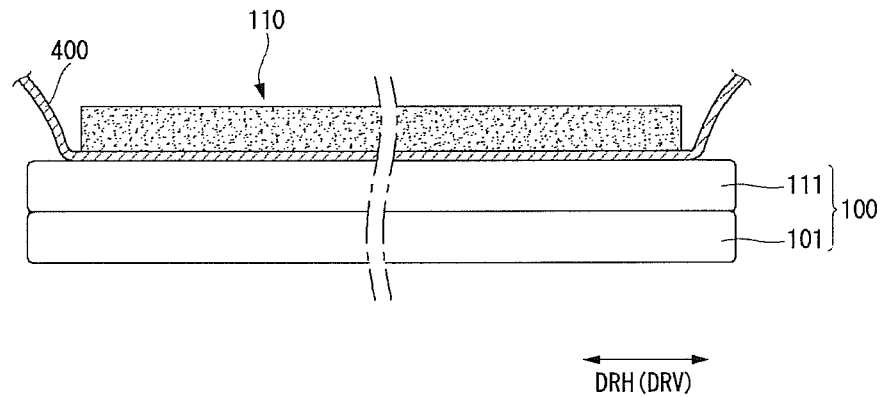

As shown in FIG. 18, the optical layer 110 may be disposed on the supporting film 400. In this instance, the optical layer 110 may contact the supporting film 400. In certain embodiments, the optical layer 110 may include a plurality of sheets. For example, as shown in FIG. 19A, the optical layer 110 may include a reflective polarizer 600, a vertical prism sheet 610, and a horizontal prism sheet 620.

Figure 19A:
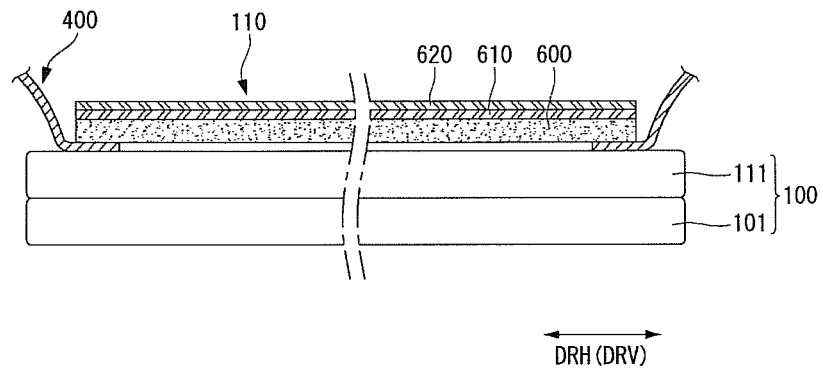

FIG. 19A shows the vertical prism sheet 610 disposed between the horizontal prism sheet 620 and the reflective polarizer 600. However, the horizontal prism sheet 620 may be disposed between the vertical prism sheet 610 and the reflective polarizer 600.

The reflective polarizer 600 may be referred to as a dual brightness enhancement film (DBEF). The reflective polarizer 600 may selectively transmit or reflect light depending on a wavelength of the light. The reflective polarizer 600 may transmit a predetermined wavelength of light and reflect other wavelengths of light through such a process, thereby reducing an amount of light blocked by the polarizing film disposed on the display panel 100. Hence, luminance may be improved.

The vertical and horizontal prism sheets 610 and 620 may adjust a travelling path of light, so that the incident light travels to the display panel 100. Hence, luminance of the image displayed on the display panel 100 may be improved.

Figure 19B:
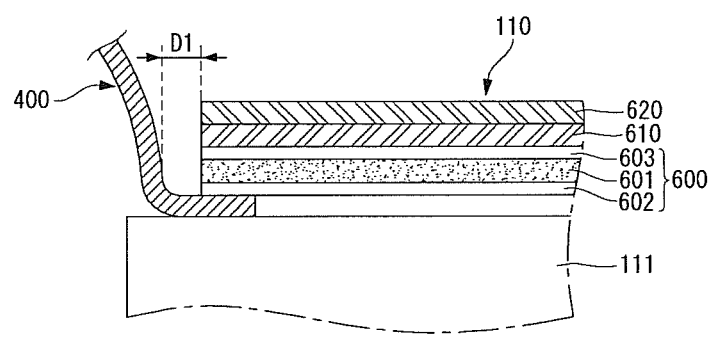

As shown in FIG. 19B, the reflective polarizer 600 may include a core layer 601, a first protective layer 602 positioned on a first surface of the core layer 601, and a second protective layer 603 positioned on a second surface of the core layer 601.

The optical layer 110 may be separated from the supporting film 400 by a predetermined distance D1 in a horizontal direction (for example, a first direction DRH or a second direction DRV). For example, the reflective polarizer 600 of the optical layer 110 may include a portion which is separated from the supporting film 400 by the predetermined distance D1 in the horizontal direction DRH or DRV.

Alternatively, the reflective polarizer 600 may be attached to the back polarizing film 3410, and the supporting film 400 may be attached to the reflective polarizer 600.

Figure 20:
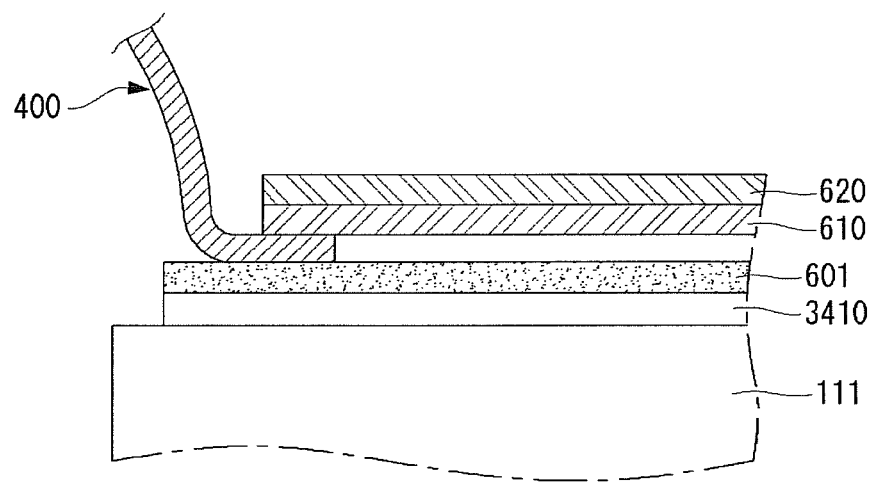

For example, as shown in FIG. 20, the first surface of the core layer 601 of the reflective polarizer 600 may be attached to the back polarizing film 3410, and the supporting film 400 may be attached to the second surface opposite the first surface of the core layer 601.

When comparing the configuration of FIG. 20 to the configuration of FIGS. 19A-19B, the back polarizing film 3410 may replace the first protective layer 602 of FIGS. 19A-19B, and the supporting film 400 may replace the second protective layer 603 of FIGS. 19A-19B. In this instance, a thickness of the display device may be reduced.

Figure 21:
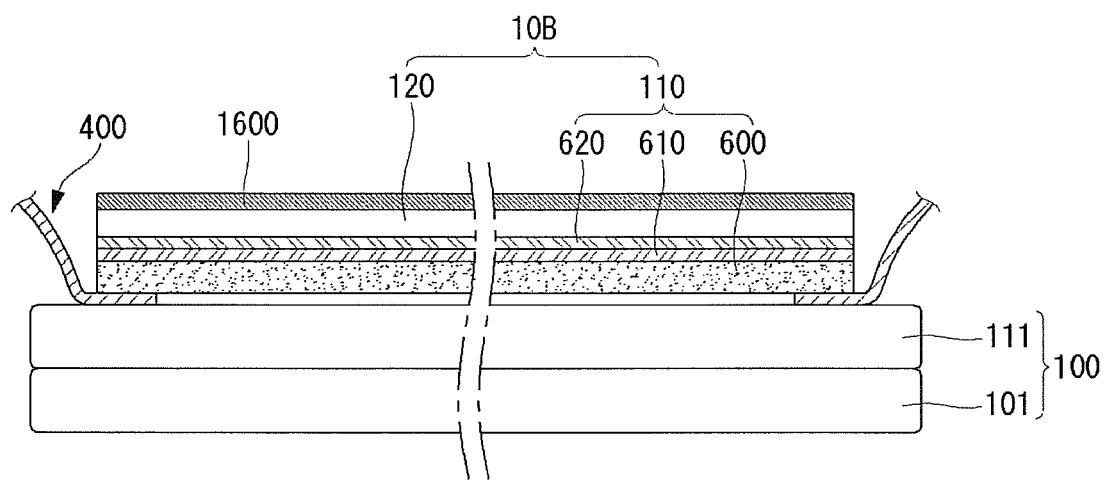

As shown in FIG. 21, the light source module 120 may be disposed on the optical layer 110, and a frame 1600 may be disposed on the light source module 120.

In certain embodiments, the light source module 120 may include a plurality of substrates.

Figure 22:
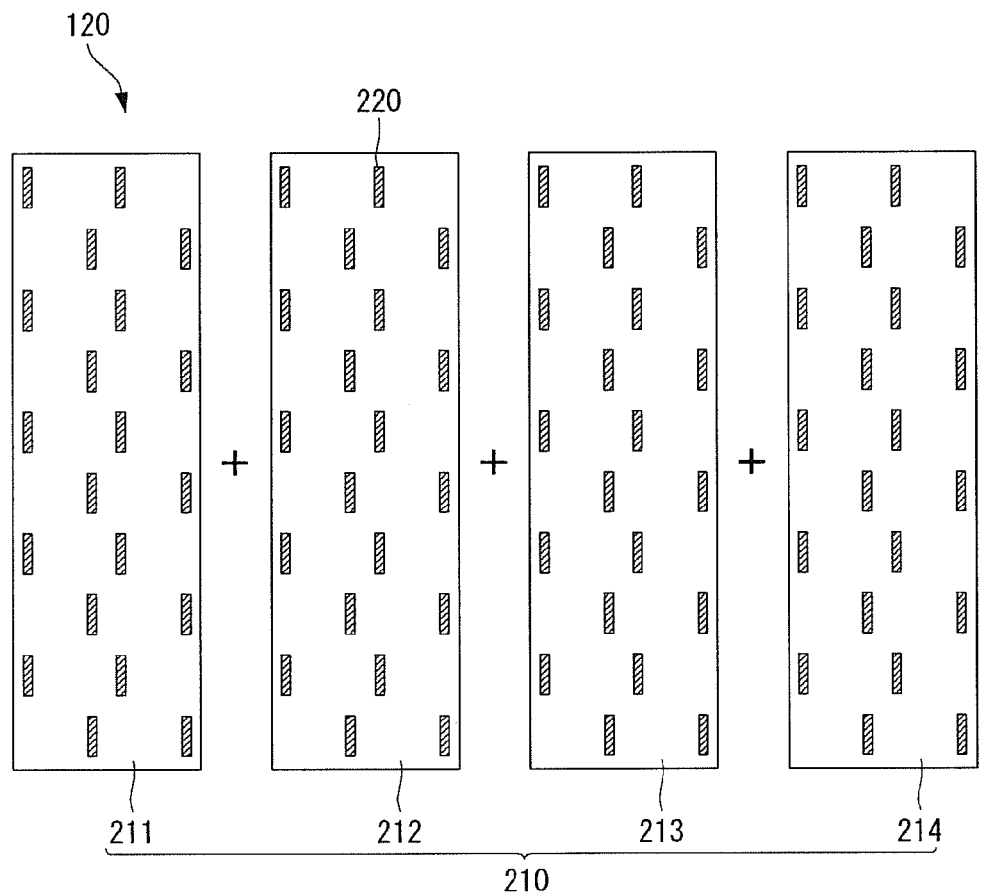

For example, as shown in FIG. 22, the light source module 120 of the backlight device 10B according to one embodiment as broadly described herein may include a plurality of substrates 211 to 214. FIG. 22 shows the backlight device 10B including four substrates 211 to 214. However, embodiments are not limited thereto.

As shown in FIG. 22, the light source module 120 may include the first substrate 211, the second substrate 212, the third substrate 213, and the fourth substrate 214. In this embodiment, the first to fourth substrates 211 to 214 may be referred to sub-substrates. Namely, the plurality of sub-substrates 211 to 214 may form one mother substrate. In this instance, a plurality of light sources 220 may be disposed on each of the first to fourth substrates 211 to 214, and then the first to fourth substrates 211 to 214 may be coupled with one another in parallel. Hence, one mother substrate 210 may be manufactured.

If the mother substrate 210 is damaged, only the damaged substrate may be replaced, and the other, undamaged, substrates may continue to be used. Hence, the material consumption resulting from damage of the mother substrate 210 may be reduced, and manufacturing cost may be reduced.

As described above, when the mother substrate 210 is divided into the plurality of substrates 211 to 214, a connector may be disposed on each of the substrates 211 to 214. The connector may be electrically connected to at least one light source 220 disposed on each of the substrates 211 to 214. The connector may electrically connect an external driving circuit to the light sources 220, thereby causing a driving voltage supplied by the driving circuit to be supplied to the light sources 220.

As described above, when the mother substrate 210 is divided into the plurality of substrates 211 to 214, the substrates 211 to 214 may be disposed in parallel, and then a reflective layer may be disposed on each of the substrates 211 to 214.

Figure 23:
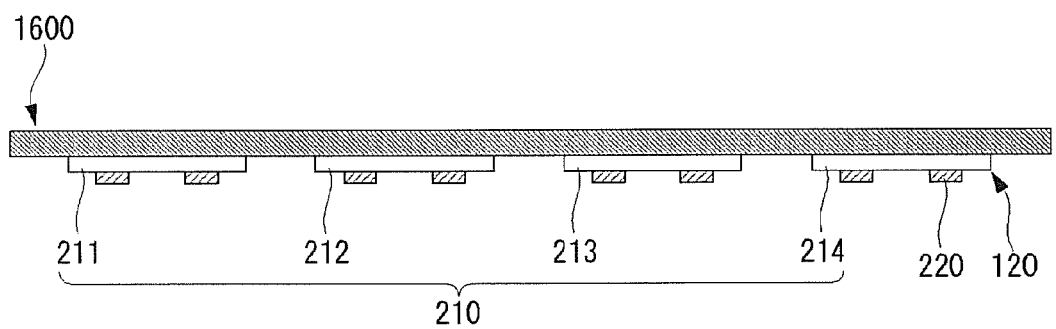

As shown in FIG. 23, the substrate 210, on which at least one light source 220 is disposed, may be disposed on a frame 1600. In certain embodiments, the first to fourth substrates 211 to 214 included in the mother substrate 210 may be disposed on the frame 1600.

Figure 24A:
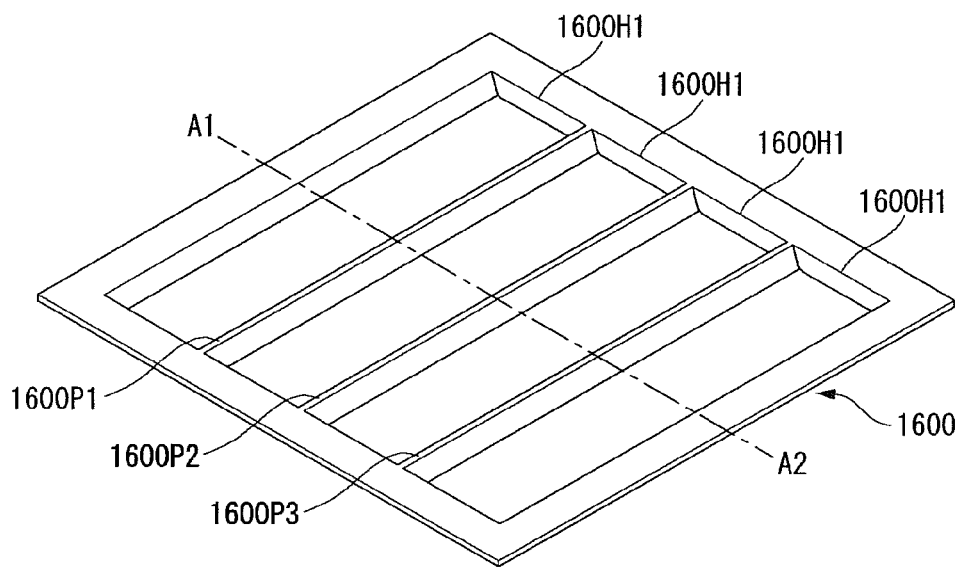
Figure 24B:
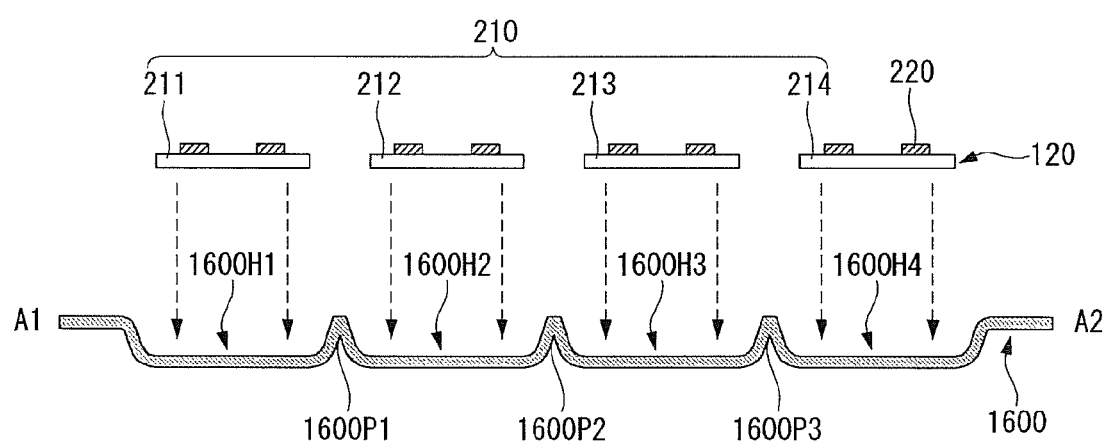

The frame 1600 may include a depression corresponding to the substrate 210. For example, as shown in FIGS. 24A and 24B, the frame 1600 may include a first depression 1600H1 corresponding to the first substrate 211, a second depression 1600H2 corresponding to the second substrate 212, a third depression 1600H3 corresponding to the third substrate 213, and a fourth depression 1600H4 corresponding to the fourth substrate 214. The first substrate 211 may be disposed in the first depression 1600H1; the second substrate 212 may be disposed in the second depression 1600H2; the third substrate 213 may be disposed in the third depression 1600H3; and the fourth substrate 214 may be disposed in the fourth depression 1600H4. The frame 1600 may also include a first protrusion 1600P1 between the first depression 1600H1 and the second depression 1600H2, a second protrusion 1600P2 between the second depression 1600H2 and the third depression 1600H3, and a third protrusion 1600P3 between the third depression 1600H3 and the fourth depression 1600H4. An air gap may be formed between the first to third protrusions 1600P1, 1600P2, and 1600P3 of the frame 1600 and the optical layer 110.

Figure 25:
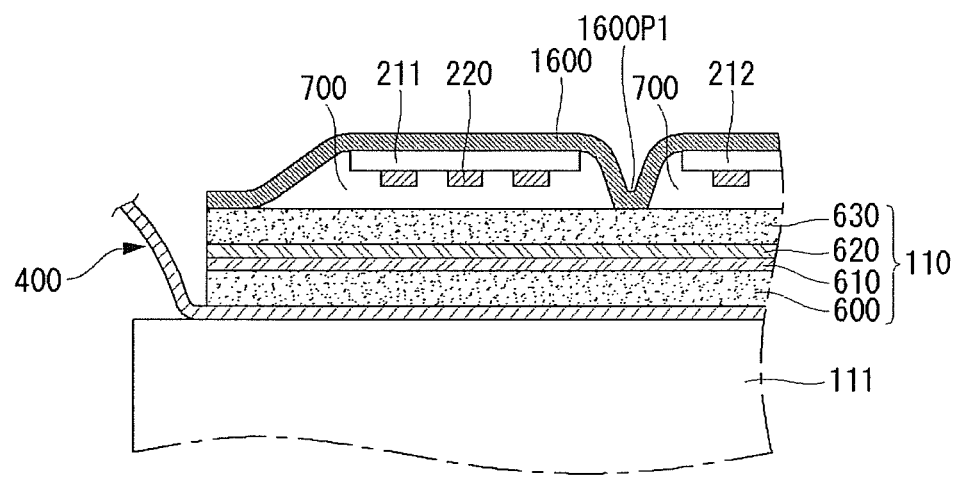

For example, as shown in FIG. 25, an air gap 700 may be formed between the first substrate 211 and the optical layer 110 and between the second substrate 212 and the optical layer 110 by the first to third protrusions 1600P1, 1600P2, and 1600P3. Namely, the air gap 700 may be provided between the optical layer 110 and the light source module 120.

As shown in FIG. 25, the optical layer 110 may further include a diffusion plate 630. The diffusion plate 630 may be positioned between the prism sheets 610/620 and the frame 1600. The diffusion plate 630 may diffuse light emitted by the light sources 220, thereby preventing the light from being concentrated on a predetermined area. Because the light entering into the diffusion plate 630 is scattered while passing through the diffusion plate 630, uniform brightness of the screen of the display panel 100 may be maintained.

Disposition order of the reflective polarizer 600, the vertical prism sheet 610, the horizontal prism sheet 620, and the diffusion plate 630 included in the optical layer 110 may be altered as appropriate.

FIG. 25 shows that the optical layer 110 includes the four sheets. However, the number of sheets constituting the optical layer 110 may be changed.

The backlight device 10B shown in FIG. 25 may correspond to a direct type backlight device.

The backlight device 10B applied to embodiments as broadly described herein may be an edge type backlight device.

Figure 26:
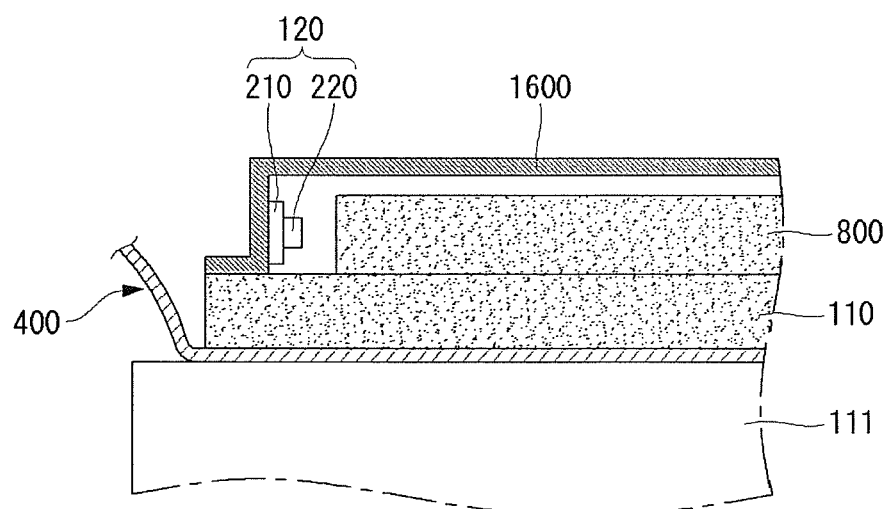

For example, as shown in FIG. 26, the mother substrate 210, on which the light sources 220 are positioned, may be disposed on the frame 1600. A light guide plate 800 may be disposed between the frame 1600 and the optical layer 110. The light sources 220 may be positioned facing a lateral side of the light guide plate 800.

The supporting film 400 may be connected to the frame 1600.

Figure 27:
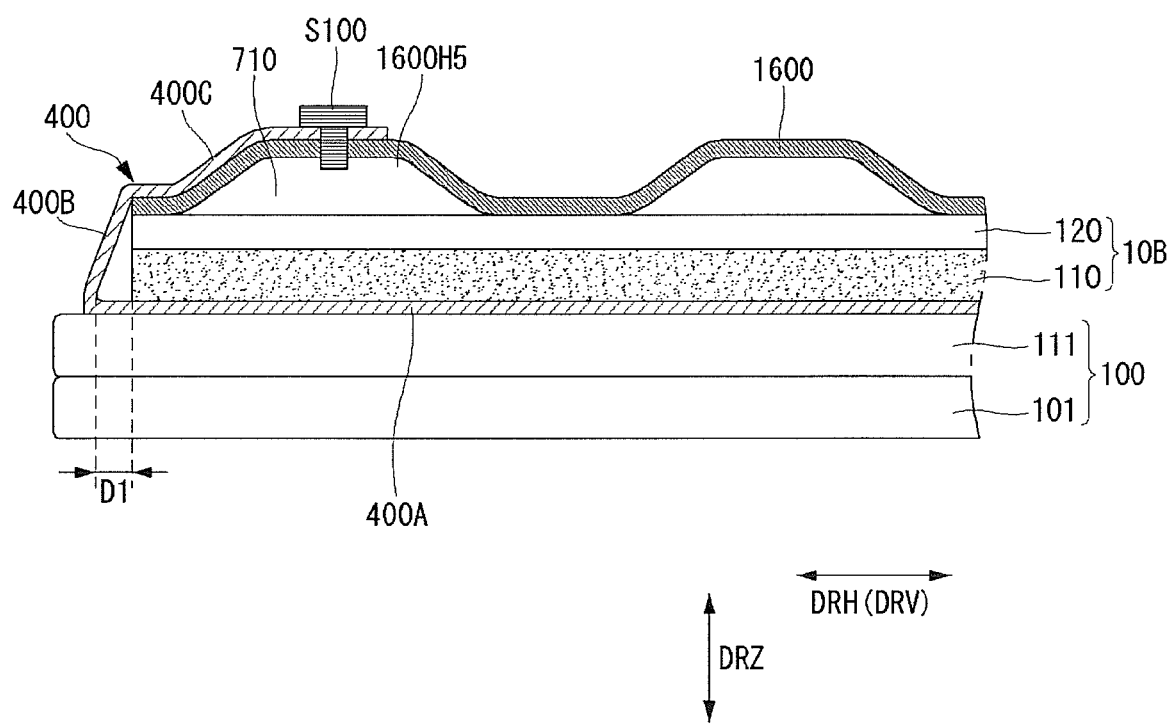

For example, as shown in FIG. 27, the frame 1600 may further include a fifth depression 1600H5 which is depressed in a direction far from the display panel 100. A first fastener S100 may fasten the supporting film 400 to the fifth depression 1600H5 of the frame 1600. The supporting film 400 may include the attachment portion 400A attached to the back substrate 111 of the display panel 100, a back portion 400C positioned on a back surface of the frame 1600, and a side portion 400B positioned on the side of the optical layer 110. The first fastener S100 may fasten the back portion 400C of the supporting film 400 to the fifth depression 1600H5 of the frame 1600.

The frame 1600, the light source module 120, and the optical layer 110 may be supported by the supporting film 400. In this instance, the supporting film 400 having flexibility may prevent an external force imparted on the frame 1600 from being transferred to the display panel 100. Hence, a light leakage phenomenon of the display panel 100 may be prevented.

Figure 28:
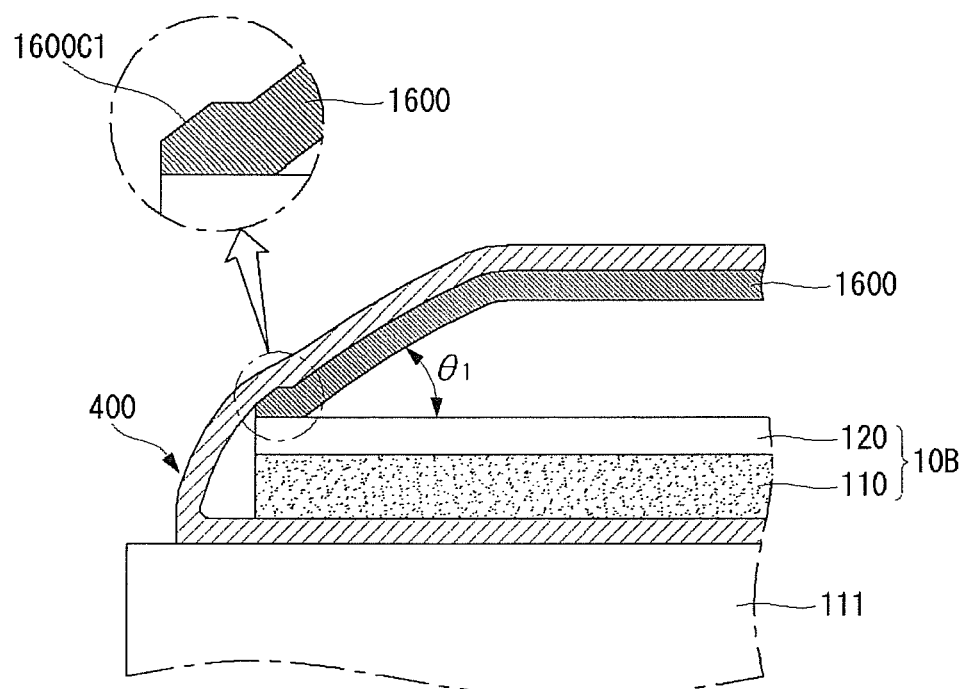

Because the supporting film 400 may have flexibility, rigidity of the supporting film 400 may be relatively weak. As shown in FIG. 28, an edge 1600 CI of the frame 1600 may be die-cut, so as to prevent the supporting film 400 from being damaged by the edge of the frame 1600.

The frame 1600 may include a portion whose distance from the optical layer 110 gradually increases as it goes from an edge portion to a middle portion. In other words, an angle 81 between the edge of the frame 1600 and the optical layer 110 may be an acute angle.

Figure 29:
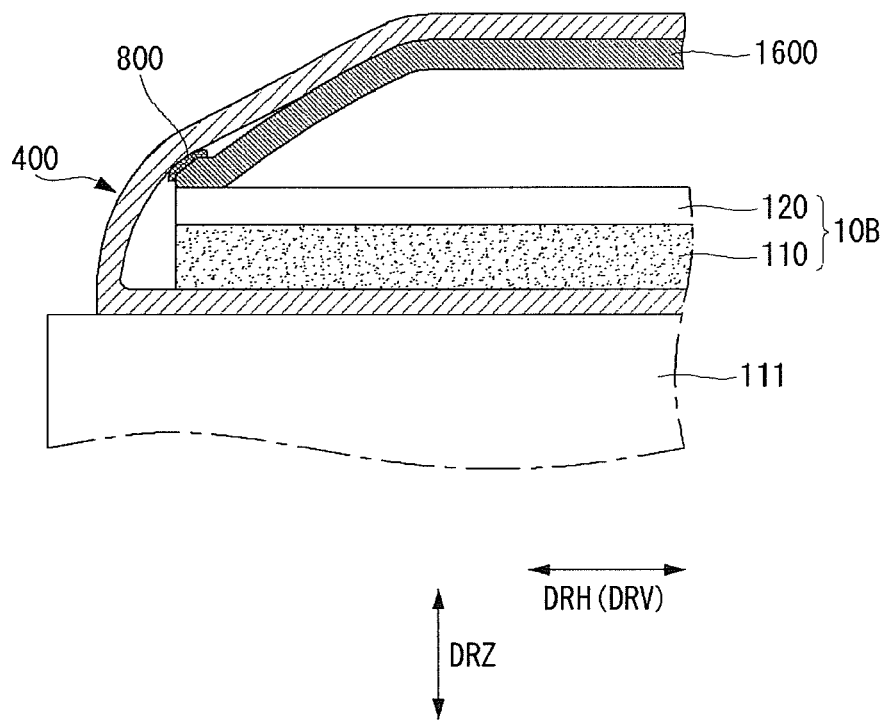

Alternatively, as shown in FIG. 29, a buffer layer 800 may be disposed between the edge of the frame 1600 and the supporting film 400. The buffer layer 800 may be attached to the edge of the frame 1600. The buffer layer 800 may be formed of a material having elasticity and flexibility. The elasticity and the flexibility of the buffer layer 800 may be greater than the elasticity and the flexibility of the frame 1600. For example, the buffer layer 800 may be formed of a sponge material.

Figure 30:
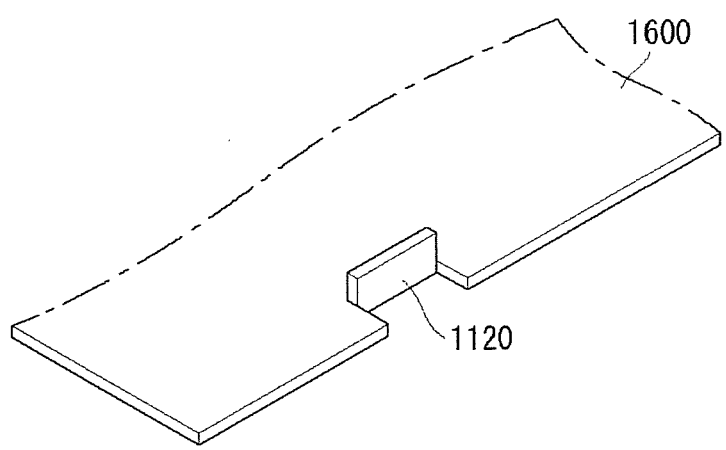
Figure 31:
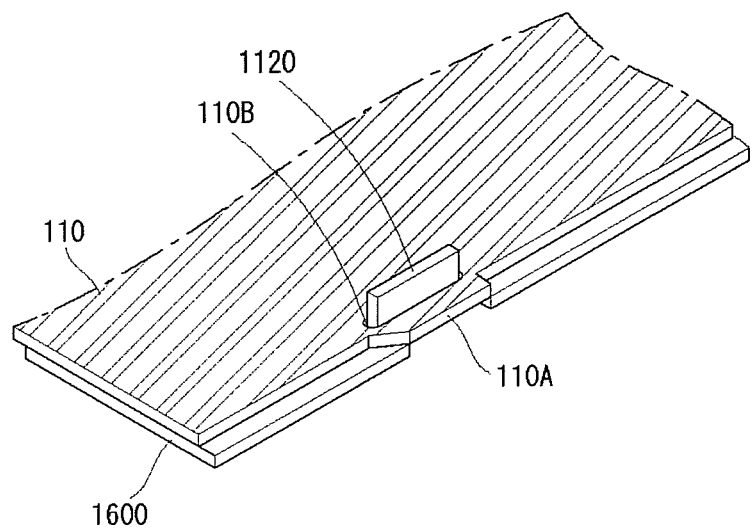

As shown in FIG. 30, the frame 1600 may include a protrusion 1120 corresponding to a hole 1108 formed in the optical layer 110 (see FIG. 31). More specifically, the frame 1600 may include the protrusion 1120 which corresponds to the hole 1108 of the optical layer 110, which may protrude toward the display panel 100. As shown in FIG. 31, the optical layer 110 may be disposed on the frame 1600, so that the hole 1108 corresponds to the protrusion 1120 of the frame 1600. Hence, the protrusion 1120 of the frame 1600 may pass through the hole 1108 of the optical layer 110. When the hole 1108 is formed in a protrusion 110A of the optical layer 110 and is disposed at a position corresponding to the protrusion 1120 of the frame 1600, the detachment of the optical layer 110 may be prevented while preventing an excessive increase in the overall size of the optical layer 110. The optical layer 110 shown in FIG. 31 may include a reflective polarizer 600, a vertical prism sheet 610, a horizontal prism sheet 620, and a diffusion plate 630 in the same manner as the optical layer 110 shown in FIG. 25. In this instance, each of the reflective polarizer 600, the vertical prism sheet 610, the horizontal prism sheet 620, and the diffusion plate 630 may have the hole 1108.

Figure 32:
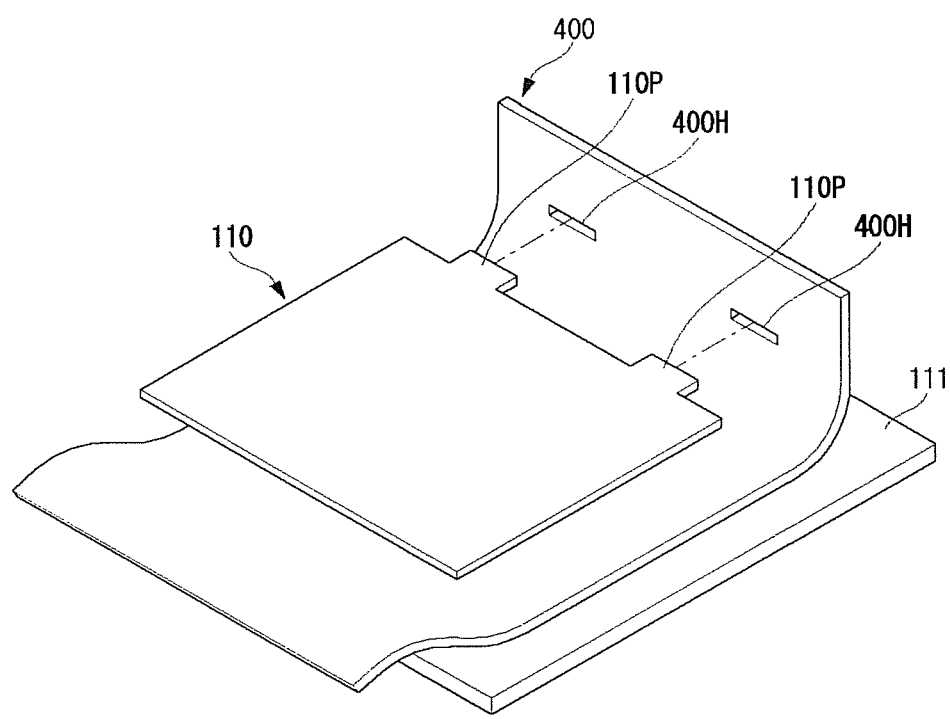

The supporting film 400 may include at least one opening. For example, as shown in FIG. 32, the supporting film 400 may include one or more openings 400H, into which one or more protrusions 110P of the optical layer 110 may be respectively inserted. In this instance, a movement of the optical layer 110 may be more effectively limited.

Figure 33:
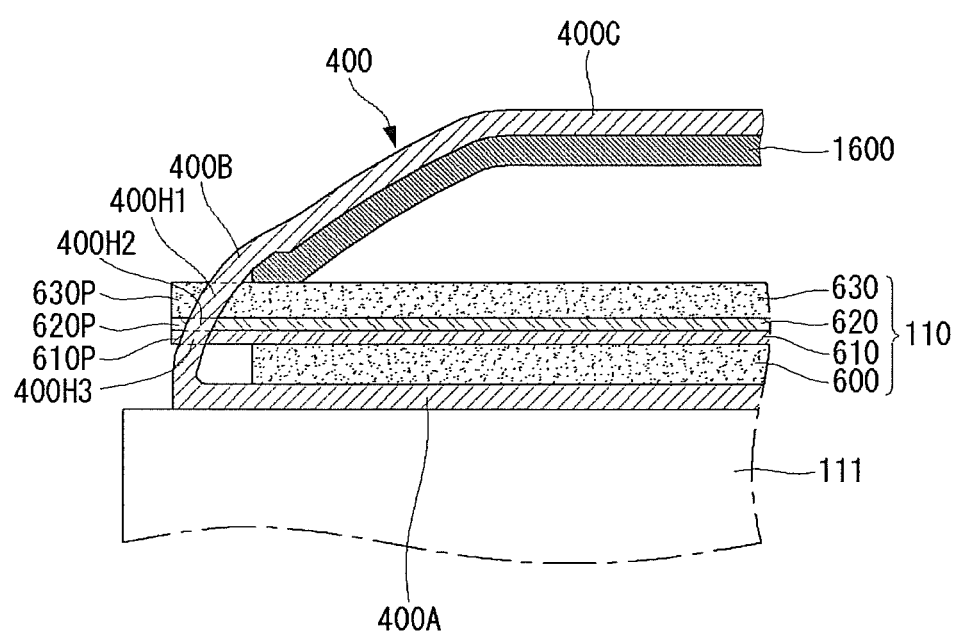

As shown in FIG. 33, the side portion 400B of the supporting film 400 may include at least one opening. For example, the side portion 400B of the supporting film 400 may include a third opening 400H3 corresponding to the vertical prism sheet 610, a second opening 400H2 corresponding to the horizontal prism sheet 620, and a first opening 400H1 corresponding to the diffusion plate 630. A protrusion 610P of the vertical prism sheet 610 may be inserted into the third opening 400H3, a protrusion 620P of the horizontal prism sheet 620 may be inserted into the second opening 400H2, and a protrusion 630P of the diffusion plate 630 may be inserted into the first opening 400H1.

Figure 34:
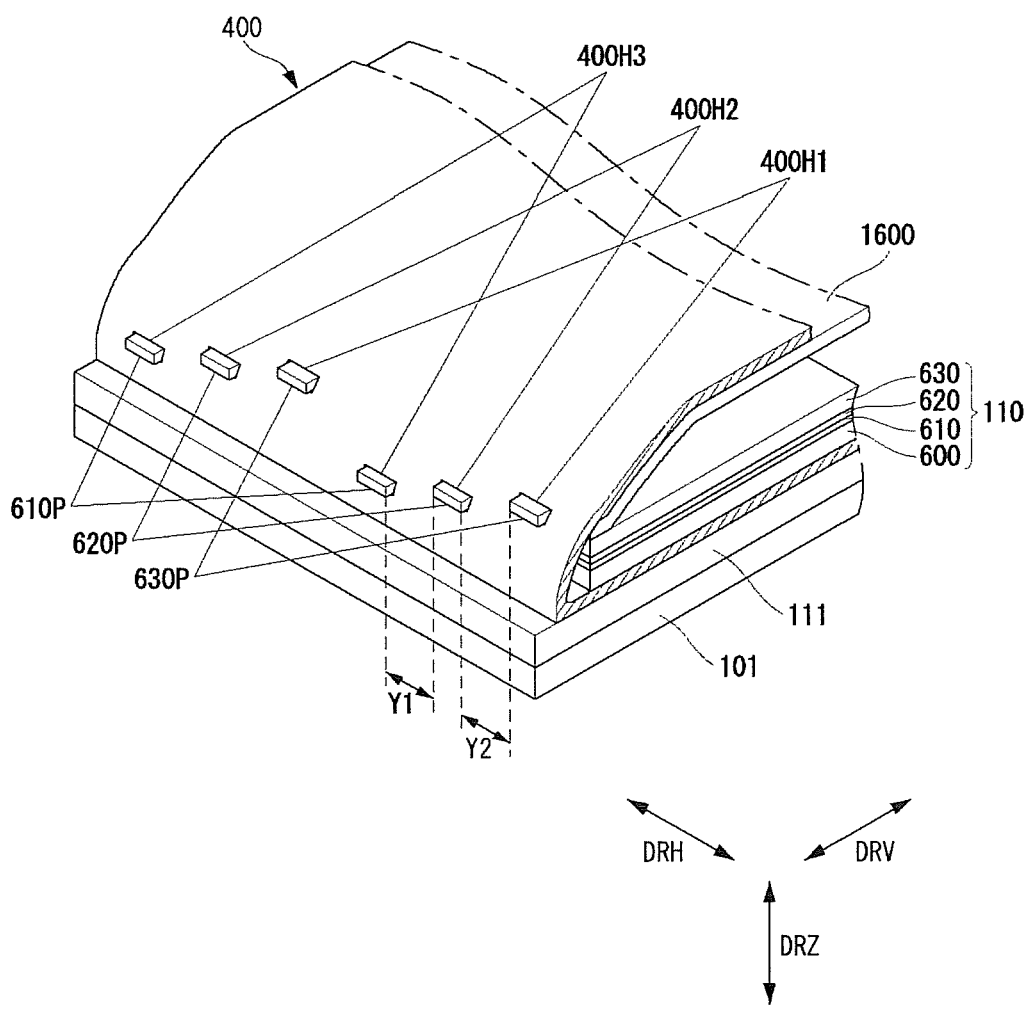

As shown in FIG. 34, the first opening 400H1 and the second opening 400H2 may be separated from each other by a predetermined distance Y2 in the horizontal direction, for example, the first direction DRH. Further, the second opening 400H2 and the third opening 400H3 may be separated from each other by a predetermined distance Y1 in the horizontal direction, for example, the first direction DRH.

Figure 35:
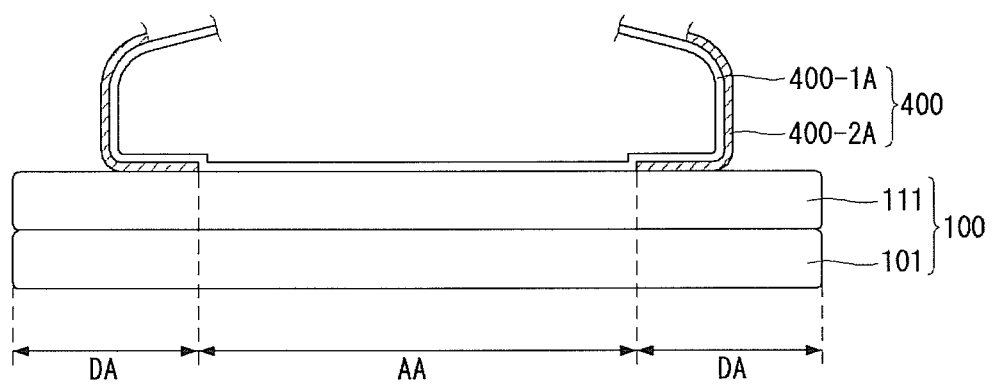

As shown in FIG. 35, the supporting film 400 may include first and second supporting films 400-1A and 400-2A each including a portion attached to the back substrate 111. For example, the second supporting film 400-2A may include a portion attached to the dummy area DA of the back substrate 111, and the first supporting film 400-1A may include a portion attached to the second supporting film 400-2A and a portion attached to the active area AA of the back substrate 111. Even in this instance, it is possible to increase a strength of the supporting film 400.

A light transmittance of the first supporting film 400-1A may be greater than a light transmittance of the second supporting film 400-2A.

The first supporting film 400-1A and the second supporting film 400-2A may be connected to each other.

Figure 36:
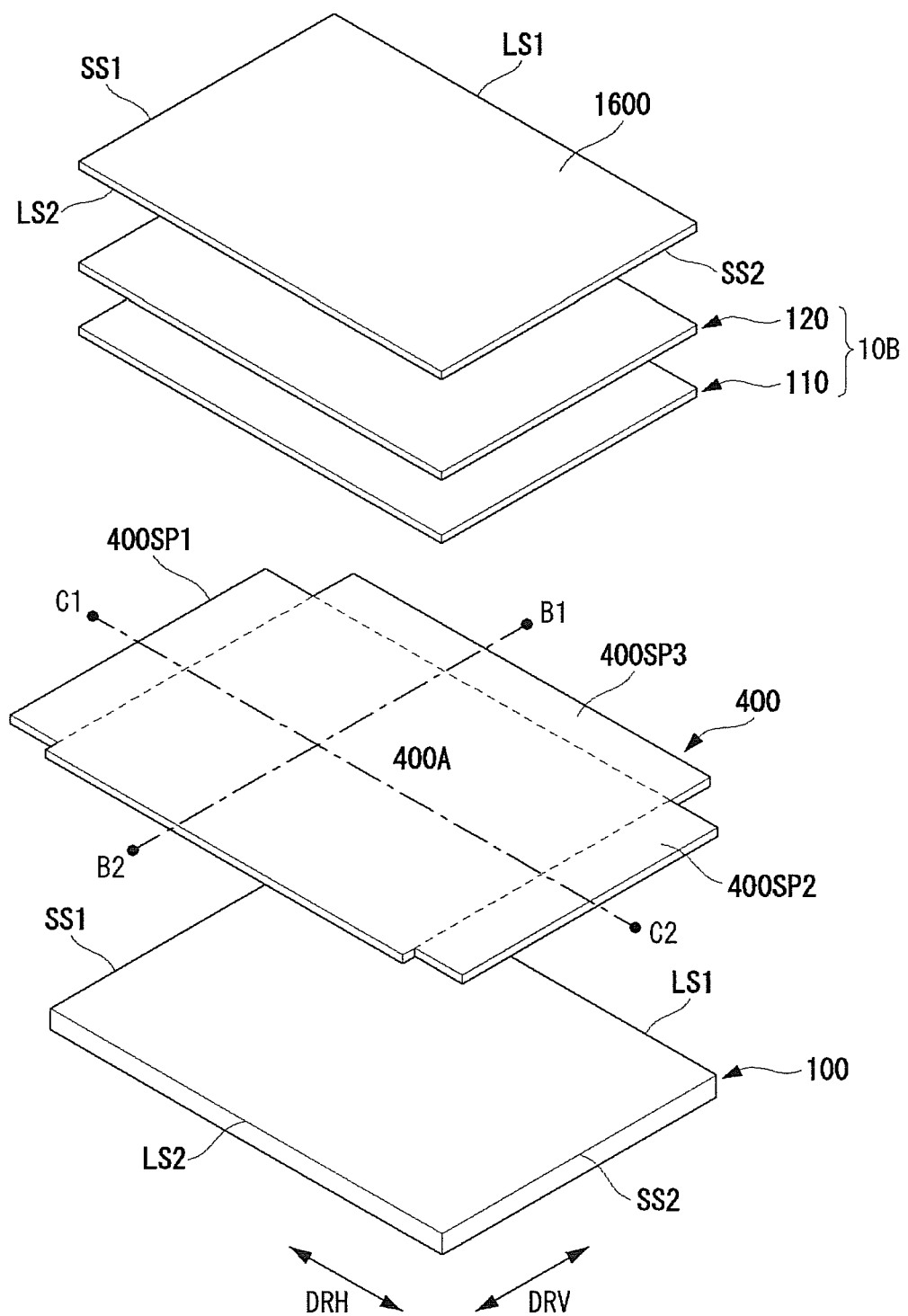

As shown in FIG. 36, the frame 1600 may include a first long side LS1, a second long side LS2 opposite the first long side LS1, a first short side SS1 adjacent to the first and second long sides LS1 and LS2, and a second short side SS2 opposite the first short side SS1. The supporting film 400 may include a first potion 400SP1 positioned on the first short side SS1 of the frame 1600, a second potion 400SP2 positioned on the second short side SS2 of the frame 1600, and a third potion 400SP3 positioned on the first long side LS1 of the frame 1600. The first potion 400SP1 may be connected to the frame 1600 on the first short side SS1 of the frame 1600, and the second potion 400SP2 may be connected to the frame 1600 on the second short side SS2 of the frame 1600. The third potion 400SP3 may be connected to the frame 1600 on the first long side LS1 of the frame 1600.

Figure 37:
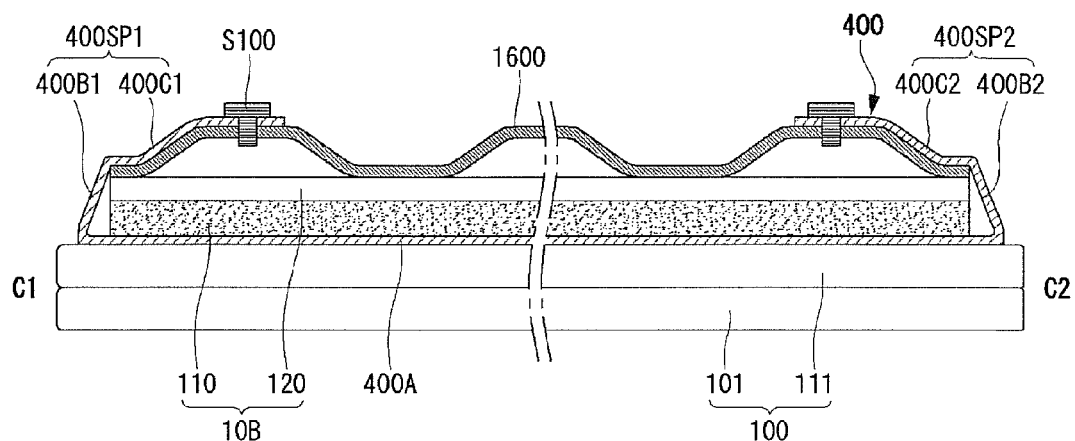

As shown in FIG. 37 which is a cross-sectional view taken along line C1-C2 of FIG. 36, the supporting film 400 may be connected to the back surface of the frame 1600 at both ends of the display device. In this instance, the first portion 400SP1 of the supporting film 400 may include a first side portion 400B1 positioned on a corresponding side of the optical layer 110 and a first back portion 400C1 positioned on the back surface of the frame 1600. The second portion 400SP2 of the supporting film 400 may include a second side portion 400B2 positioned on a corresponding side of the optical layer 110 and a second back portion 400C2 positioned on the back surface of the frame 1600.

Figure 38:
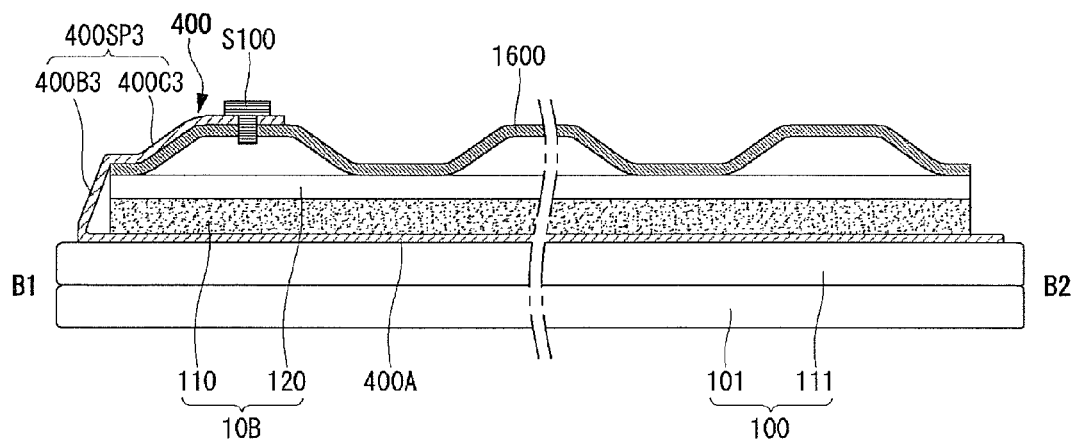

As shown in FIG. 38 which is a cross-sectional view taken along line B1-B2 of FIG. 36, the supporting film 400 may be connected to the back surface of the frame 1600 at one end of the display device. In this instance, the third portion 400SP3 of the supporting film 400 may include a third side portion 400B3 positioned on a corresponding side of the optical layer 110 and a third back portion 400C3 positioned on the back surface of the frame 1600.

Figure 39:
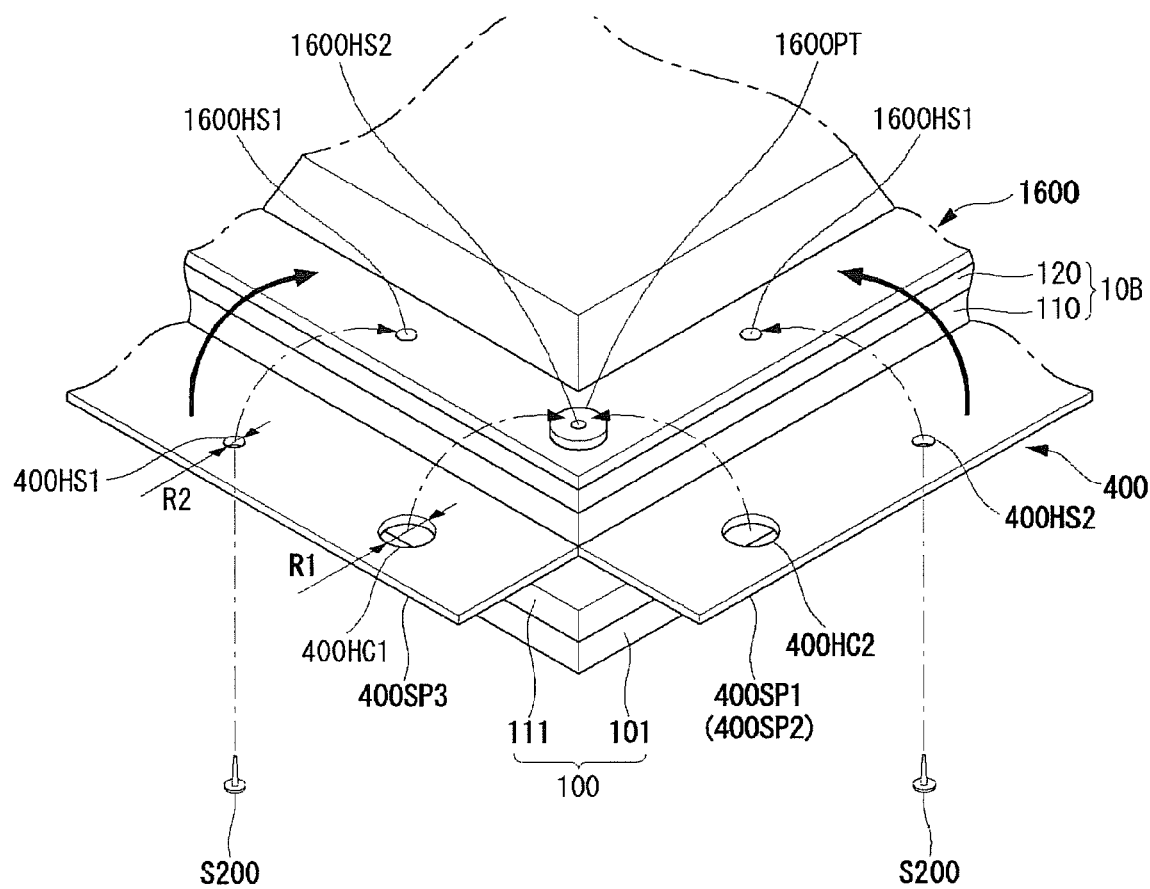

As shown in FIG. 39, the frame 1600 may include at least one hole. More specifically, the frame 1600 may include at least one first frame hole 1600HS1 and a frame protrusion 1600PT. The supporting film 400 may include at least one first film hole 400HS1 corresponding to the at least one first frame hole 1600HS1 of the frame 1600. Further, the supporting film 400 may include first and second common holes 400HC1 and 400HC2 corresponding to the frame protrusion 1600PT.

Second fasteners S200 may pass through the first film hole 400HS1 and the first frame hole 1600HS1 to fasten the supporting film 400 to the frame 1600. For example, a second fastener S200 may pass through the first film hole 400HS1 formed in the first portion 400SP1 of the supporting film 400 and the first frame hole 1600HS1 formed in the first short side SS1 of the frame 1600, thereby fastening the supporting film 400 to the frame 1600. Further, another second fastener S200 may pass through the first film hole 400HS1 formed in the third portion 400SP3 of the supporting film 400 and the first frame hole 1600HS1 formed in the first long side LS1 of the frame 1600, thereby fastening the supporting film 400 to the frame 1600.

The frame protrusion 1600PT may include a second frame hole 1600HS2. The frame protrusion 1600PT may be formed at a boundary between the first long side LS1 and the first short side SS1 of the frame 1600, and may be inserted into the second common hole 400HC2 formed in the first portion 400SP1 of the supporting film 400 and the first common hole 400HC1 formed in the third portion 400SP3 of the supporting film 400.

Figure 40:
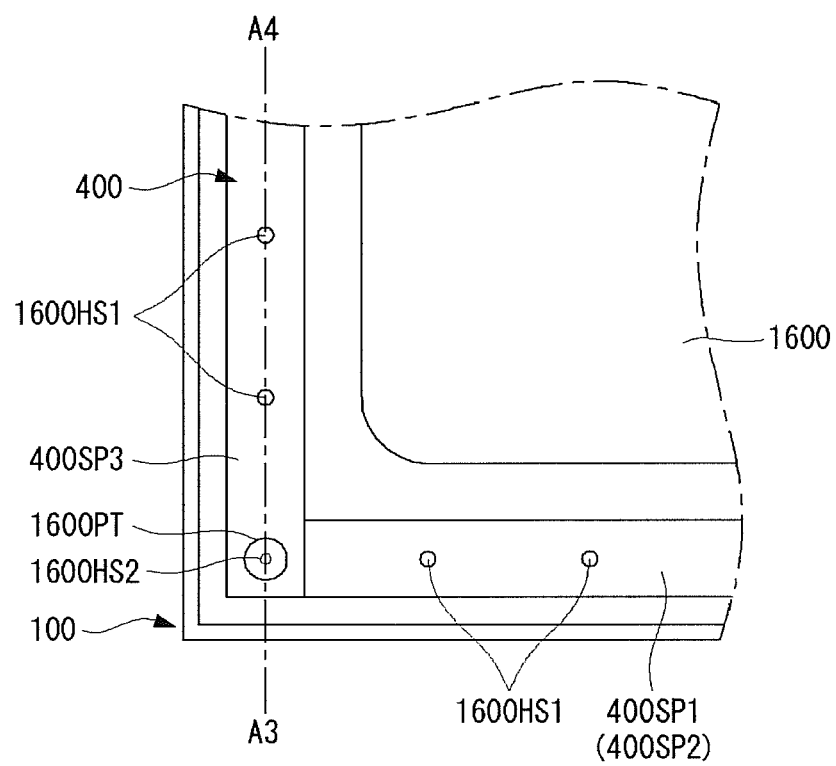

In this instance, as shown in FIG. 40, the first portion 400SP1 and the third portion 400SP3 of the supporting film 400 may overlap each other in the corner between the first long side LS1 and the first short side SS1 of the frame 1600. Alternatively, not shown, the second portion 400SP2 and the third portion 400SP3 of the supporting film 400 may overlap each other in the corner between the first long side LS1 and the second short side SS2 of the frame 1600.

In other words, each of the first back portion 400C1 and the third back portion 400C3 may have a common hole in an overlap area between the first back portion 400C1 and the third back portion 400C3 of the supporting film 400. Alternatively, each of the first back portion 400C1 and the second back portion 400C2 may have a common hole in an overlap area between the first back portion 400C1 and the second back portion 400C2 of the supporting film 400.

Figure 41:
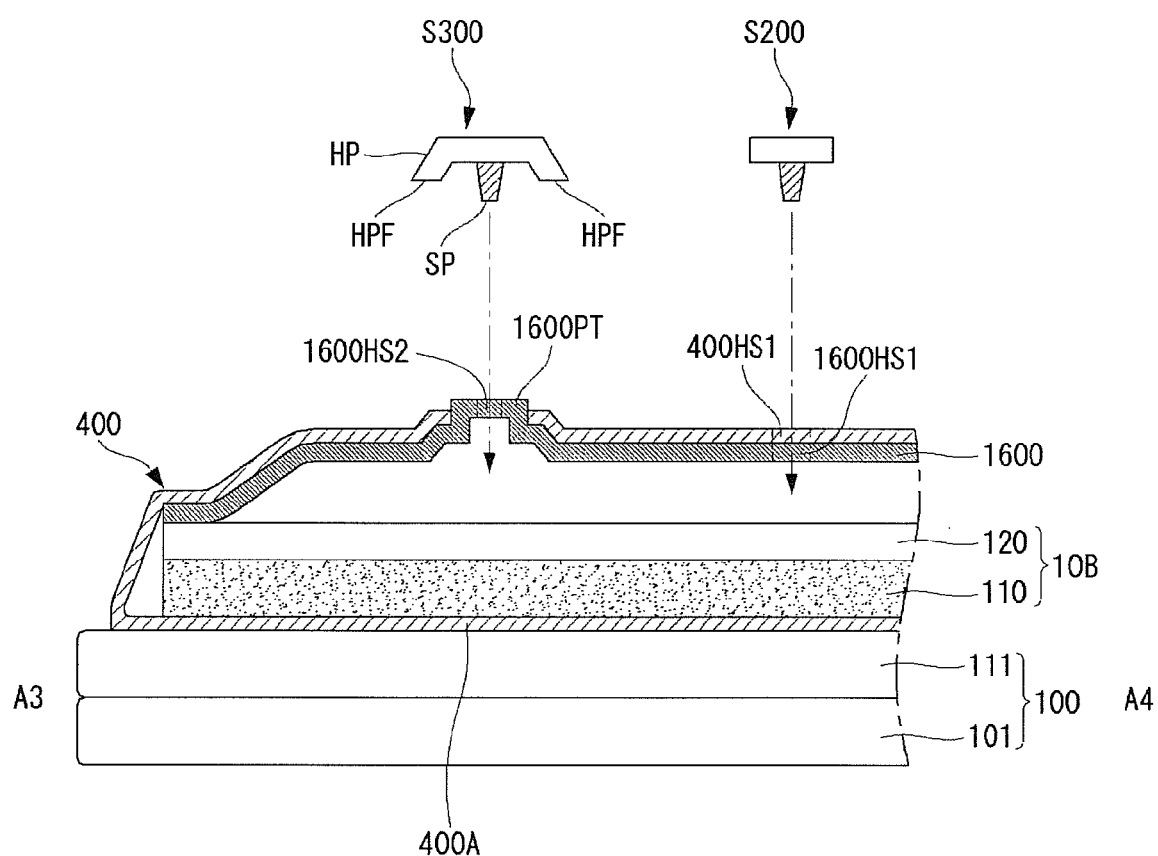

As shown in FIG. 41 which is a cross-sectional view taken along line A3-A4 of FIG. 40, the second fastener S200 may pass through the first frame hole 1600HS1 of the frame 1600 and the first film hole 400HS1 of the supporting film 400, thereby fastening the supporting film 400 to the frame 1600.

Further, a third fastener S300 may pass through the second frame hole 1600HS2 formed in the frame protrusion 1600PT of the frame 1600 and the first and second common holes 400HC1 and 400HC2 of the supporting film 400, thereby fastening the supporting film 400 to the frame 1600. The third fastener S300 may press the supporting film 400 around the frame protrusion 1600PT. A head part HP of the third fastener S300 may include a protrusion HPF which is positioned at an edge of the head part HP and protrudes toward the frame 1600. The protrusion HPF of the head part HP of the third fastener S300 may press the supporting film 400, thereby securely fastening the supporting film 400 to the frame 1600.

The third fastener S300 may fasten the first back portion 400C1 and the third back portion 400C3 of the supporting film 400 to the frame protrusion 1600PT of the frame 1600. Alternatively, the third fastener S300 may fasten the first back portion 400C1 and the second back portion 400C2 of the supporting film 400 to the frame protrusion 1600PT of the frame 1600.

Figure 42:
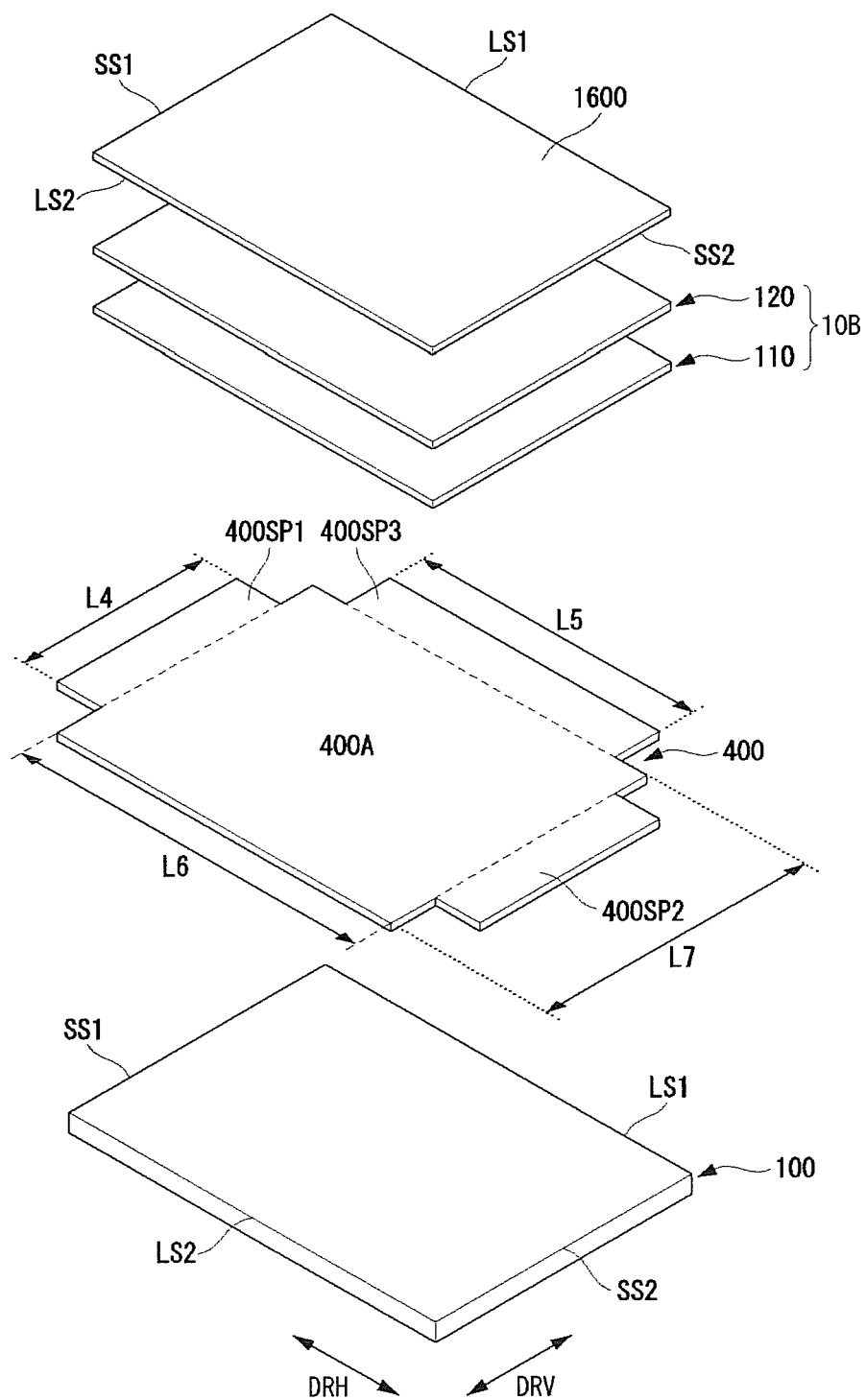

As shown in FIG. 42, a width L4 of the first and second portions 400SP1 and 400SP2 of the supporting film 400 may be less than a width L7 of a main body of the supporting film 400 in the horizontal direction (for example, the second direction DRV). Further, a width L5 of the third portion 400SP3 of the supporting film 400 may be less than a width L6 of the main body of the supporting film 400 in the horizontal direction (for example, the first direction DRH).

Even when configured in this manner, the frame 1600 may include at least one hole, and the supporting film 400 may include at least one hole.

The first portion 400SP1 of the supporting film 400 may be connected to the first short side SS1 of the frame 1600, the second portion 400SP2 of the supporting film 400 may be connected to the second short side SS2 of the frame 1600, and the third portion 400SP3 of the supporting film 400 may be connected to the first long side LS1 of the frame 1600.

Figure 43:
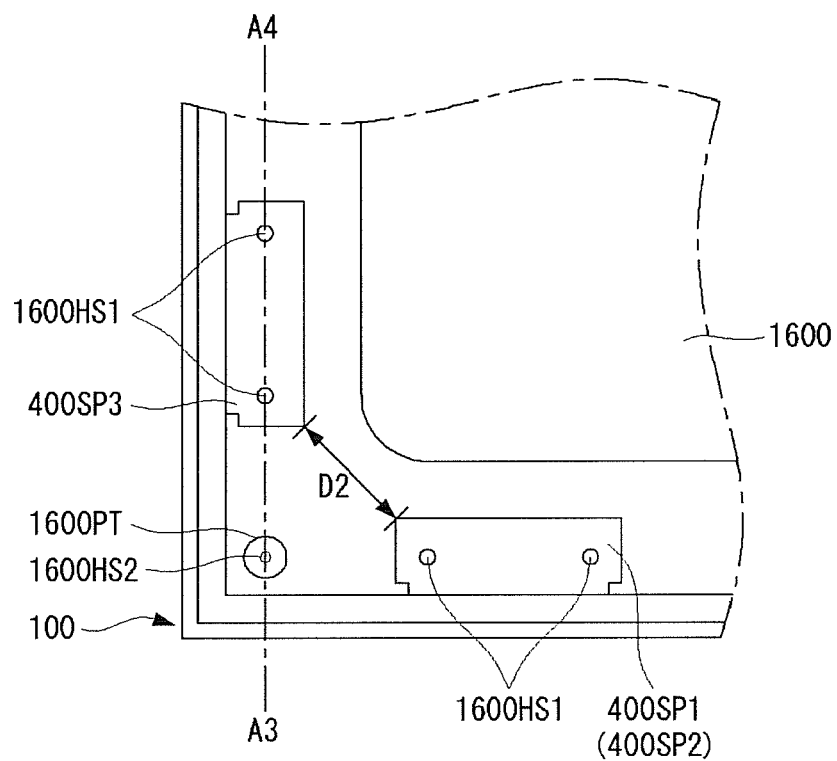

In this instance, as shown in FIG. 43, the first back portion 400C1 and the third back portion 400C3 of the supporting film 400 may be separated from each other by a predetermined distance D2 in the corner between the first long side LS1 and the first short side SS1 of the frame 1600. Alternatively, the second back portion 400C2 and the third back portion 400C3 of the supporting film 400 may be separated from each other in the corner between the first long side LS1 and the second short side SS2 of the frame 1600.

A half cutting method may be used to divide the supporting film 400 into the attachment part 400A, the side portions 400B1, 400B2, and 400B3, and the back portions 400C1, 400C2, and 400C3.

Figure 44:
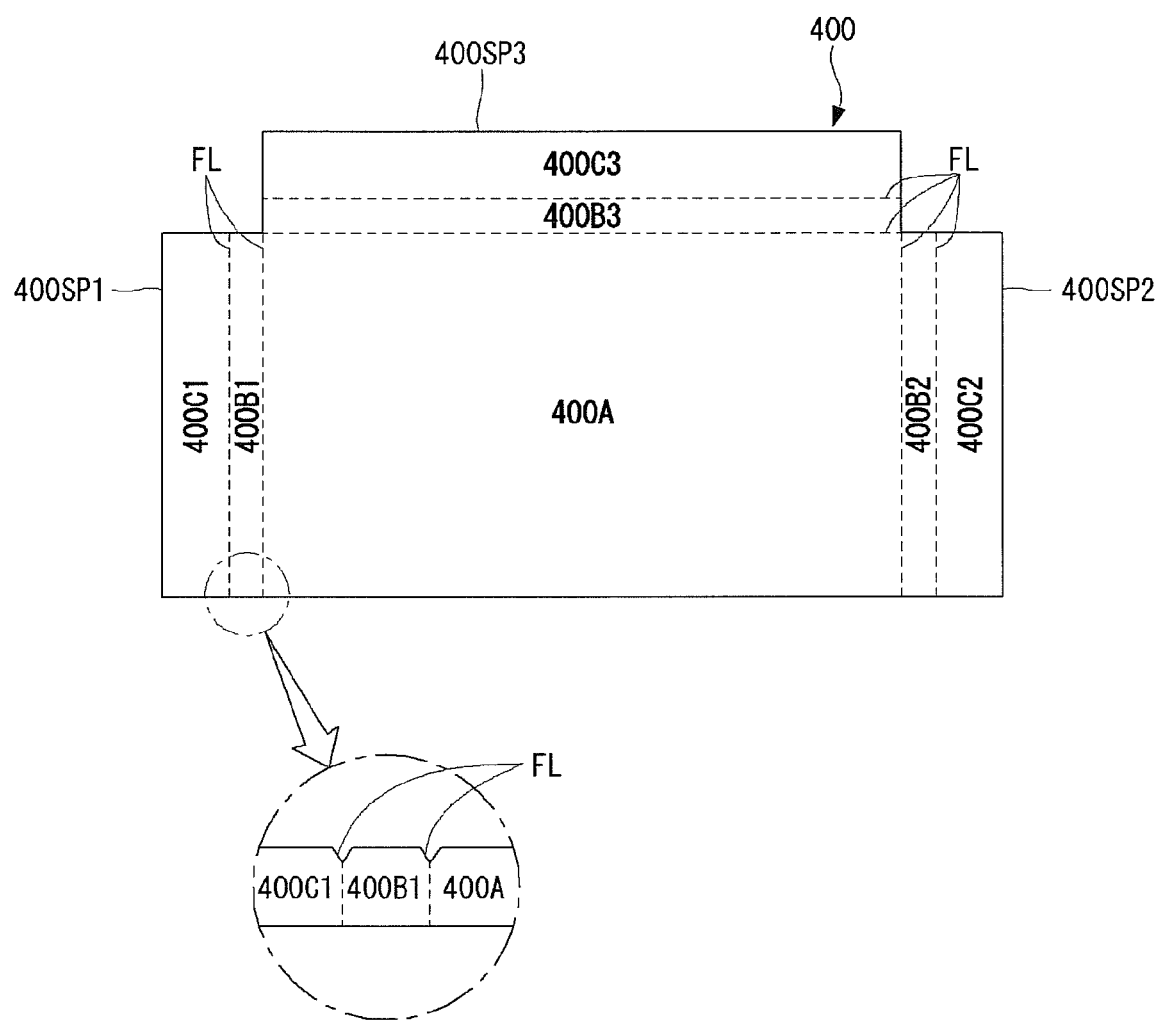

For example, as shown in FIG. 44, one surface of the supporting film 400 may be cut by a predetermined depth to form one or more folding lines FL. The supporting film 400 may be divided into the attachment part 400A, the side portions 400B1, 400B2, and 400B3, and the back portions 400C1, 400C2, and 400C3 by folding the supporting film 400 along the folding lines FL. The folding lines FL may be formed using a laser cutting method.

Figure 45:
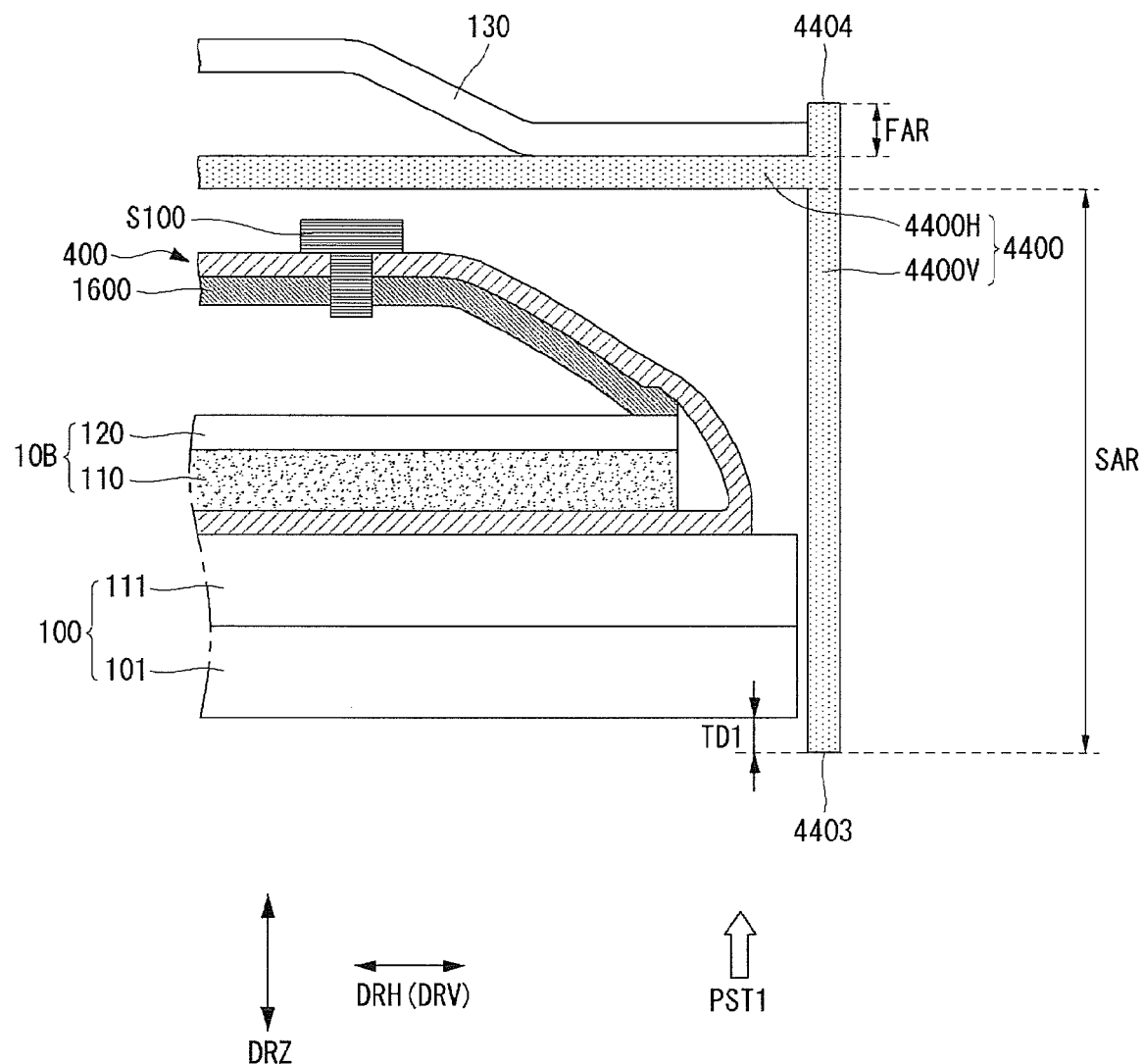
Figure 46:
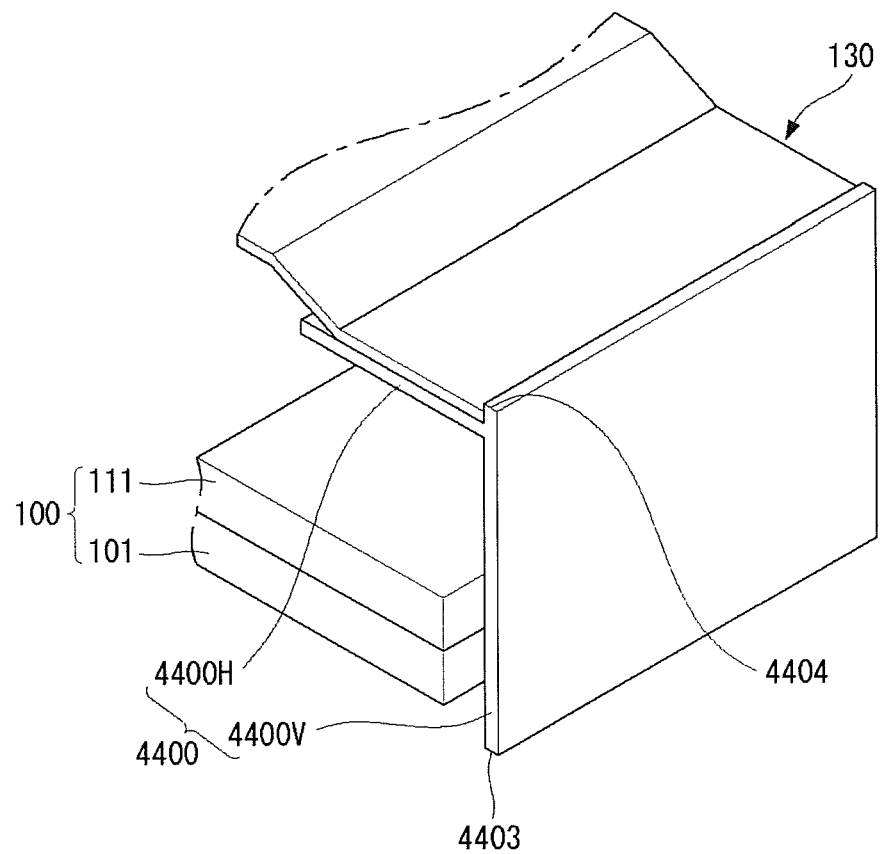
Figure 46:
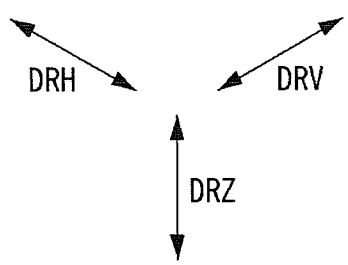

As shown in FIGS. 45 and 46, the display device may further include a side cover 4400 and attached to the back cover 130. A portion of the side cover 4400 may be positioned on the side of the display panel 100. The side cover 4400 may include a first portion 4400V extending in a width direction, i.e., a vertical direction (for example, a third direction DRZ) of the display panel 100 and a second portion 4400H extending from the first portion 4400V in a longitudinal direction, i.e., the horizontal direction (for example, the first direction DRH and/or the second direction DRV) of the display panel 100. The first portion 4400V of the side cover 4400 may be referred to as a vertical portion, and the second portion 4400H may be referred to as a horizontal portion of the side cover 4400. The side cover 4400 may prevent a foreign material, such as a dust, from entering into the display device and may protect the side of the display panel 100 from the damage.

The side cover 4400 may include a portion positioned between the back cover 130 and the display panel 100 in the second direction DRV. More specifically, the second portion 4400H of the side cover 4400 may be positioned between the back cover 130 and the display panel 100.

As described above, an edge of the front surface of the display panel 100 may be exposed with the back cover 130 connected to the side cover 4400. Exposure of the edge of the front surface of the display panel 100 may mean that an edge of a front surface of the front polarizing film 3400 attached to the front substrate 101 of the display panel 100 may also be exposed. Alternatively, the exposure of the edge of the front surface of the display panel 100 may mean that an edge of a front surface of the front substrate 101 is exposed.

In this instance, when a viewer in front of the display panel 100, for example, at a first position PST1 watches the display panel 100, most of the edge of the front surface of the display panel 100 may be visible. Therefore, an attractive appearance of the display device may be provided. Further, a visual effect, in which the viewer may feel that the screen size of the display panel 100 is greater than the actual screen size of the display panel 100 may be achieved.

The first portion 4400V of the side cover 4400 may include a first end portion 4403 positioned close to the display panel 100 and a second end portion 4404 opposite the first end portion 4403. The second end portion 4404 may be positioned close to the back cover 130. The second portion 4400H of the side cover 4400 may be positioned adjacent to the second end portion 4404 of the first portion 4400V. The second portion 4400H of the side cover 4400 may be separated from the second end portion 4404 of the first portion 4400V by a predetermined distance in the second direction DRV. Hence, a rim in which the back cover 130 is received may be provided between the second portion 4400H of the side cover 4400 and the second end portion 4404 of the first portion 4400V.

In other words, the first portion 4400V of the side cover 4400 may include a first area FAR positioned between the second end portion 4404 of the first portion 4400V and the second portion 4400H in the second direction DRV, and a second area SAR positioned between the first end portion 4403 of the first portion 4400V and the second portion 4400H in the second direction DRV. In this instance, the back cover 130 may be positioned in the first area FAR of the first portion 4400V.

Further, the first portion 4400V of the side cover 4400 may include a portion which is longer than the display panel 100 by a predetermined distance TD1 in the second direction DRV. Hence, the side cover 4400 may more efficiently protect the display panel 100. Even in this instance, the edge of the front surface of the display panel 100 may be exposed.

Figure 47:
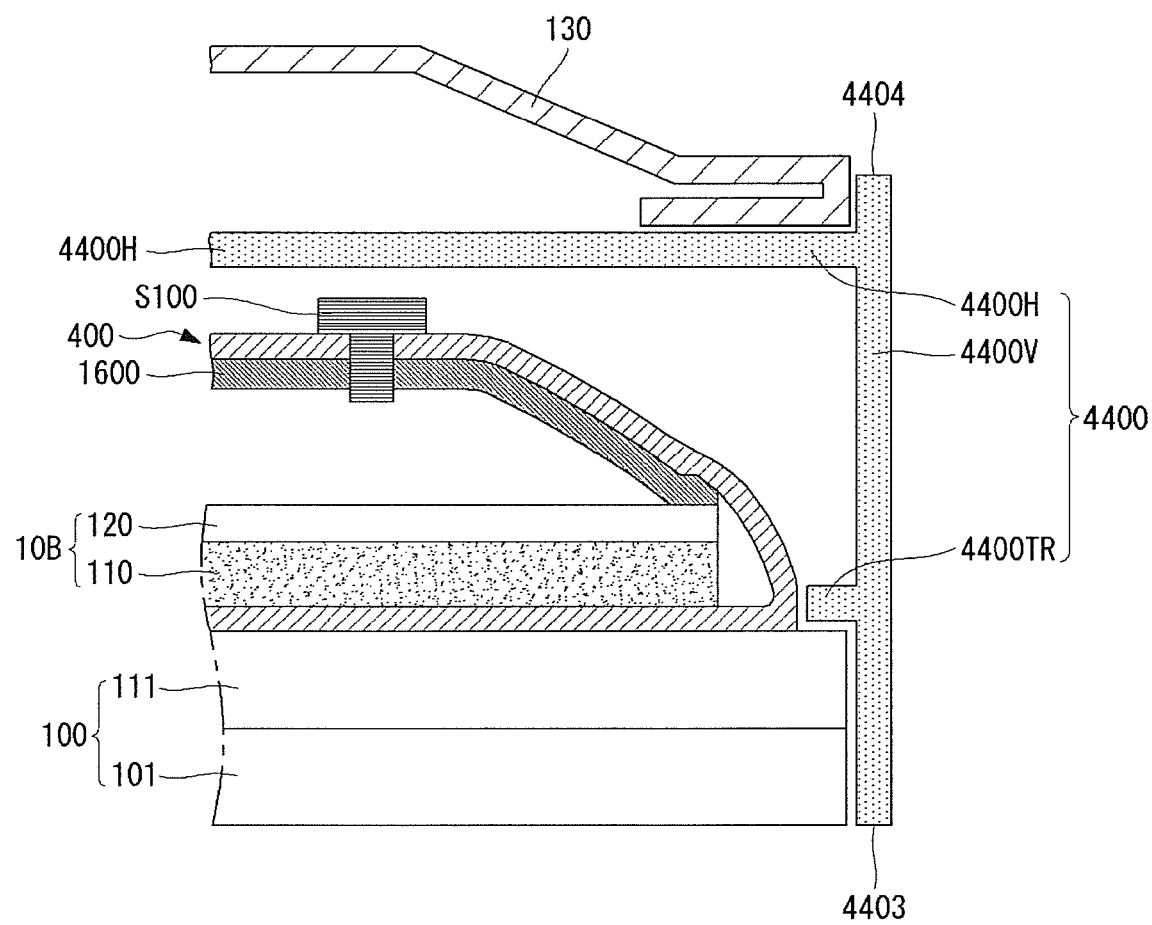

As shown in FIG. 47, the first portion 4400V of the side cover 4400 may include a protrusion 4400TR protruding toward the middle of the display panel 100. The protrusion 4400TR may prevent light from leaking into a space between the display panel 100 and the side cover 4400. The protrusion 4400TR may be positioned between the first end portion 4403 of the first portion 4400V of the side cover 4400 and the second portion 4400H.

Figure 48:
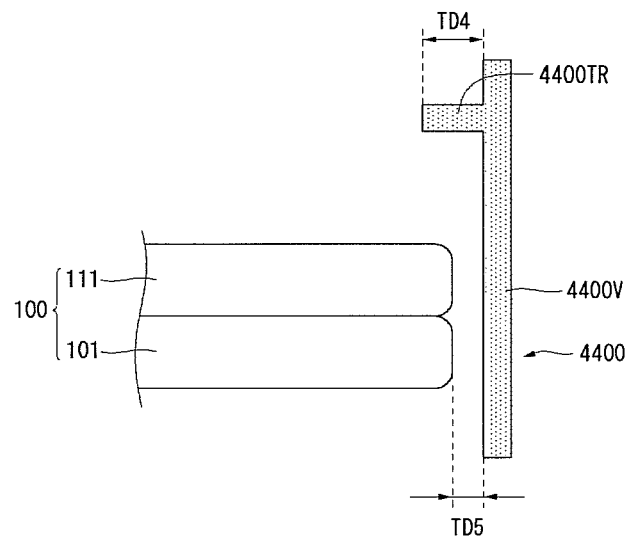

As shown in FIG. 48, a length TD4 of the protrusion 4400TR may be greater than a distance TD5 between the display panel 100 and the side cover 4400 in the horizontal direction.

Figure 49:
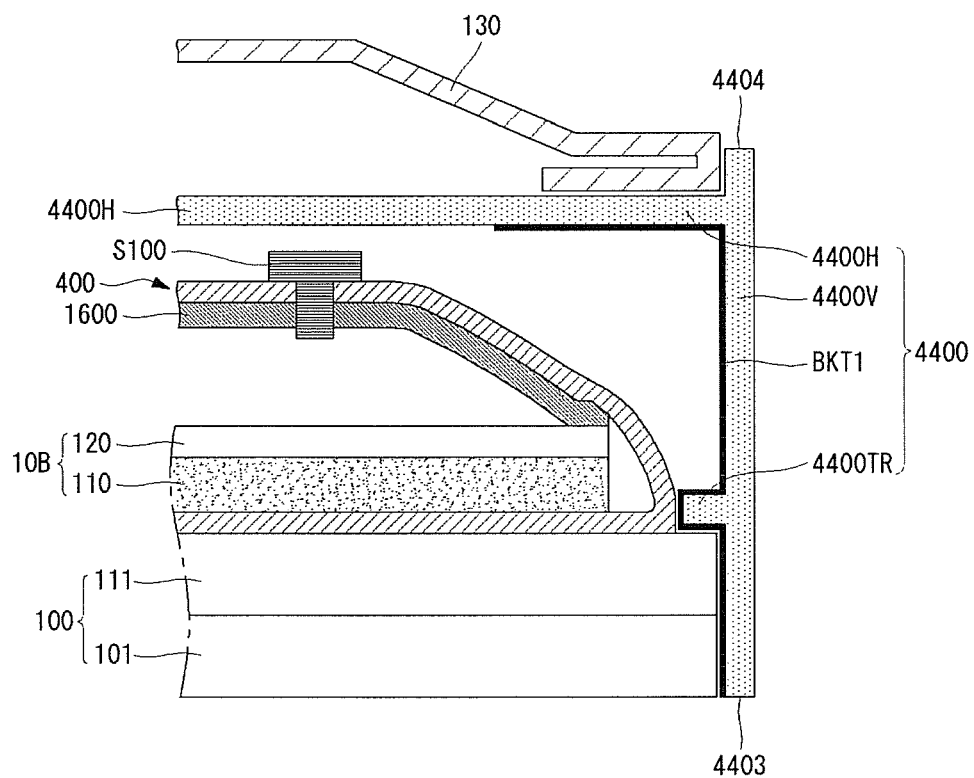

As shown in FIG. 49, a first black layer BKT1 may be formed on an inner surface of the side cover 4400. The first black layer BKT1 may be, for example, a black tape and/or a black paint. The first black layer BKT1 may prevent light from leaking into a space between the side cover 4400 and the side of the display panel 100.

Figure 50:
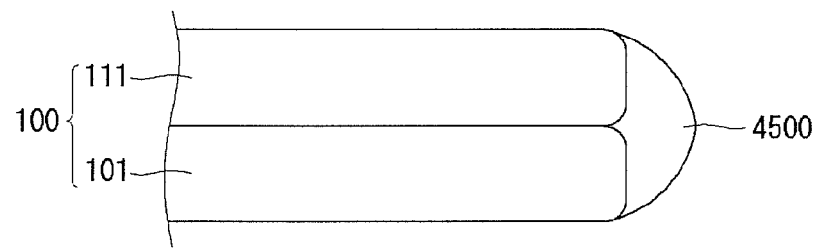

As shown in FIG. 50, a protective layer 4500 may be formed on the side of the display panel 100. The protective layer 4500 may protect the sides of the front substrate 101 and the back substrate 111 of the display panel 100 from an external force and an impact. The protective layer 4500 may be formed of a substantially transparent material. Further, the protective layer 4500 may be formed of a photocurable material which is cured by light, such as ultraviolet rays. As described above, when the protective layer 4500 is formed on the side of the display panel 100, the protective layer 4500 may be positioned between the side cover 4400 and the display panel 100.

Figure 51:
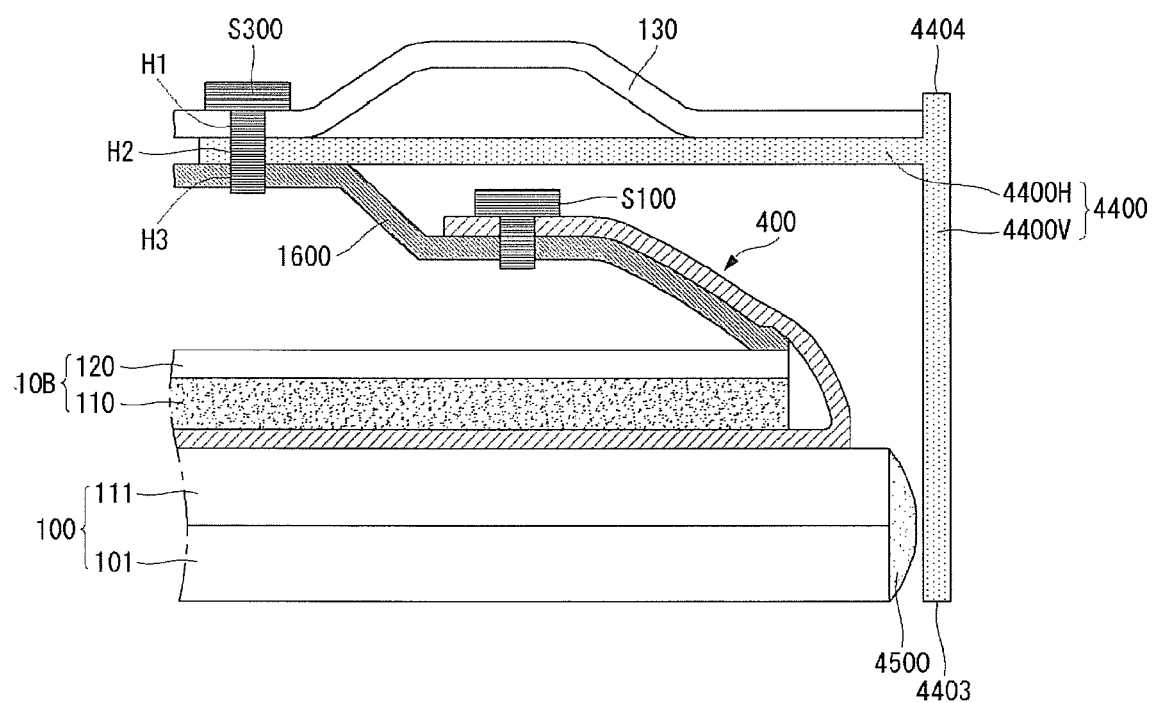

As shown in FIG. 51, the third fastener S300 may fasten the side cover 4400 to the back cover 130. Further, the third fastener S300 may fasten the back cover 130, the side cover 4400, and the frame 1600 to one another.

For this, the back cover 130 may include a first hole H1, the second portion 4400H of the side cover 4400 may include a second hole H2, and the frame 1600 may include a third hole H3. The third fastener S300 may pass through the first, second, and third holes H1, H2, and H3 to fasten the back cover 130, the side cover 4400, and the frame 1600 to one another.

Figure 52:
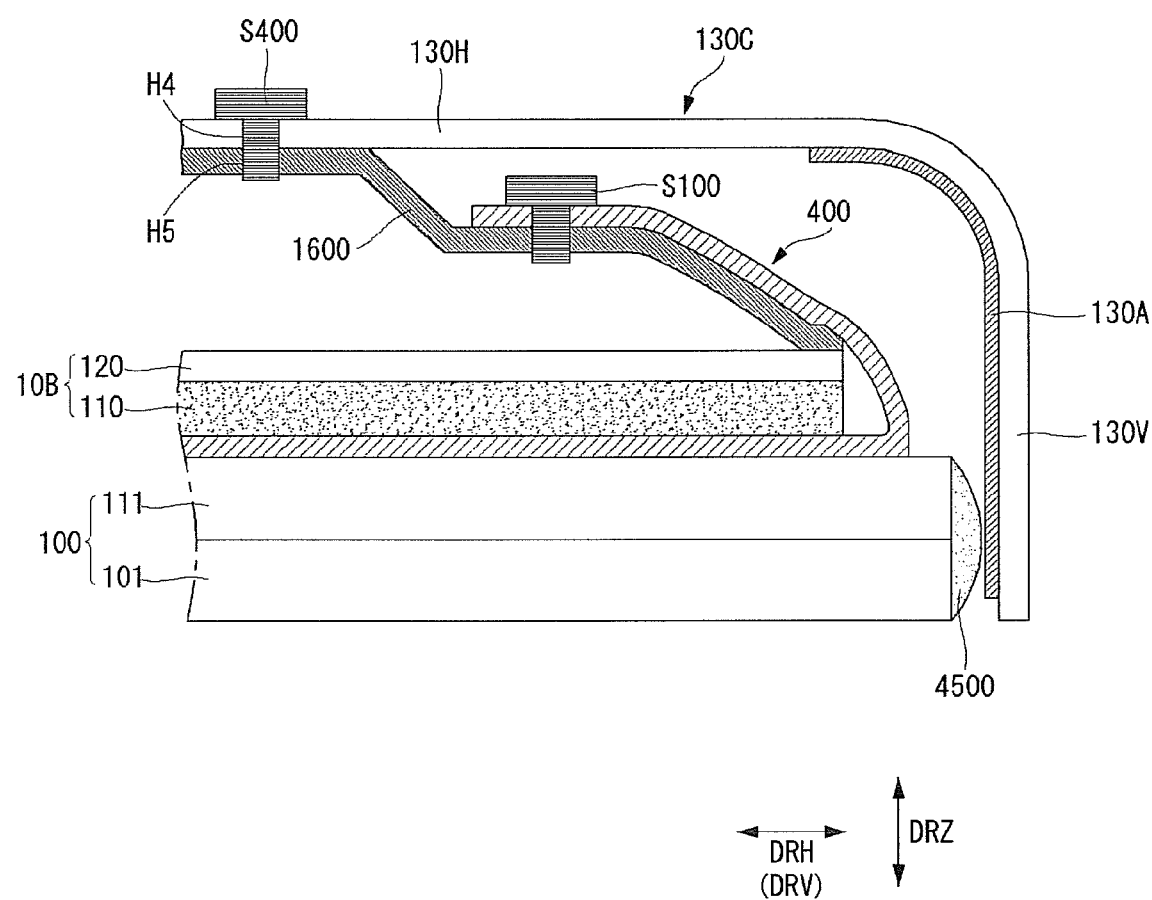

In certain embodiments, the back cover 130 and the side cover 4400 may be integrated into one structure. For example, as shown in FIG. 52, an integrated back cover 130C may include a portion positioned on the back surface of the frame 1600 and a portion positioned on the side of the display panel 100. The integrated back cover 130C may include a vertical portion 130V extending in the second direction DRV and a horizontal portion 130H which is connected to the vertical portion 130V and extends in the first direction DRH.

The horizontal portion 130H of the integrated back cover 130C may be connected to the frame 1600 by a fourth fastener S400. For this, the integrated back cover 130C may include a fourth hole H4, and the frame 1600 may include a fifth hole H5. The fourth fastener S400 may pass through the fourth and fifth holes H4 and H5 to fasten the integrated back cover 130C to the frame 1600.

A buffer layer 130A may be formed on an inner surface of the integrated back cover 130C. The buffer layer 130A may be formed of a material having elasticity. For example, the buffer layer 130A may be formed of a sponge material. The buffer layer 130A may have a dark color. The buffer layer 130A may be implemented as, for example, a black tape.

Figure 53:
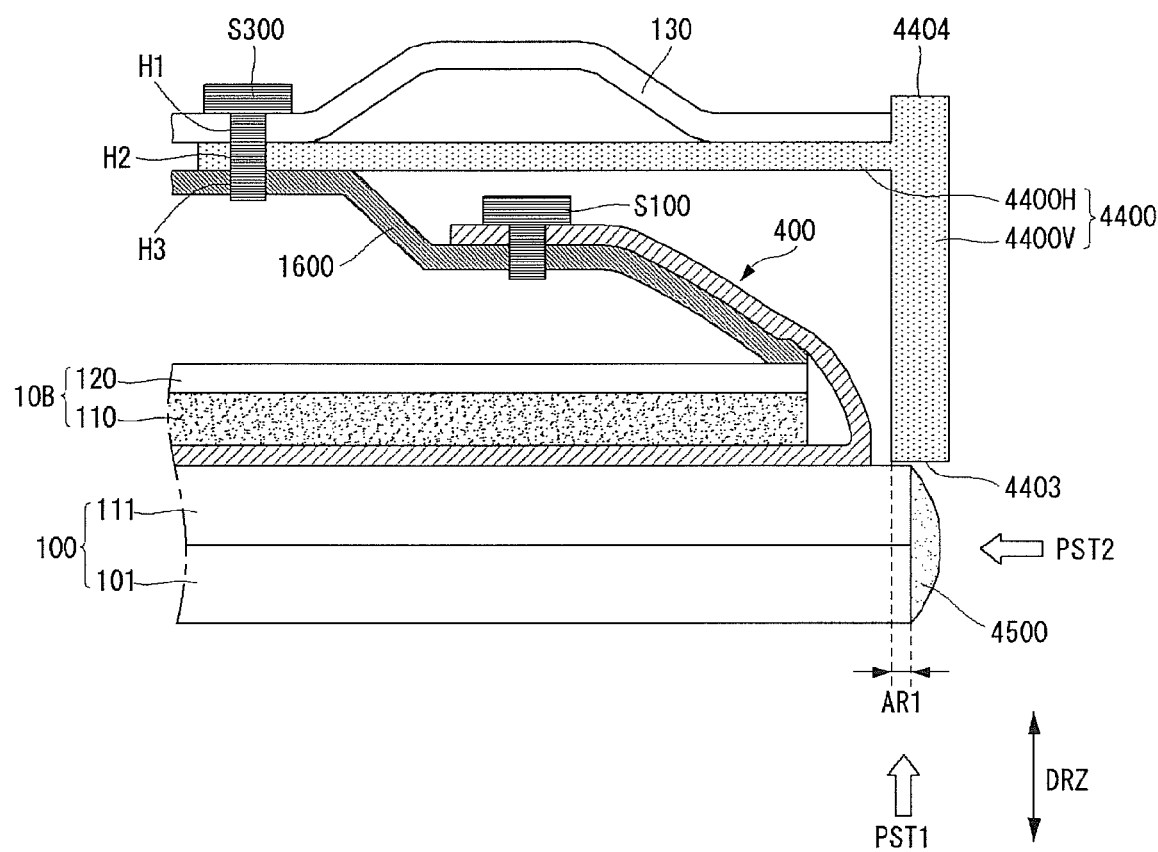

As shown in FIG. 53, the first portion 4400V of the side cover 4400 may overlap a predetermined area AR1 of the display panel 100 in the vertical direction DRZ. In this instance, the side surface of the display panel 100 as well as the edge of the front surface of the display panel 100 may be exposed. When a viewer in the front of the display panel 100, for example, at a first position PST1 watches the display panel 100, most of the edge of the front surface of the display panel 100 may be visible. Further, when the viewer at the side of the display panel 100, for example, at a second position PST2 watches the display panel 100, most of the side of the display panel 100 may be visible. In other words, when the viewer views the display panel 100 from the second position PST2, the viewer may view the protective layer 4500 positioned on the side of the display panel 100.

The first portion 4400V of the side cover 4400 may include a portion having different thicknesses.

Figure 54:
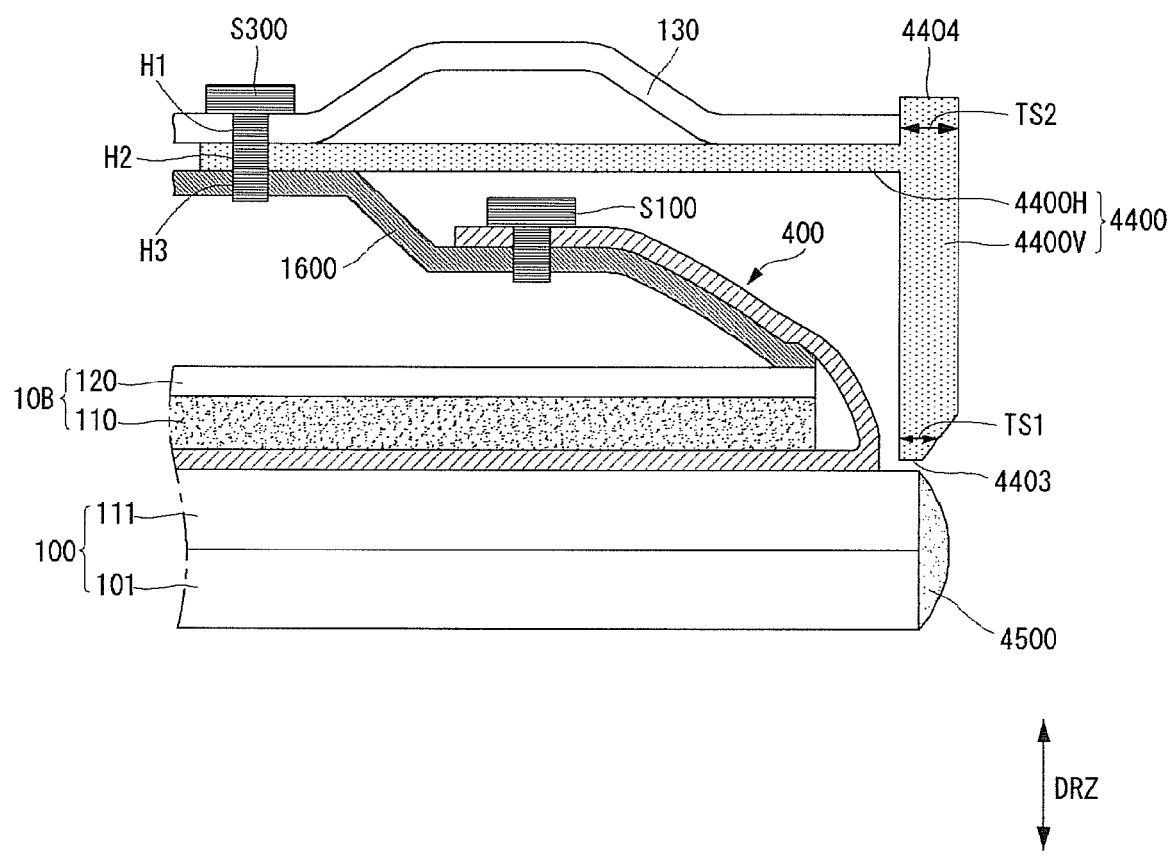

For example, as shown in FIG. 54, the first portion 4400V of the side cover 4400 may include a portion having a gradually decreasing width as it approaches the front surface of the display panel 100. More specifically, in certain embodiments, a width TS1 of the first end portion 4403 of the first portion 4400V of the side cover 4400 may be less than a width TS2 of the second end portion 4404. In this instance, a visual effect, in which the viewer in front of the display panel 100 may feel that the size of the edge of the display panel 100 is less than the actual size of the edge of the display panel 100, may be achieved. Further, the rigidity of the side cover 4400 may be improved.

Figure 55:
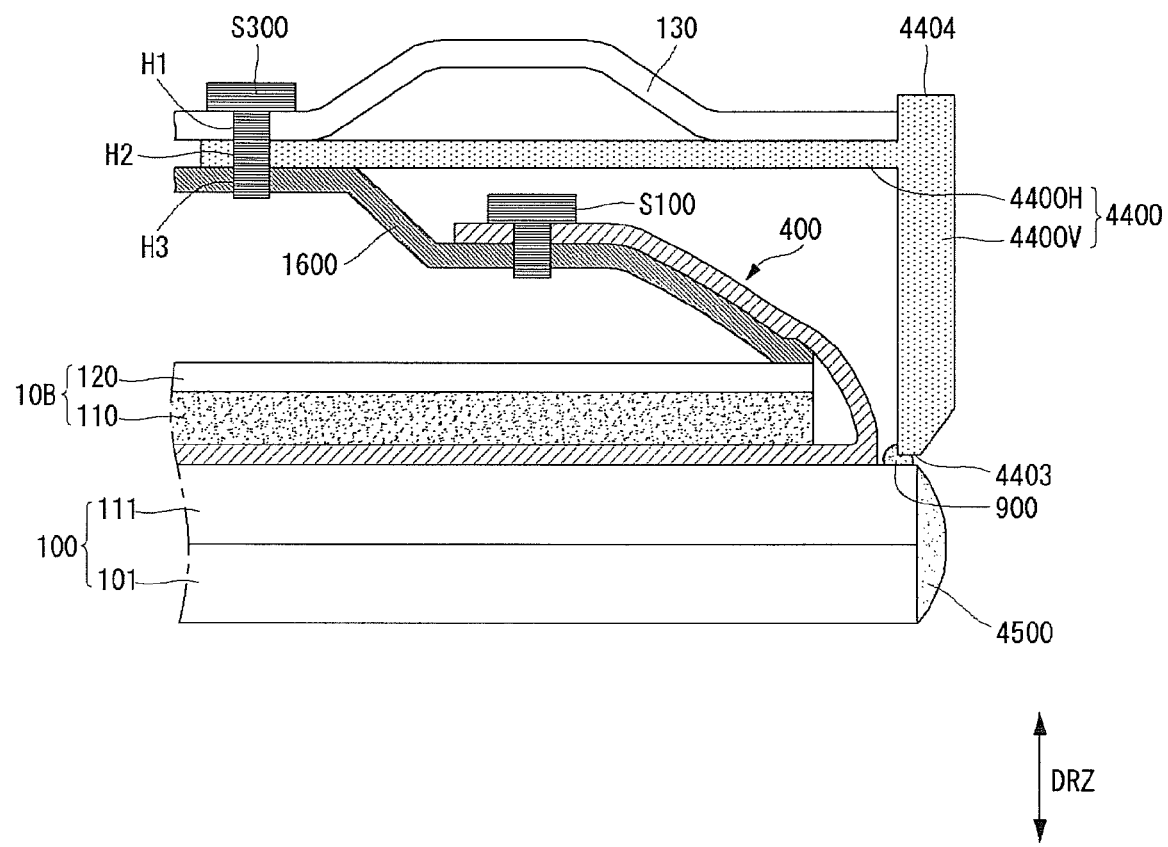

As shown in FIG. 55, a buffer layer 990 may be disposed between the display panel 100 and the first portion 4400V of the side cover 4400. More specifically, the buffer layer 990 may be disposed between the first end portion 4403 of the first portion 4400V of the side cover 4400 and the back substrate 111 of the display panel 100. The buffer layer 990 may prevent light inside the display device from leaking to the outside and may prevent foreign material, such as dust, from entering into the display device. The buffer layer 990 may be formed of a material having flexibility. For example, the buffer layer 990 may be formed of a resin material, a silicon material, a sponge material, and the like.

Figure 56A:
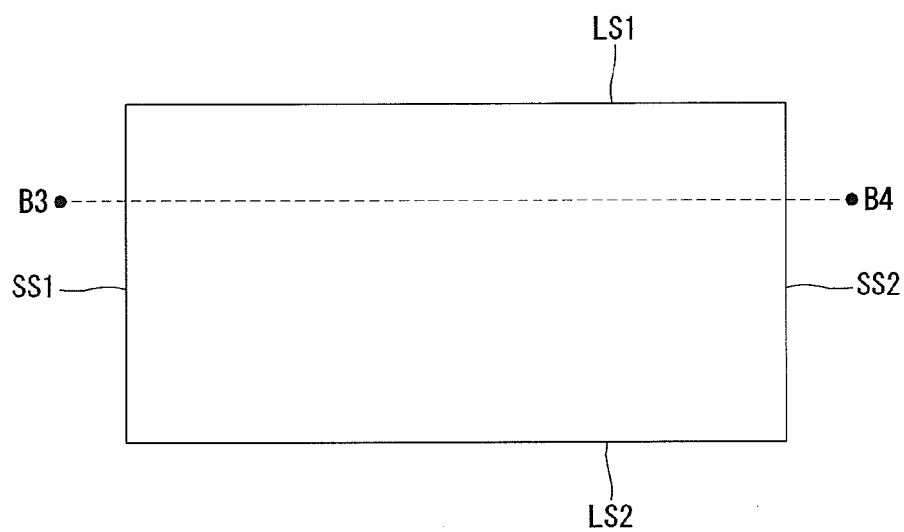
Figure 56B:
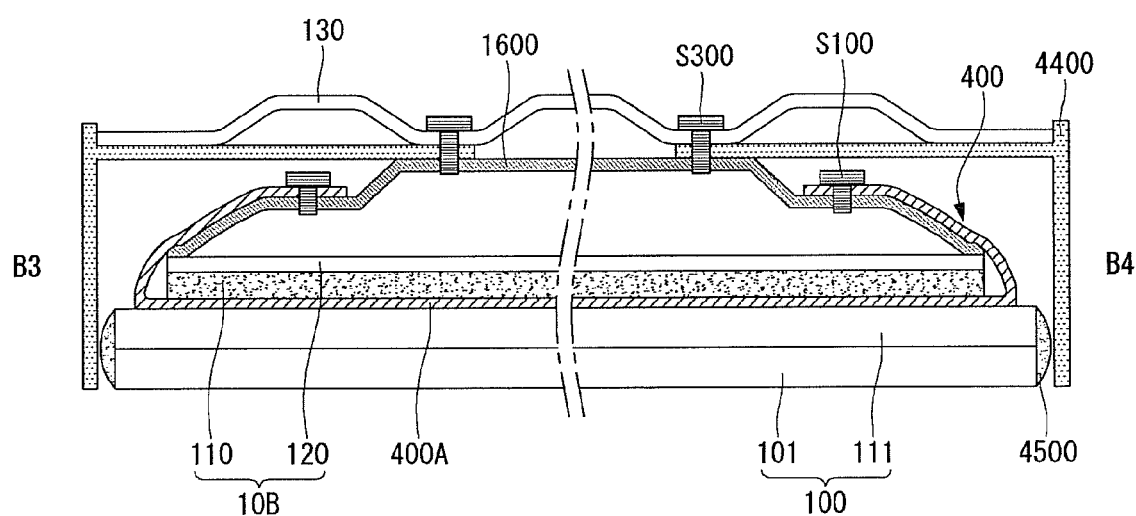

As shown in FIG. 56B, which is a cross-sectional view taken along line B3-B4 of FIG. 56A in a transverse direction of the display panel 100, side covers 4400 may be respectively positioned on two opposite sides of the display panel 100.

Figure 57A:
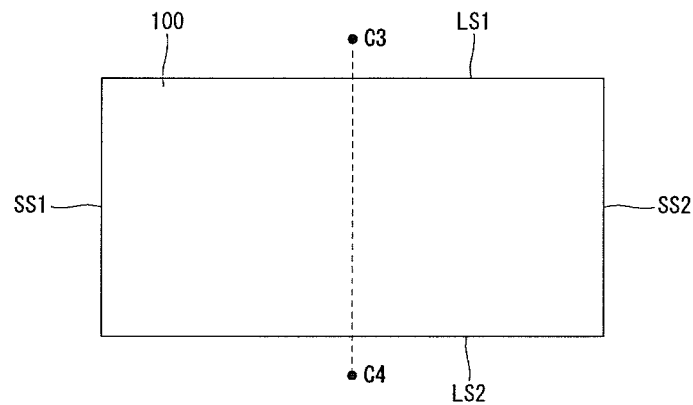
Figure 57B:
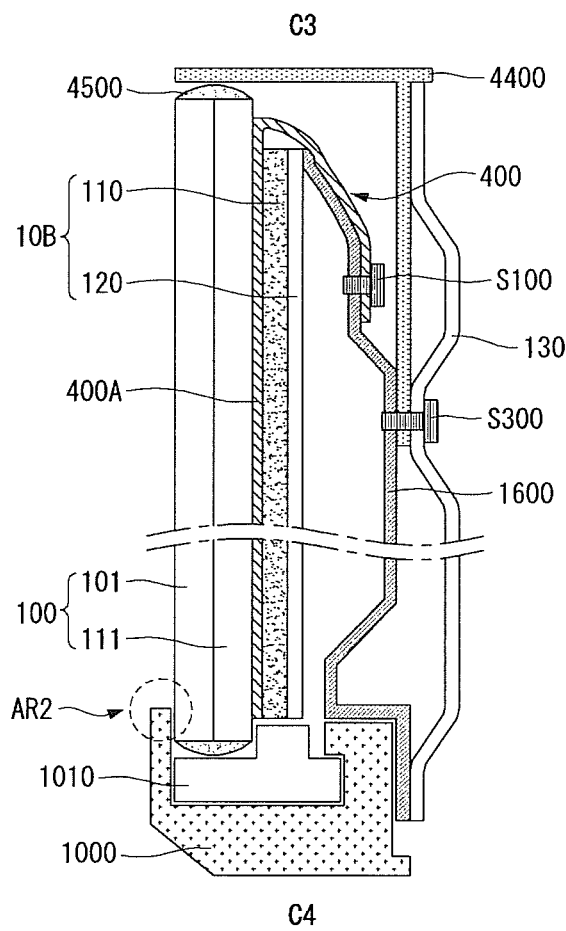

As shown in FIG. 57B, which is a cross-sectional view taken along line C3-C4 of FIG. 57A in a longitudinal direction of the display panel 100, the side cover 4400 may be positioned on one side of the display panel 100, and a bottom cover 1000 may be positioned on the other side of the display panel 100. The bottom cover 1000 may cover a portion (i.e., a predetermined area AR2) of the front surface of the display panel 100.

More specifically, as shown in FIGS. 56A-56B and 57A-57B, the edge of the front surface of the display panel 100 may be exposed at the first short side SS1, the second short side SS2, and the first long side LS1 of the display panel 100. The edge of the front surface of the display panel 100 may be covered by the bottom cover 1000 at the second long side LS2 of the display panel 100.

The display device according to embodiment as broadly described herein may further include a bottom guide 1010. The bottom guide 1010 may be positioned between the bottom cover 1000 and at least one of the display panel 100, the light source module 120, or the optical layer 110. The bottom guide 1010 may support at least one of the display panel 100, the light source module 120, or the optical layer 110. The bottom cover 1000 may be connected to the frame 1600 and the back cover 130.

A method for integrating the side cover 4400 and the back cover 130 into the integrated back cover 130C is described below with reference to FIG. 58.

Figure 58A:
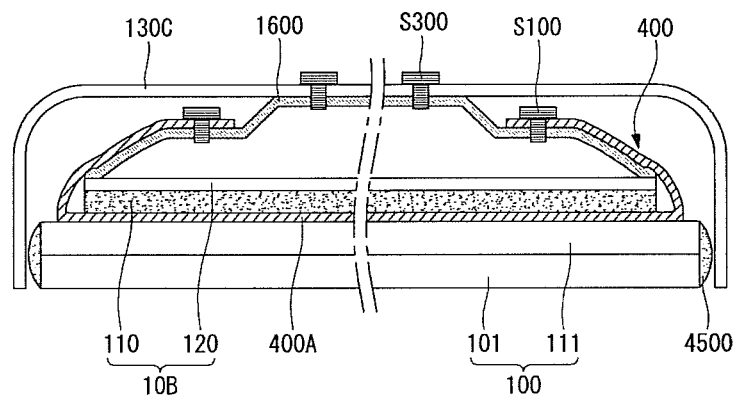
Figure 58B:
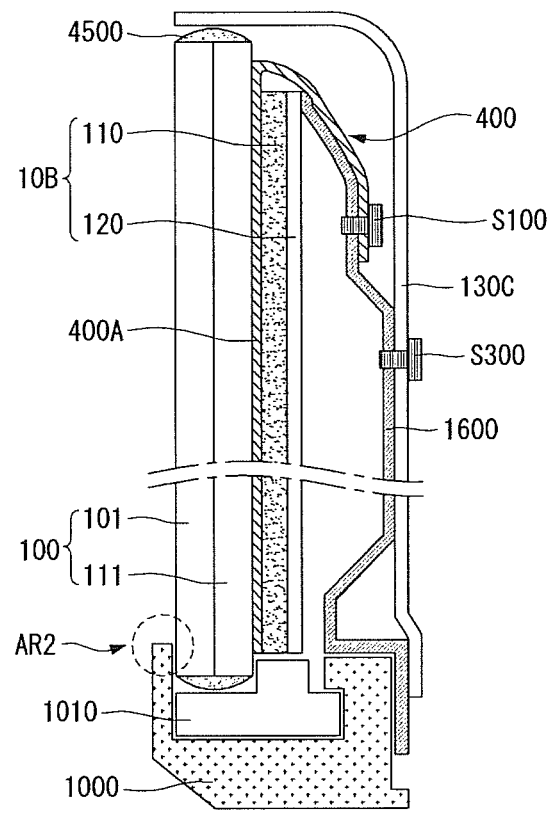

As shown in FIG. 58A, in the cross section of the display panel 100 taken along the line B3-B4 shown in FIG. 56A in the transverse direction of the display panel 100, both sides of the display panel 100 may be covered by the integrated back cover 130C. Further, as shown in FIG. 58B, in the cross section of the display panel 100 taken along the line C3-C4 shown in FIG. 57A in the longitudinal direction of the display panel 100, the integrated back cover 130C may be positioned on one side of the display panel 100, and the bottom cover 1000 may be positioned on the other side of the display panel 100.

FIGS. 59 to 70 illustrate a configuration of a display device including a pressure plate.

Figure 59:
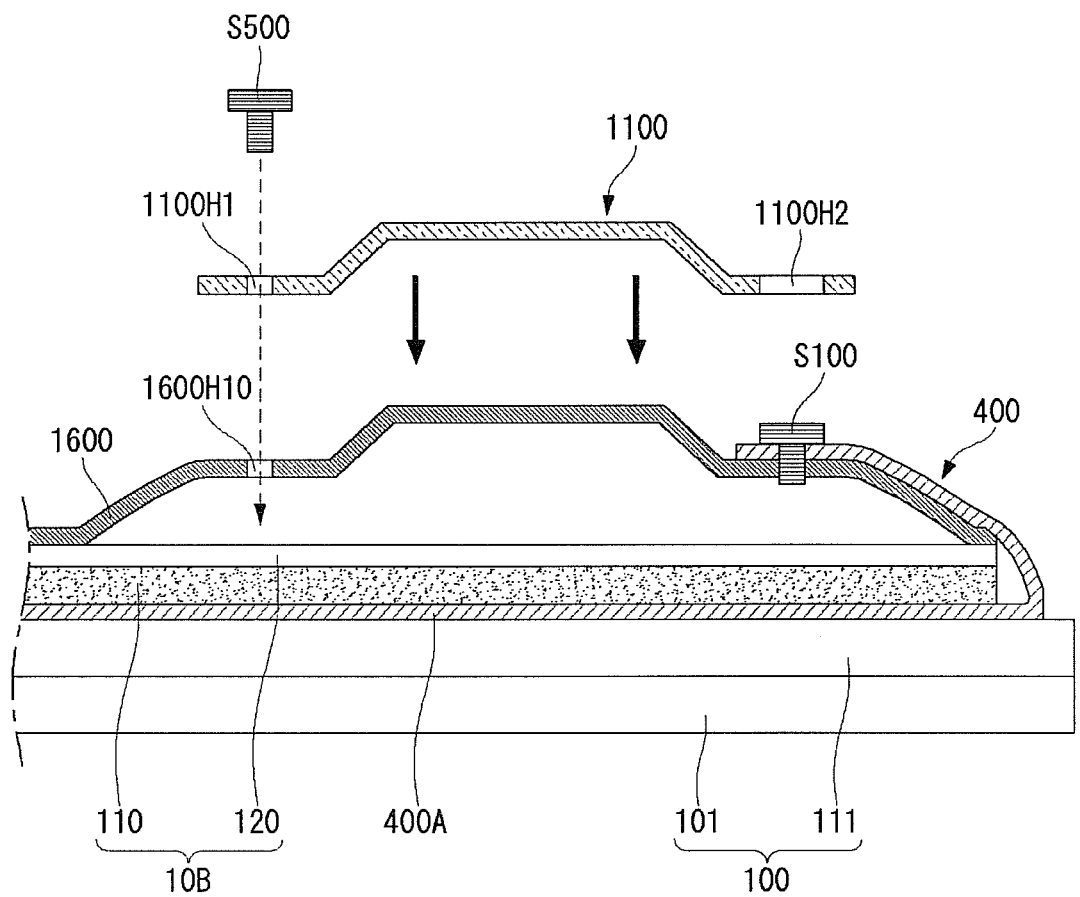
FIGS. 59 to 70 illustrate a configuration of a display device to which a pressure plate is applied, in accordance with embodiments as broadly described herein.

As shown in FIG. 59, a display device according to an embodiment as broadly described herein may include a pressure plate 1100 connected to the frame 1600.

The first fastener S100 may fasten the supporting film 400 to the frame 1600. A fifth fastener S500 may fasten the pressure plate 1100 to the frame 1600. For this, the pressure plate 1100 may include a first pressure hole 1100H1, and the frame 1600 may include a tenth frame hole 1600H10. The fifth fastener S500 may pass through the first pressure hole 1100H1 and the tenth frame hole 1600H10 to fasten the pressure plate 1100 to the frame 1600.

The pressure plate 1100 may also include second pressure holes 1100H2 corresponding to the first fastener S100. Namely, the first fastener S100 may include a portion positioned inside the second pressure hole 1100H2. A head part of the first fastener S100 may be positioned inside the second pressure hole 1100H2.

Figure 60:
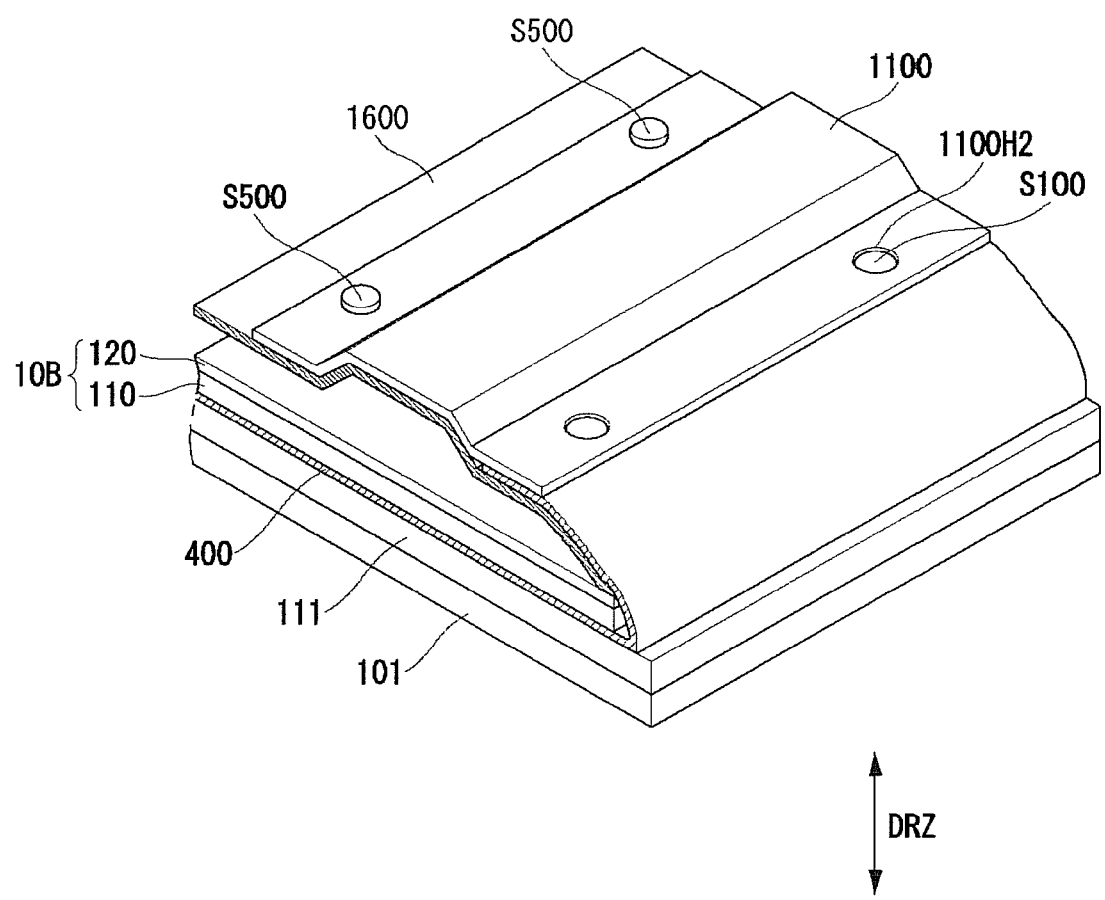

As shown in FIG. 60, attachment of the pressure plate 1100 in this manner may apply pressure to the supporting film 400, thereby firmly fixing the supporting film 400. The supporting film 400 may include a portion positioned between the pressure plate 1100 and the frame 1600. The first fastener S100 may be exposed through the second pressure hole 1100H2. In this instance, a diameter of the second pressure hole 1100H2 may be greater than a diameter of the head part of the first fastening member S100.

The pressure plate 1100 may include a depression 1100P3 which is depressed in a direction away from the display panel 100 or the frame 1600. The frame 1600 may include a depression 1600HW2 corresponding to the depression 1100P3 of the pressure plate 1100. The depression 1600HW2 may be depressed in a direction away from the display panel 100. If the supporting film 400 is disposed between the depression 1100P3 of the pressure plate 1100 and the depression 1600HW2 of the frame 1600, the supporting film 400 may be more efficiently supported.

Figure 61:
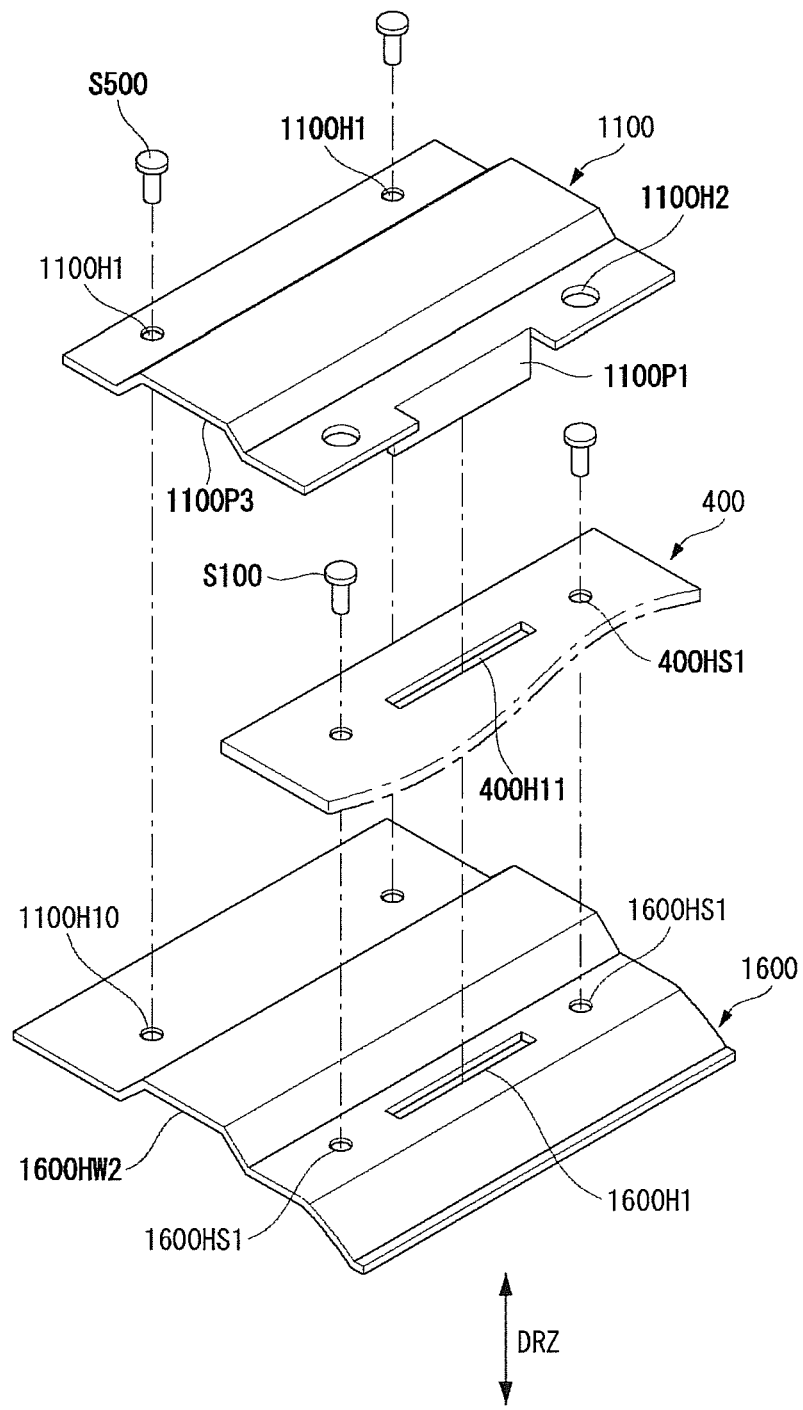

The pressure plate 1100 may include a protrusion protruding toward the display panel 100 or the frame 1600. Further, at least one of the supporting film 400 or the frame 1600 may include a hole corresponding to the protrusion. For example, as shown in FIG. 61, a protrusion 1100P1 protruding toward the display panel 100 or the frame 1600 may be formed along an end of the pressure plate 1100. The protrusion 1100P1 may be positioned between the second pressure holes 1100H2. The protrusion 1100P1 may be configured so that a portion of the end of the pressure plate 1100 is bent toward the display panel 100 or the frame 1600. The frame 1600 may include a first insertion hole 1600H1 corresponding to the protrusion 1100P1, and the supporting film 400 may include a second insertion hole 400H11 corresponding to the protrusion 1100P1.

Figure 62:
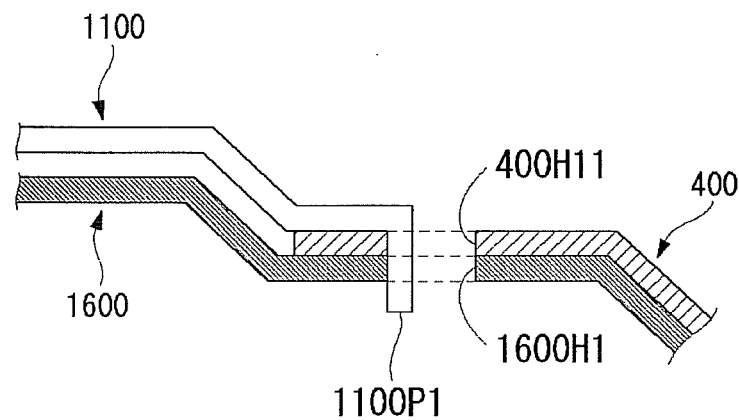

In this instance, as shown in FIG. 62, the protrusion 1100P1 of the pressure plate 1100 may pass through the first insertion hole 1600H1 of the frame 1600 and the second insertion hole 400H11 of the supporting film 400. This may provide more uniform support to the supporting film 400.

Figure 63:
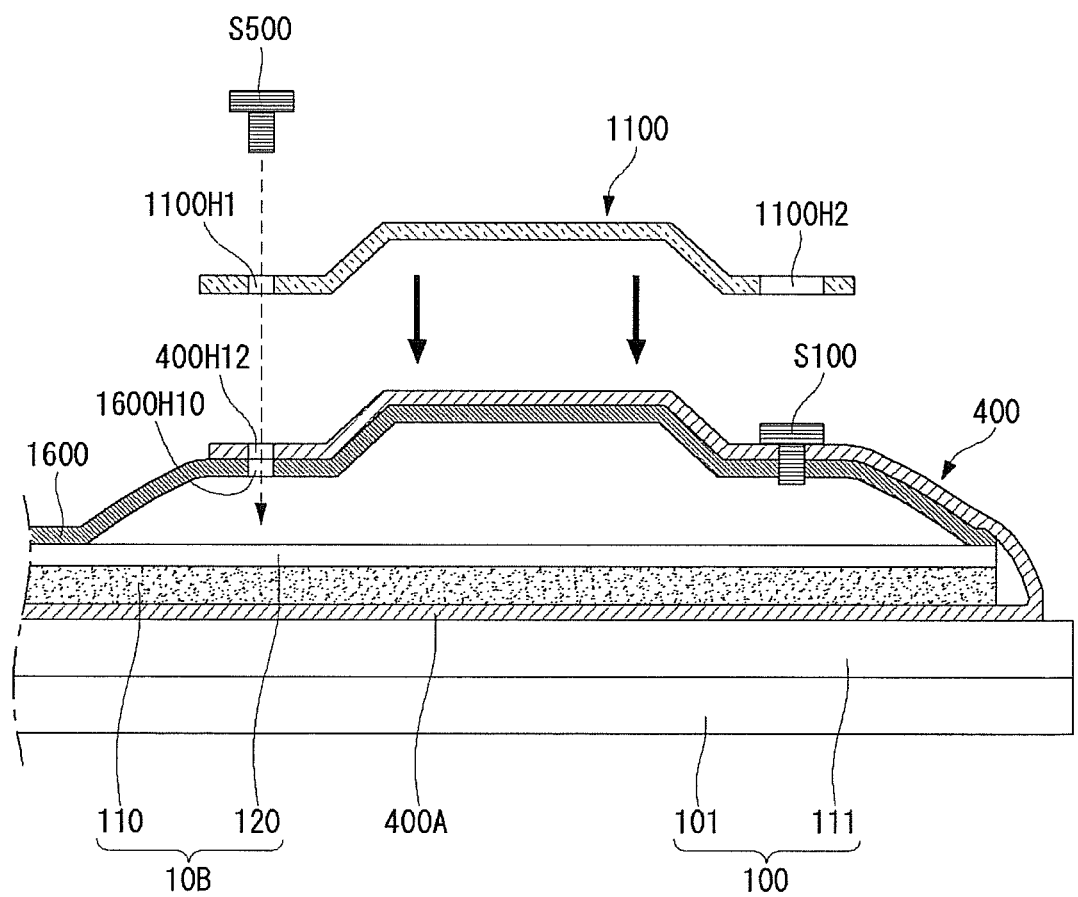

The frame 1600, the supporting film 400, and the pressure plate 1100 may be fastened to one another by a fastener. For example, as shown in FIG. 63, the pressure plate 1100 may include the first pressure hole 1100H1, the supporting film 400 may include a twelfth film hole 400H12 corresponding to the first pressure hole 1100H1, and the frame 1600 may include the tenth frame hole 1600H10. A fifth fastener S500 may pass through the first pressure hole 1100H1, the twelfth film hole 400H12, and the tenth frame hole 1600H10 to fasten the frame 1600, the supporting film 400, and the pressure plate 1100.

A method for mounting the pressure plate 1100 is described below.

Figure 64:
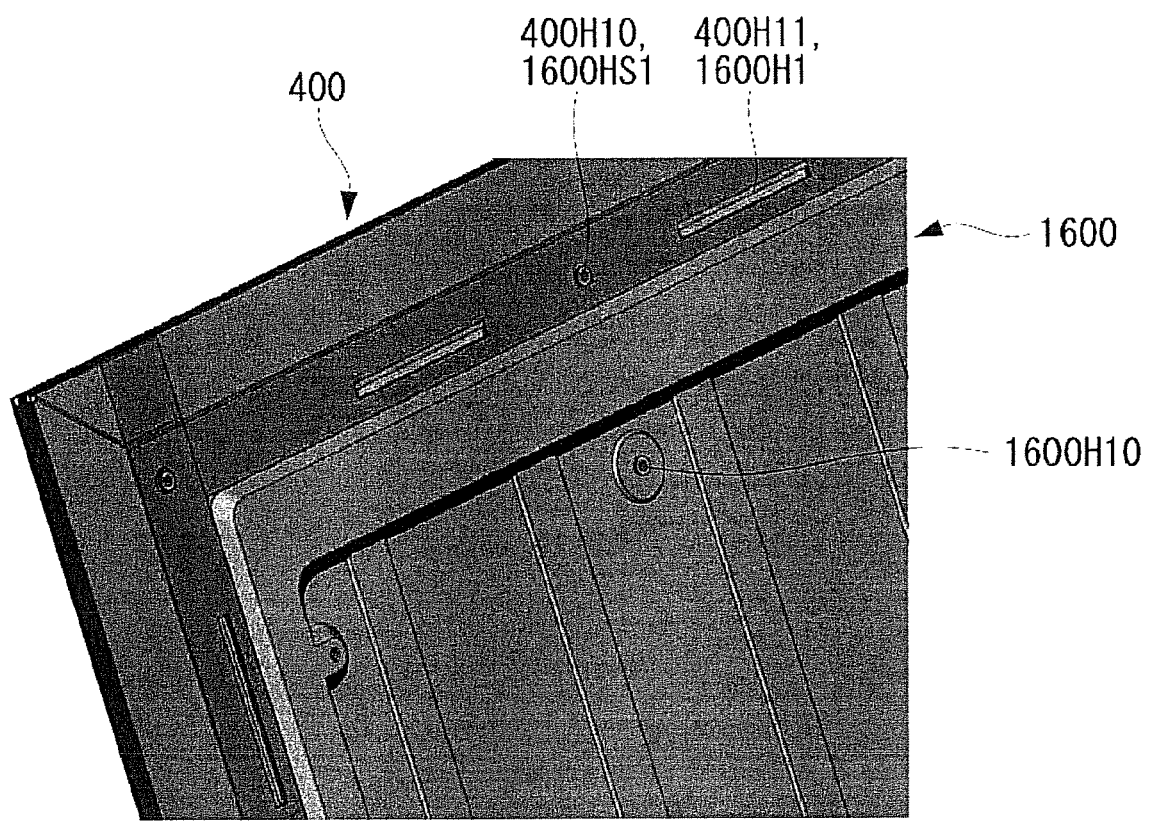

First, as shown in FIG. 64, the first film hole 400HS1 and the second insertion hole 400H11 may be formed in the supporting film 400, and the first frame hole 1600HS1, the first insertion hole 1600H1, and the tenth frame hole 1600H10 may be formed in the frame 1600. The supporting film 400 and the frame 1600 may then be aligned, so that the first film hole 400HS1 of the supporting film 400 corresponds to the first frame hole 1600HS1 of the frame 1600, and the second insertion hole 400H11 of the supporting film 400 corresponds to the first insertion hole 1600H1 of the frame 1600.

Figure 65:
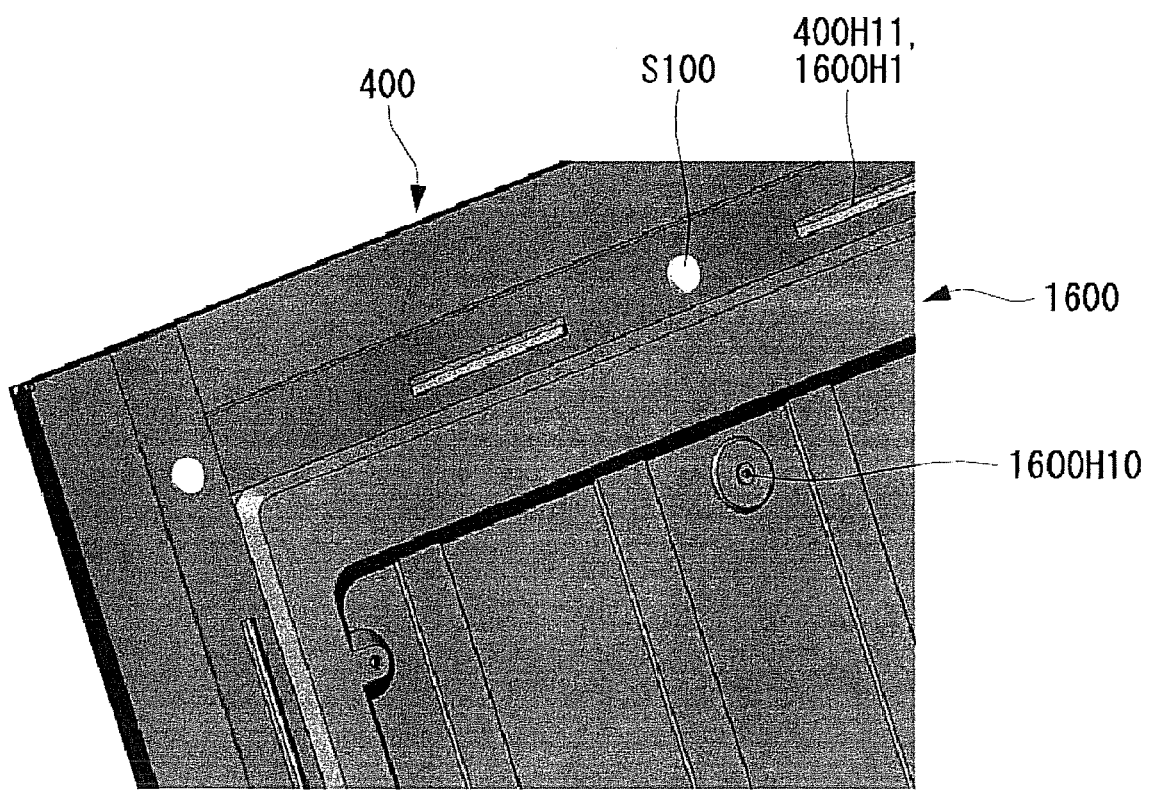

Next, as shown in FIG. 65, the first fastener S100 may be inserted into the first film hole 400HS1 of the supporting film 400 and the first frame hole 1600HS1 of the frame 1600, thereby fastening the supporting film 400 to the frame 1600.

Figure 66:
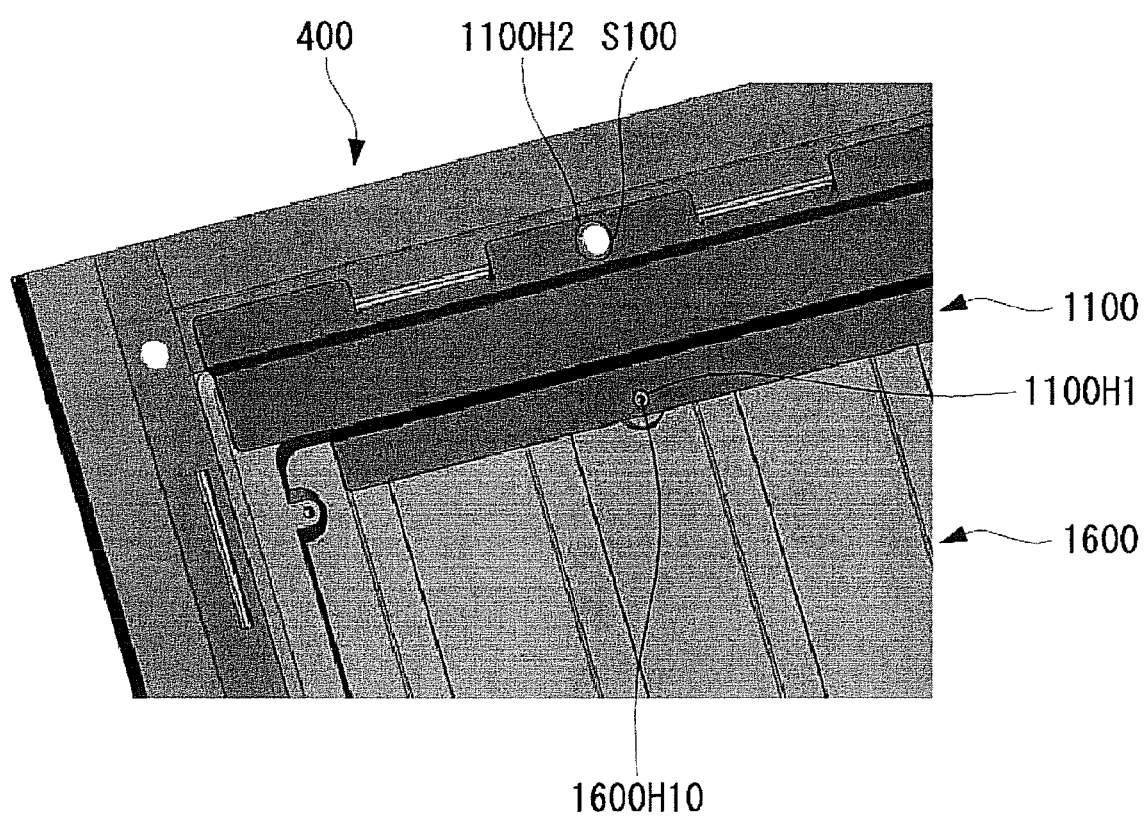

As shown in FIG. 66, the pressure plate 1100 may be disposed at a predetermined position. For example, the pressure plate 1100 may be aligned, so that the second pressure hole 1100H2 corresponds to the first fastening member S100, and the first pressure hole 1100H1 corresponds to the tenth frame hole 1600H10. The pressure plate 1100 may then be fixed to the frame 1600 using the fifth fastener S500.

Figure 67:
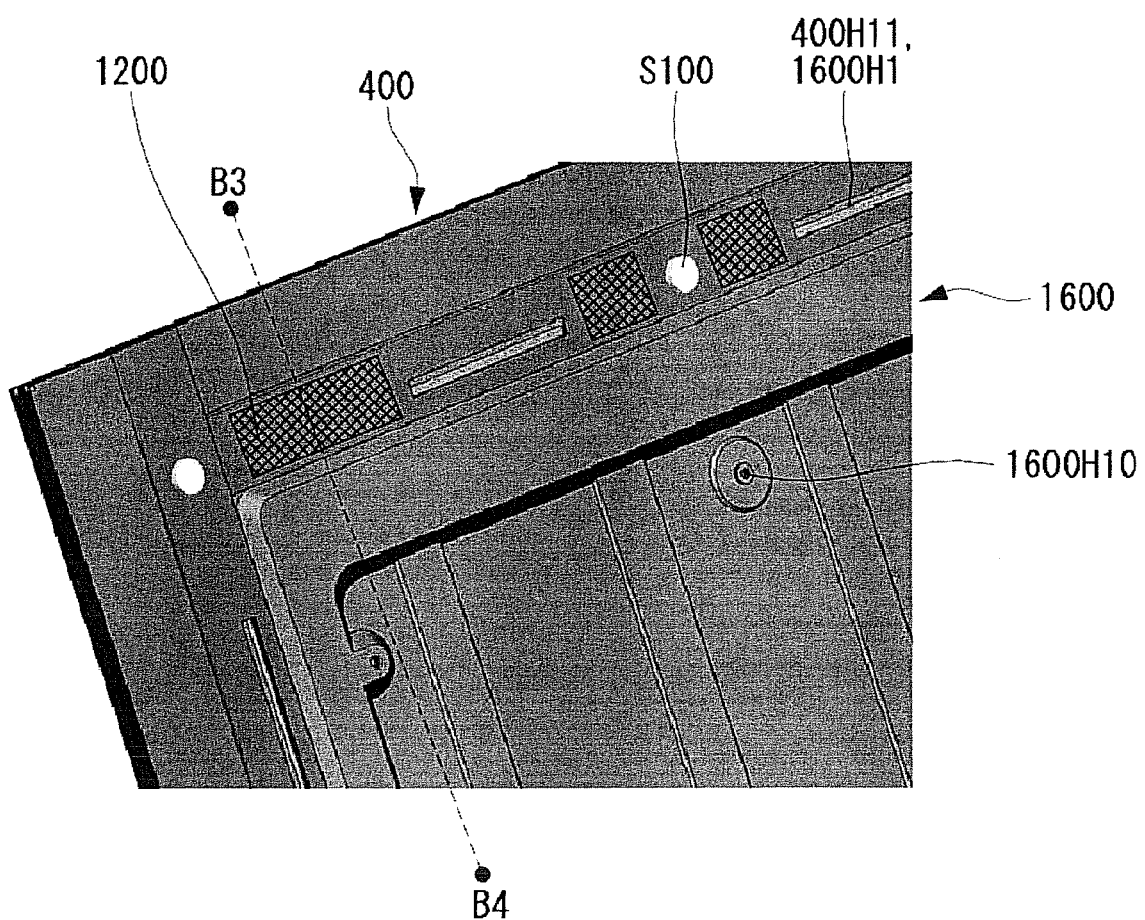

A buffer having elasticity may be formed between the pressure plate 1100 and the supporting film 400. The buffer may be formed of a material having elasticity and flexibility. For example, the buffer may be formed of a resin material, a silicon material, or a sponge material. For example, as shown in FIG. 67, a buffer 1200 formed of a material having elasticity may be formed in a partial area of the supporting film 400. FIG. 67 shows that the buffer 1200 is formed on the supporting film 400. However, the buffer 1200 may be formed on the pressure plate 1100.

Figure 68A:
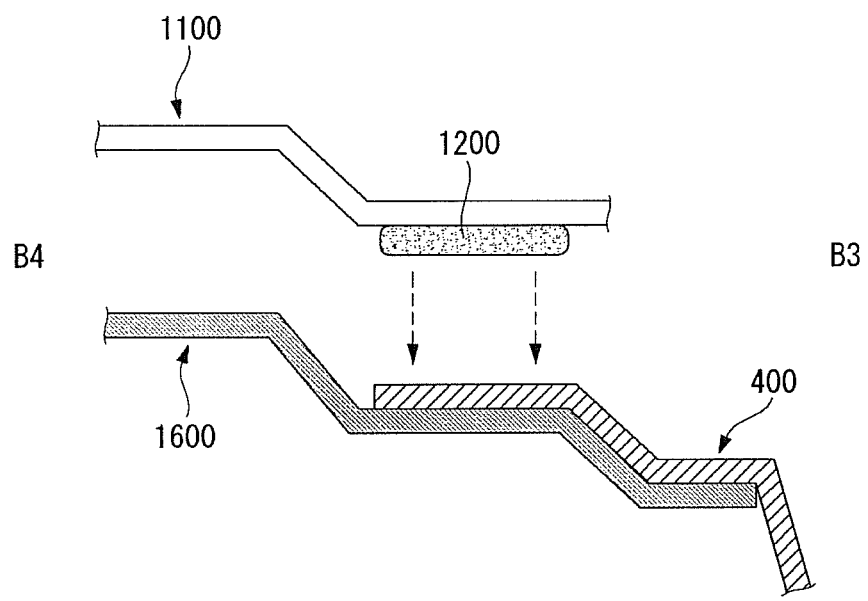
Figure 68B:
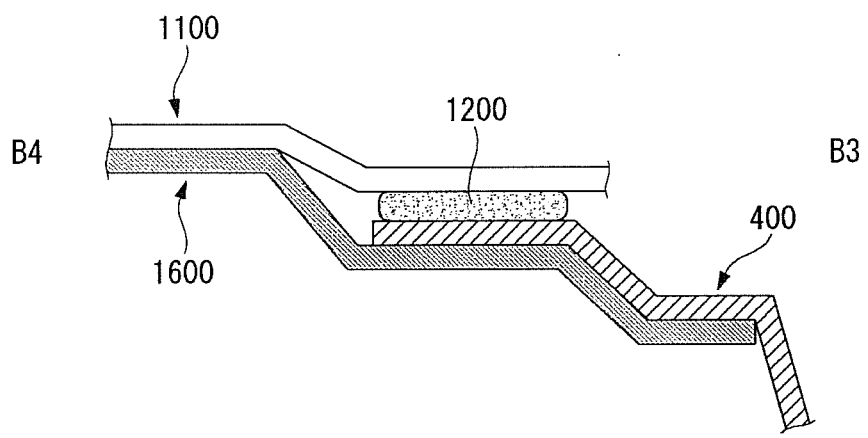

FIGS. 68A and 68B are cross-sectional views taken along line B3-B4 of FIG. 67.

As shown in FIG. 68A, the pressure plate 1100 may be coupled with the frame 1600, with the buffer 1200 is attached to the pressure plate 1100.

Hence, as shown in FIG. 68B, the buffer 1200 may uniformly press the supporting film 400.

Figure 69:
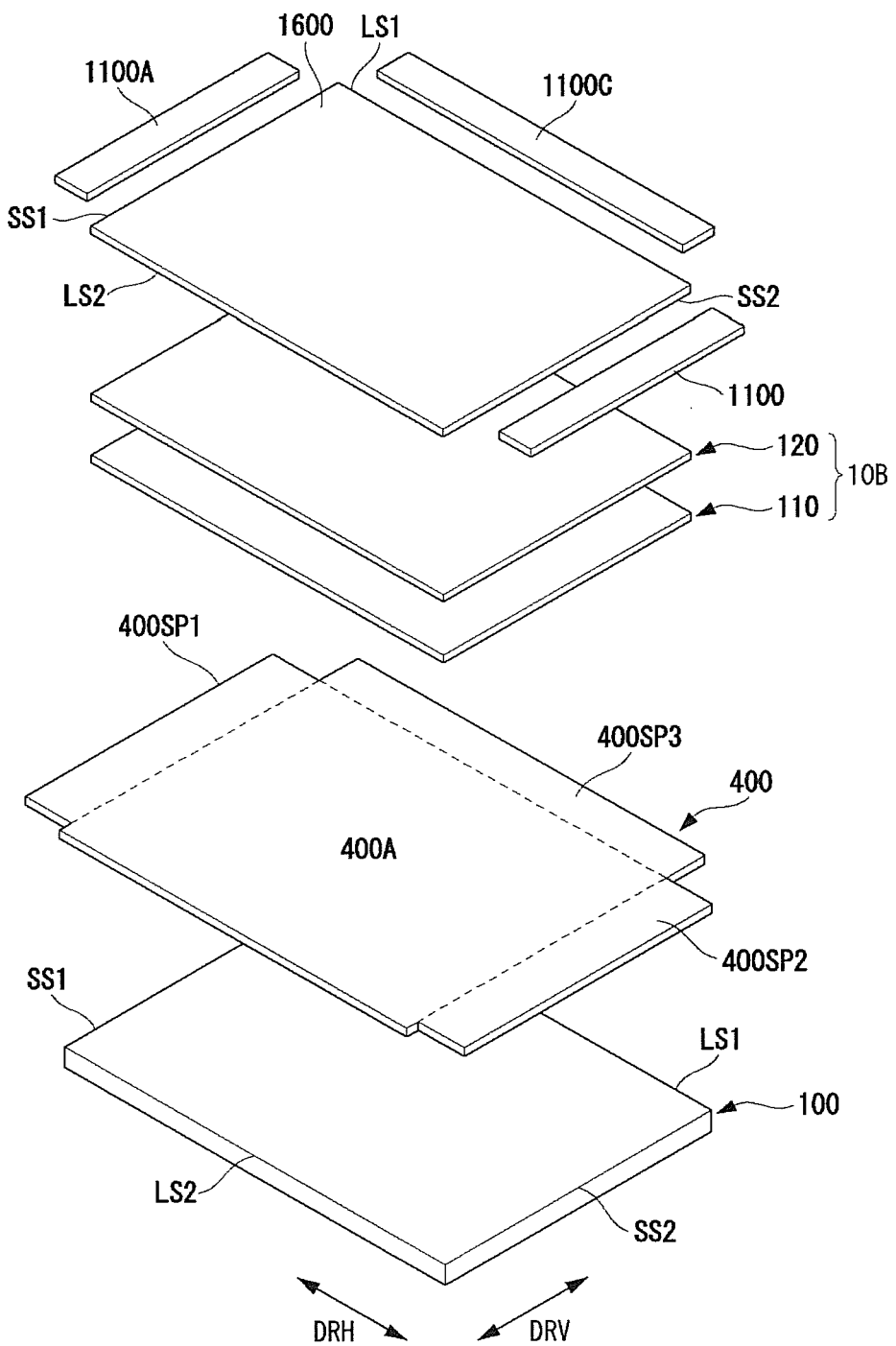

The pressure plate 1100 may be divided into a plurality of parts. For example, as shown in FIG. 69, the pressure plate 1100 may include a first pressure plate 1100A corresponding to the first back portion 400C1 of the supporting film 400, a second pressure plate 1100B corresponding to the second back portion 400C2 of the supporting film 400, and a third pressure plate 1100C corresponding to the third back portion 400C3 of the supporting film 400. The first pressure plate 1100A may press the first back portion 400C1 of the supporting film 400, the second pressure plate 1100B may press the second back portion 400C2 of the supporting film 400, and the third pressure plate 1100C may press the third back portion 400C3 of the supporting film 400.

Figure 70:
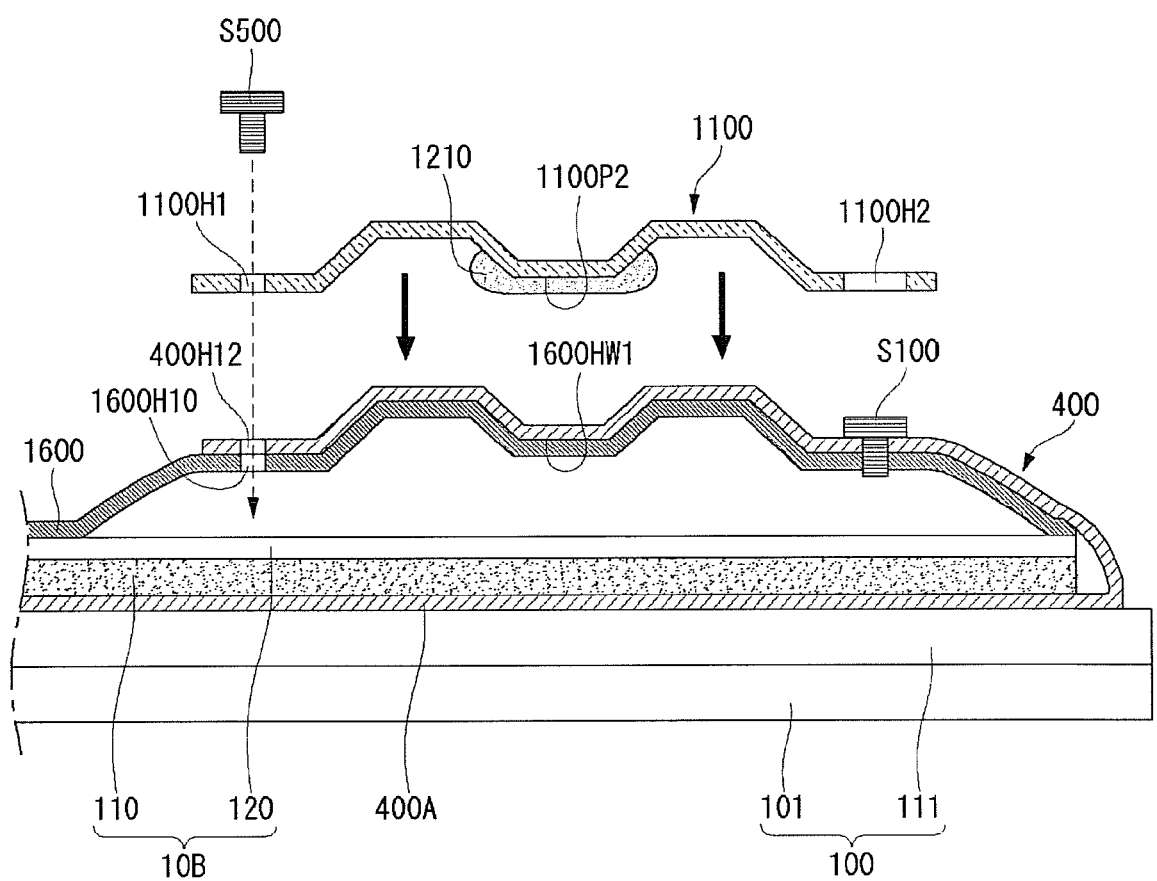

As shown in FIG. 70, the pressure plate 1100 may include a protrusion 1100P2 protruding in a direction toward the display panel 100 or the frame 1600. The frame 1600 may include a protrusion 1600HW1 corresponding to the protrusion 1100P2 of the pressure plate 1100. The protrusion 1600HW1 may protrude in a direction toward the display panel 100. If the supporting film 400 is disposed between the protrusion 1100P2 of the pressure plate 1100 and the protrusion 1600HW1 of the frame 1600, the supporting film 400 may be more efficiently supported. A buffer 1210 may be disposed on the protrusion 1100P2 of the pressure plate 1100. The buffer 1210 may be formed a material having elasticity and flexibility. For example, the buffer 1210 may be formed of a resin material, a silicon material, or a sponge material.

FIGS. 71 to 82B illustrate configuration of a display device including a rolling plate, in accordance with embodiments as broadly described herein.

Figure 71:
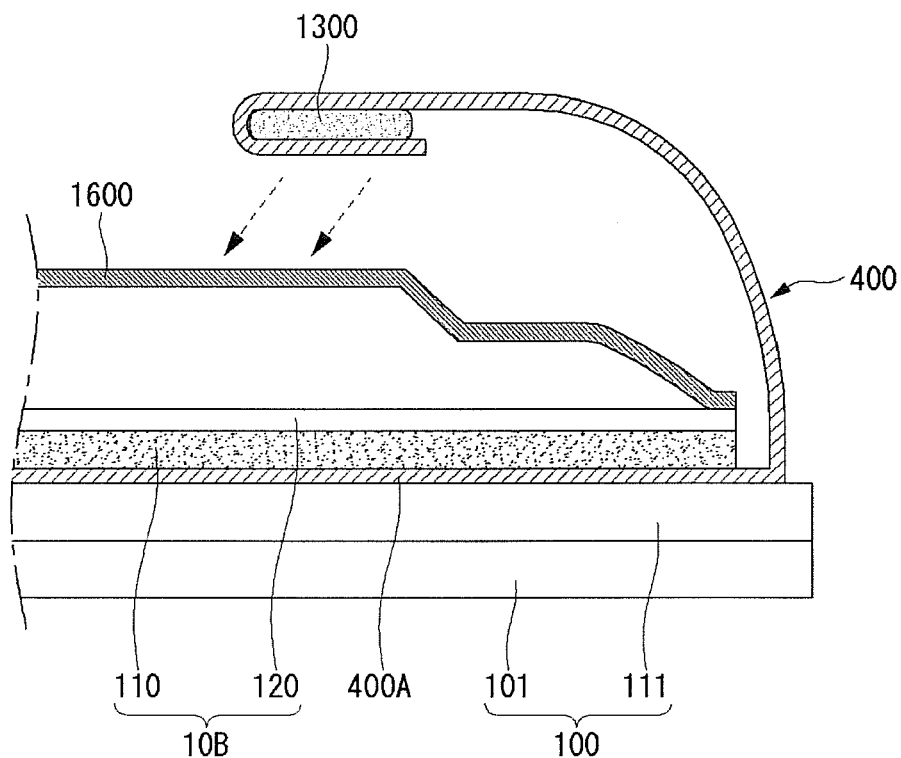
FIGS. 71 to 82B illustrate a configuration of a display device to which a rolling plate is applied, in accordance with embodiments as broadly described herein.

As shown in FIG. 71, the display device may further include a rolling plate 1300. The supporting film 400 may surround the rolling plate 1300. The rolling plate 1300 may be connected to the frame 1600. More specifically, the rolling plate 1300 may be connected to the frame 1600, with the rolling plate 1300 surrounded by the supporting film 400.

Figure 72:
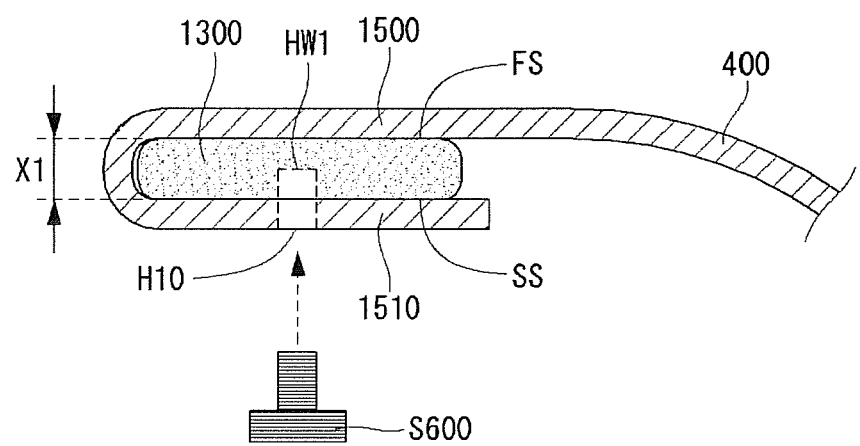

As shown in FIG. 72, as the rolling plate 1300 may be surrounded by the supporting film 400, and the supporting film 400 may include a first connection portion 1500 positioned on a first surface FS of the rolling plate 1300 and a second connection portion 1510 positioned on a second surface SS opposite the first surface FS of the rolling plate 1300. When the rolling plate 1300 has a sufficient thickness X1, the rolling plate 1300 may include a groove HW1. The supporting film 400 may include a tenth hole H10 corresponding to the groove HW1 of the rolling plate 1300. A sixth fastener S600 may be inserted into the tenth hole H10 of the supporting film 400 and the groove HW1 of the rolling plate 1300, thereby fastening the rolling plate 1300 to the supporting film 400. More specifically, the sixth fastener S600 may fasten the rolling plate 1300 to the second connection portion 1510 of the supporting film 400 on the second surface SS of the rolling plate 1300.

Figure 73:
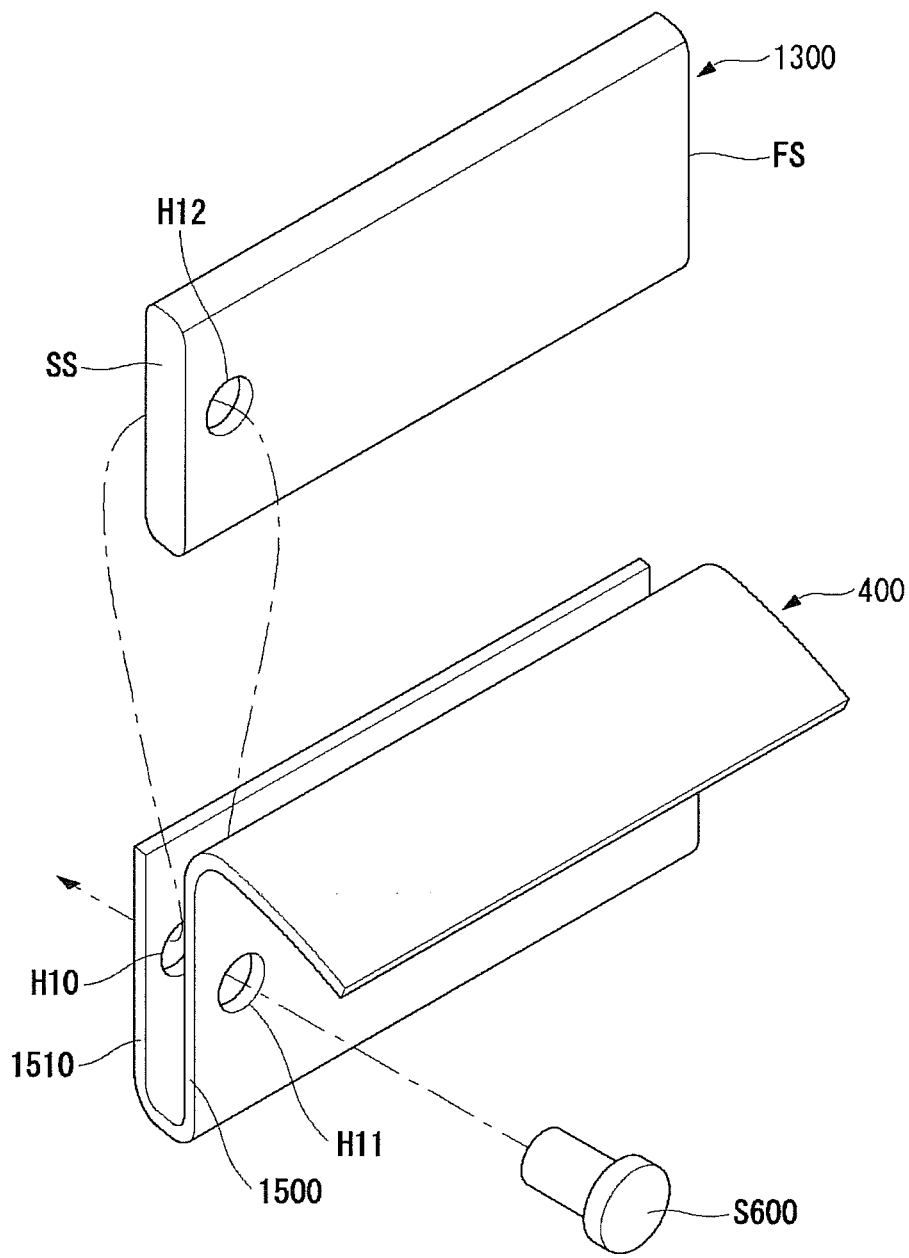
Figure 74:
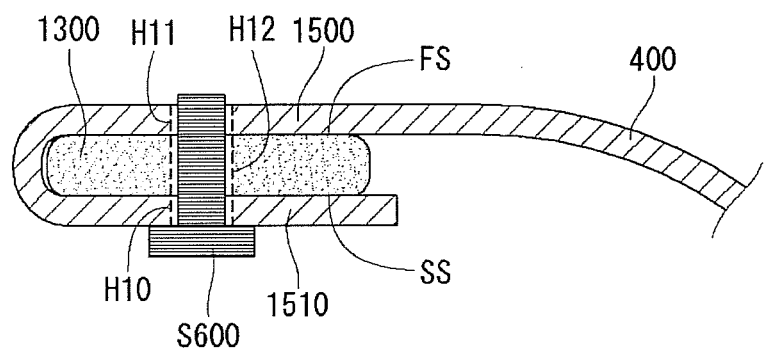

Alternatively, as shown in FIG. 73, the rolling plate 1300 may include a twelfth hole H12, the first connection portion 1500 of the supporting film 400 may include an eleventh hole H11, and the second connection portion 1510 of the supporting film 400 may include a tenth hole H10. As shown in FIG. 74, the sixth fastener S600 may pass through the tenth hole H10, the twelfth hole H12, and the eleventh hole H11, thereby fastening the first connection portion 1500 of the supporting film 400, the rolling plate 1300, and the second connection portion 1510 of the supporting film 400 to one another.

Figure 75:
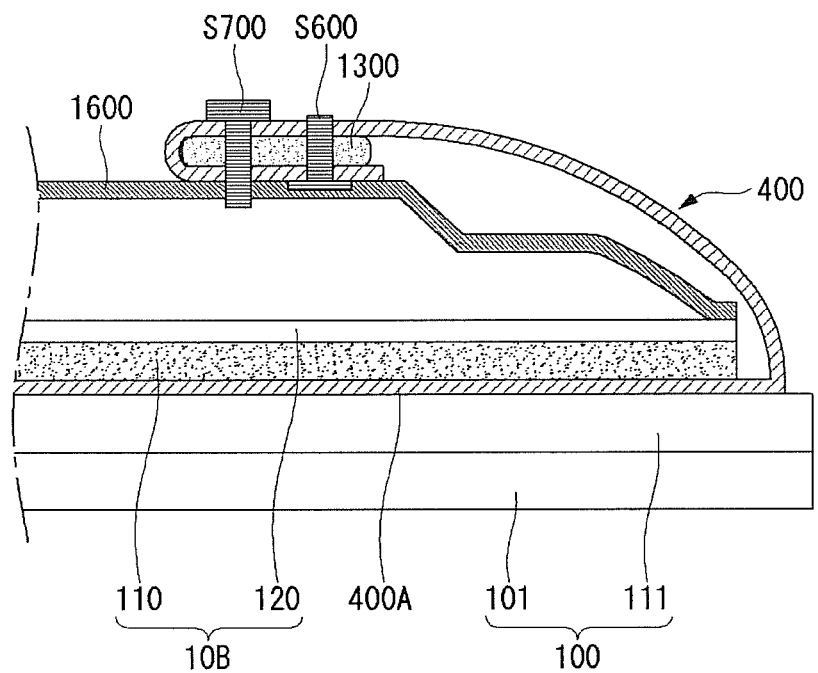

In this instance, a head part of the sixth fastener S600 may be positioned adjacent to the second connection portion 1510 of the supporting film 400. Hence, as shown in FIG. 75, the head part of the sixth fastener S600 may be positioned between the rolling plate 1300 and the frame 1600.

A display device according to embodiments as broadly described herein may further include a seventh fastener S700 for fastening the frame 1600, the supporting film 400, and the rolling plate 1300.

Figure 76:
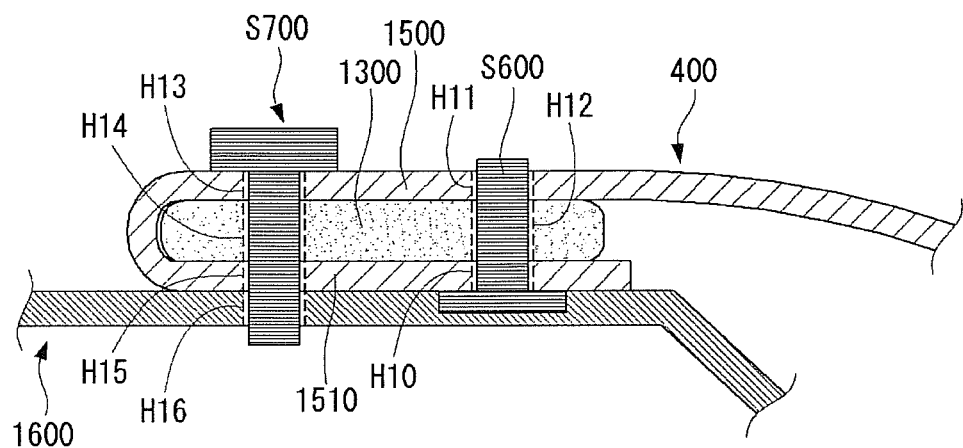

As shown in FIG. 76, the first connection portion 1500 of the supporting film 400 may include a thirteenth hole H13, the second connection portion 1510 of the supporting film 400 may include a fifteenth hole H15, the rolling plate 1300 may include a fourteenth hole H14, and the frame 1600 may include a sixteenth hole H16. The seventh fastener S700 may pass through the thirteenth hole H13, the fourteenth hole H14, the fifteenth hole H15, and the sixteenth hole H16, thereby fastening the supporting film 400, the rolling plate 1300, and the frame 1600 to one another. In this instance, a head part of the seventh fastener S700 may be positioned adjacent to the first connection portion 1500 of the supporting film 400. As described above, each of the first and second connection portions 1500 and 1510 of the supporting film 400 may include a hole, through which the same fastening member passes.

Figure 77:
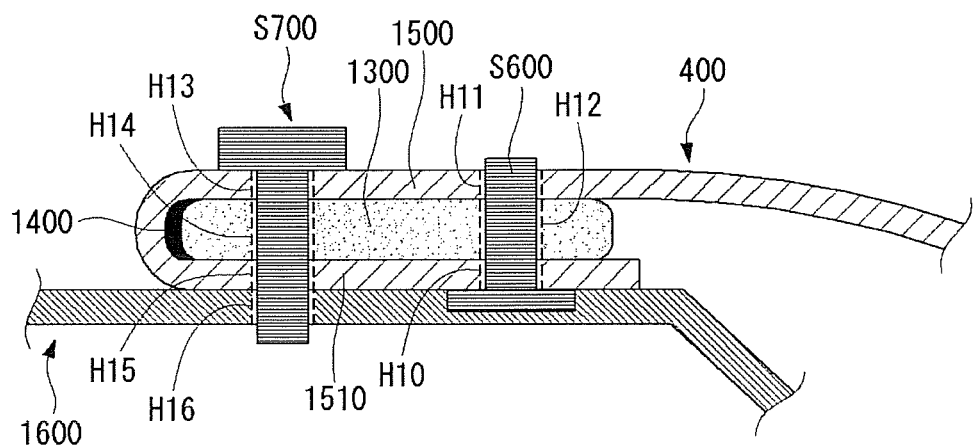

As shown in FIG. 77, a buffer 1400 may be formed on at least one end of the rolling plate 1300. The buffer 1400 may be formed of a material having elasticity. For example, the buffer 1400 may be formed of a resin material, a silicon material, and/or a sponge material. When the supporting film 400 surrounds the rolling plate 1300, the buffer 1400 may be positioned between the supporting film 400 and one end of the rolling plate 1300. Hence, the buffer 1400 may prevent the supporting film 400 from being damaged by friction with the rolling plate 1300.

Figure 78:
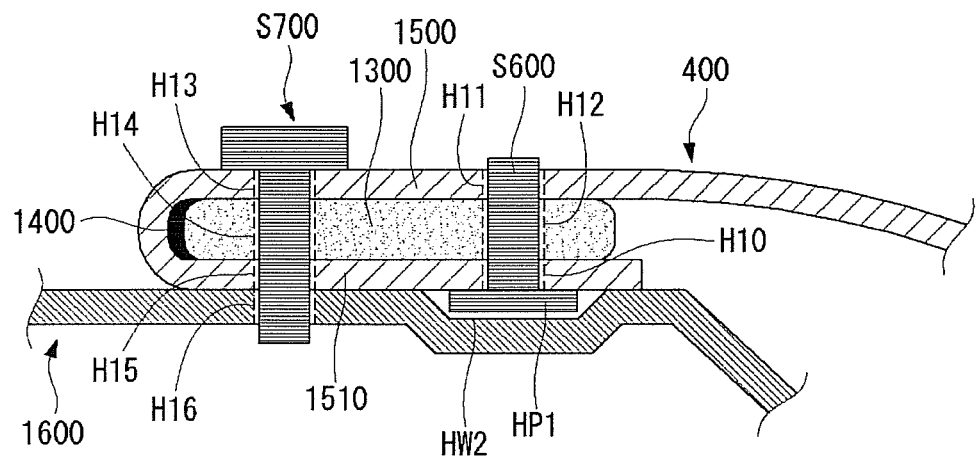

As shown in FIG. 78, the frame 1600 may include a groove HW2 formed in a portion corresponding to a head part HP1 of the sixth fastener S600. The groove HW2 may be formed by depressing a portion of the frame 1600 in a direction toward the display panel 100.

Figure 79:
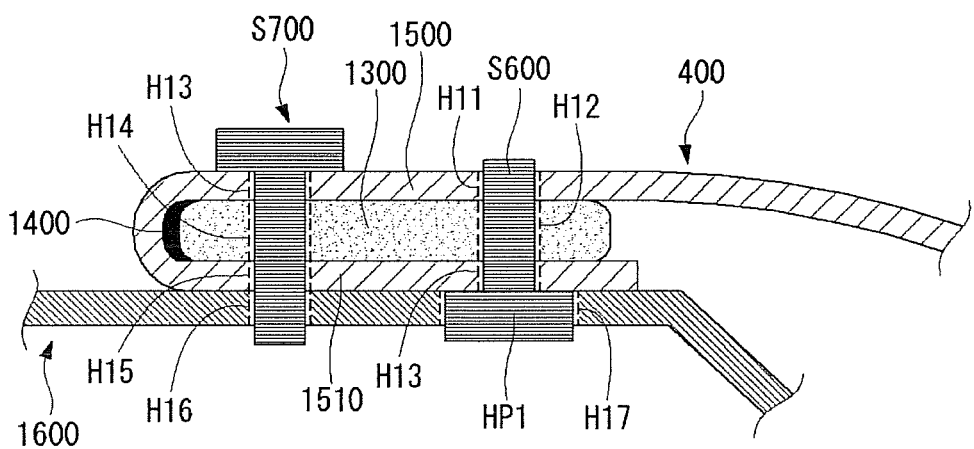

Alternatively, as shown in FIG. 79, the frame 1600 may include a seventeenth hole H17 formed in a portion corresponding to the head part HP1 of the sixth fastener S600. The head part HP1 of the sixth fastener S600 may be exposed through the seventeenth hole H17.

Figure 80:
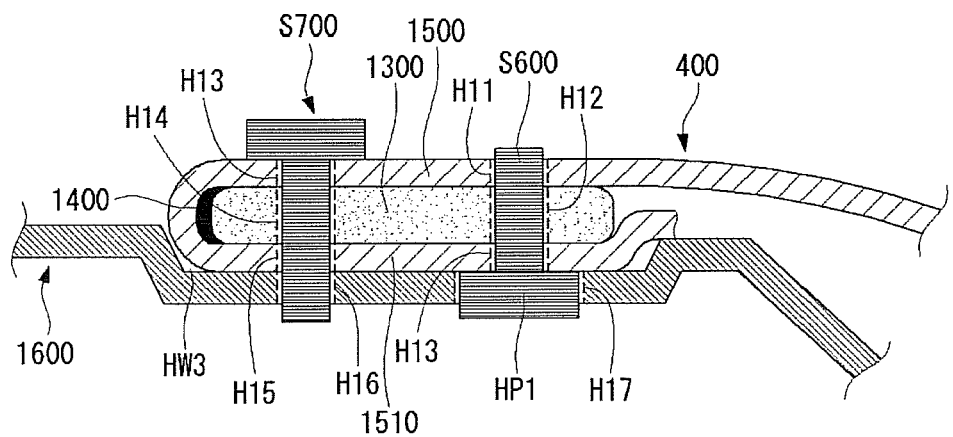

As shown in FIG. 80, the frame 1600 may include a groove HW3 corresponding to the rolling plate 1300. The groove HW3 corresponding to the rolling plate 1300 may be formed by depressing a portion of the frame 1600 in a direction toward the display panel 100. The rolling plate 1300 may be inserted into the groove HW3 of the frame 1600. In this instance, the supporting film 400 may be uniformly and strongly supported.

Figure 81:
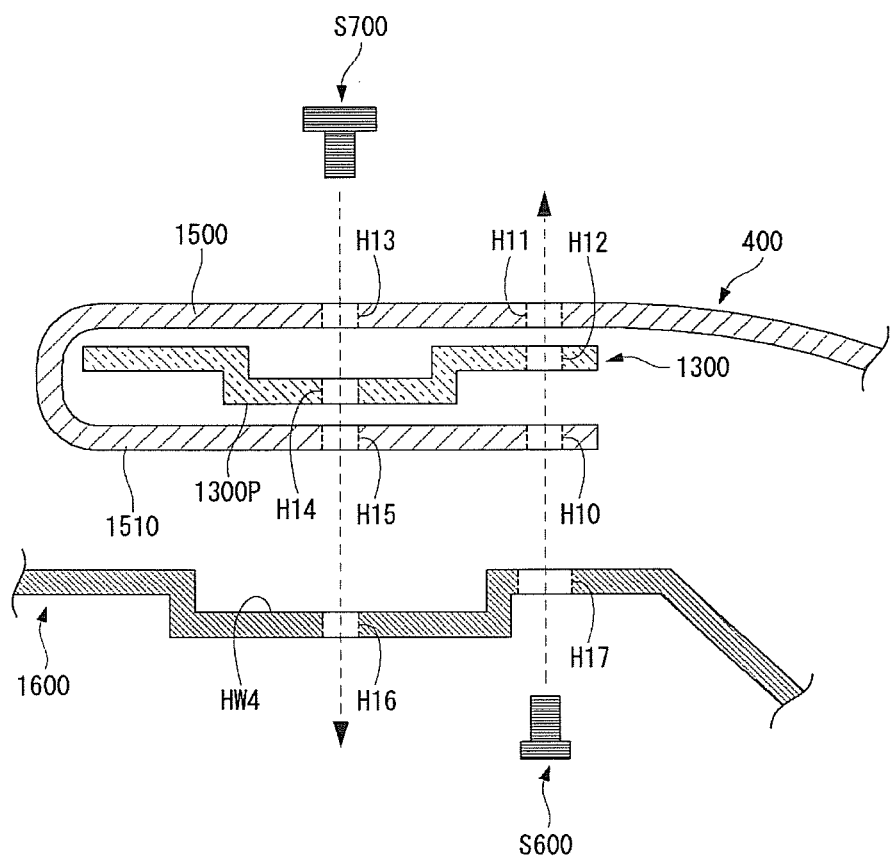

As shown in FIG. 81, the rolling plate 1300 may include a protrusion 1300P protruding toward the display panel 100, and the frame 1600 may include a depression HW4 which corresponds to the protrusion 1300P of the rolling plate 1300 and is depressed in a direction toward the display panel 100. The second connection portion 1510 of the supporting film 400 may be positioned between the protrusion 1300P of the rolling plate 1300 and the depression HW4 of the frame 1600. The protrusion 1300P of the rolling plate 1300 may include the thirteenth hole H13, and the depression HW4 of the frame 1600 may include the sixteenth hole H16.

Figure 82A:
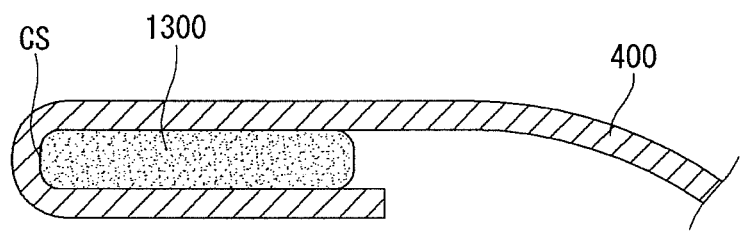
Figure 82B:
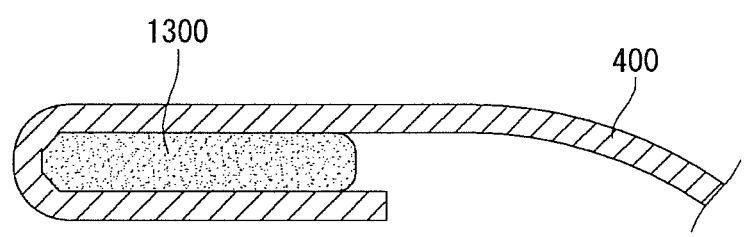

As shown in FIG. 82A, an end of the rolling plate 1300 may have a smoothly curved surface CS. Alternatively, as shown in FIG. 82B, the end of the rolling plate 1300 may be die-cut. Damage of the supporting film 400 resulting from friction between the rolling plate 1300 and the supporting film 400 may be prevented through the configuration shown in FIGS. 82A-82B.

The rolling plate 1300 may include a first rolling plate corresponding to the first back portion 400C1 of the supporting film 400, a second rolling plate corresponding to the second back portion 400C2 of the supporting film 400, and a third rolling plate corresponding to the third back portion 400C3 of the supporting film 400 in the same manner as the pressure plate 1100 shown in FIG. 69.

Since the configuration of the rolling plate 1300 may be sufficiently inferred from the description of FIG. 69, further description thereof is omitted.

FIGS. 83 to 95 illustrate various features of the optical layer. In the following description, the descriptions of the configuration and the structure described above are omitted. A disposition order of optical sheets constituting the optical layer may be variously changed, and is not limited to the exemplary embodiments broadly described herein.

At least a first optical sheet of a plurality of optical sheets constituting the optical layer may include an opening, and at least a second optical sheet of the remaining plurality of optical sheets may include a protuberance corresponding to the opening. In this instance, the first optical sheet and the second optical sheet may be coupled and fixed to each other.

Figure 83:
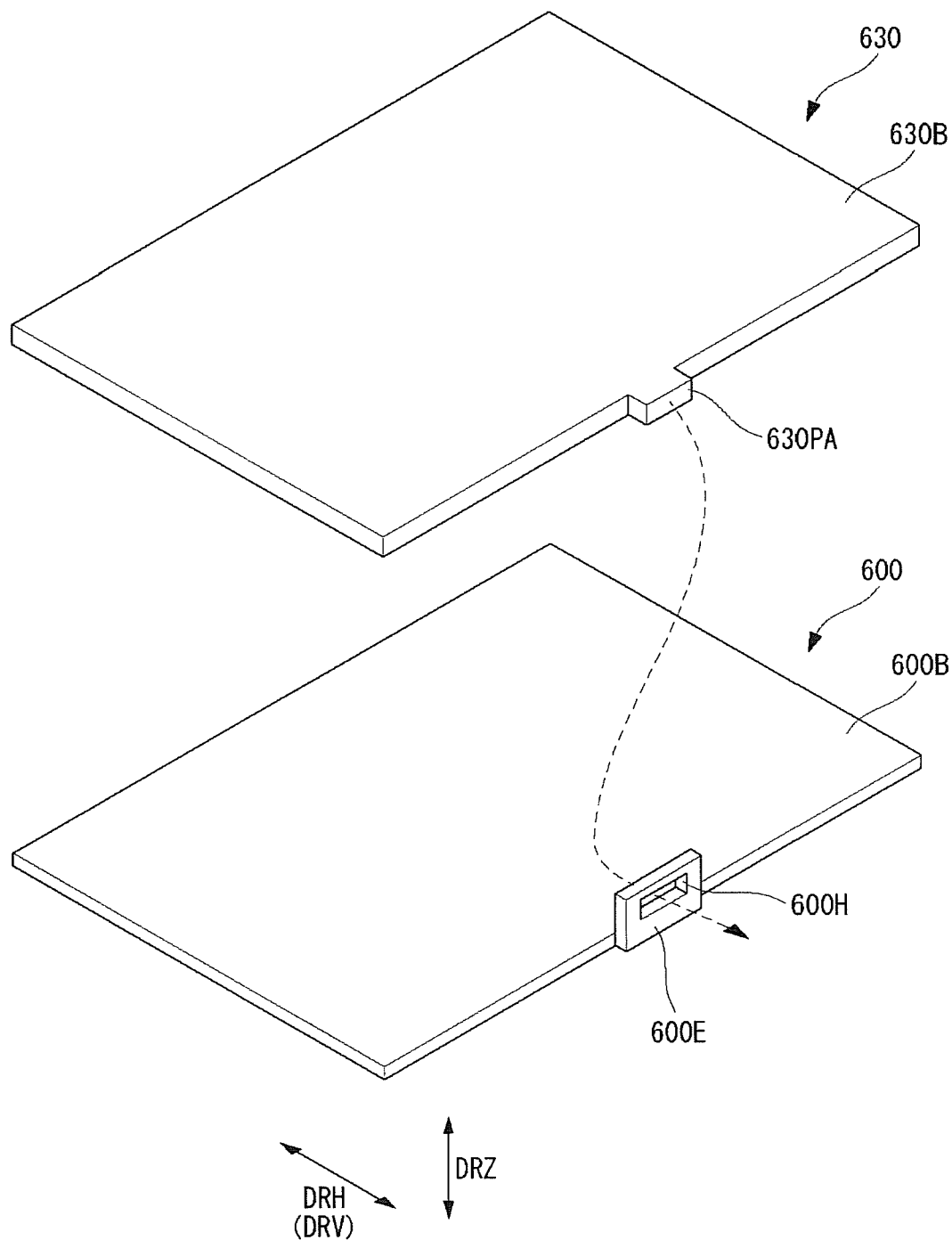
FIGS. 83 to 95 illustrate an optical layer, in accordance with embodiments as broadly described herein.

For example, as shown in FIG. 83, the diffusion plate 630 of the optical layer 110 may include a protuberance 630PA, and the reflective polarizer 600 may include an opening 600H. In certain embodiments, the reflective polarizer 600 may correspond to the first optical sheet, and the diffusion plate 630 may correspond to the second optical sheet.

More specifically, the reflective polarizer 600 may include a body part 600B extending in the horizontal direction (for example, the first direction DRH and/or the second direction DRV) and an extension portion 600E extending from the body part 600B in the vertical direction (for example, the third direction DRZ) crossing the horizontal directions DRH and DRV. The horizontal directions DRH and DRV and the vertical direction DRZ may be perpendicular to each other. The opening 600H may be formed in the extension portion 600E.

The diffusion plate 630 may include a body part 630B extending in the first direction DRH, with the protuberance 630PA extending from the body part 630B in the first direction DRH.

Figure 84:
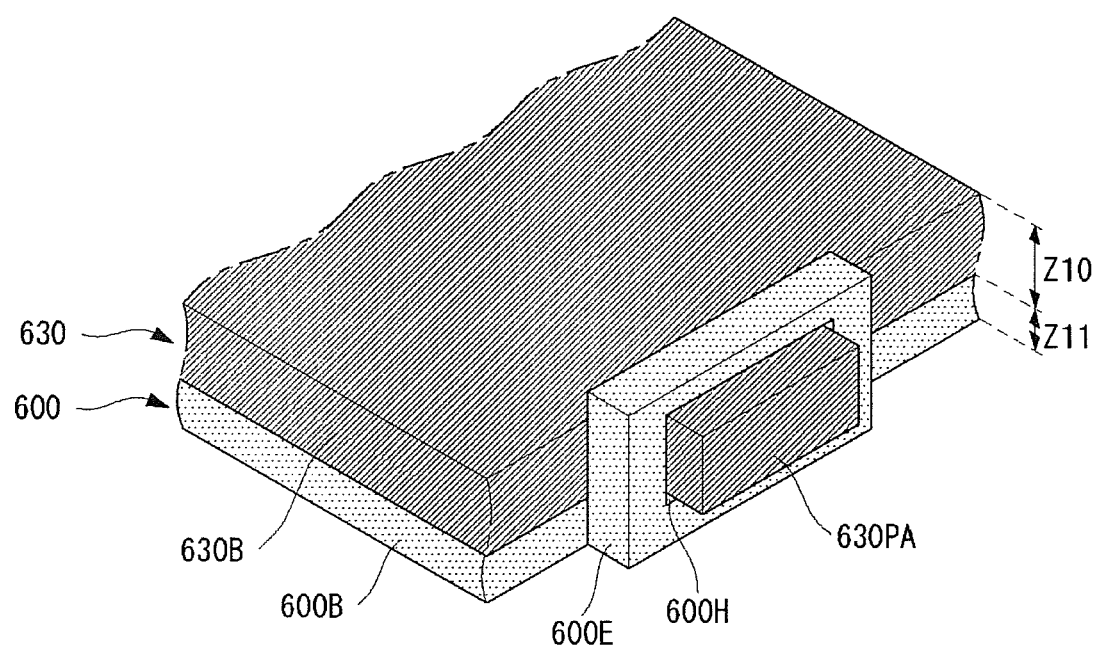

As shown in FIG. 84, the protuberance 630PA of the diffusion plate 630 may pass through the opening 600H of the reflective polarizer 600.

Further, as shown in FIG. 84, a thickness Z10 of the diffusion plate 630 having the protuberance 630PA may be greater than a thickness Z11 of the reflective polarizer 600 having the extension portion 600E and the opening 600H. More specifically, the thickness Z10 of the body part 630B of the diffusion plate 630 may be greater than the thickness Z11 of the body part 600B of the reflective polarizer 600, because the extension portion and the opening of the sheet are easily formed when the sheet is relatively thin.

In certain embodiments, the optical sheet including the extension portion and the opening may have the smallest thickness of all of the plurality of optical sheets of the optical layer 110.

In certain embodiments, a third optical sheet provided between the first and second optical sheets in the plurality of optical sheets of the optical layer 110 may include a body part extending in the first direction DRH, an extension portion extending from the body part in the second direction DRV, and an opening formed in the extension portion.

Figure 85:
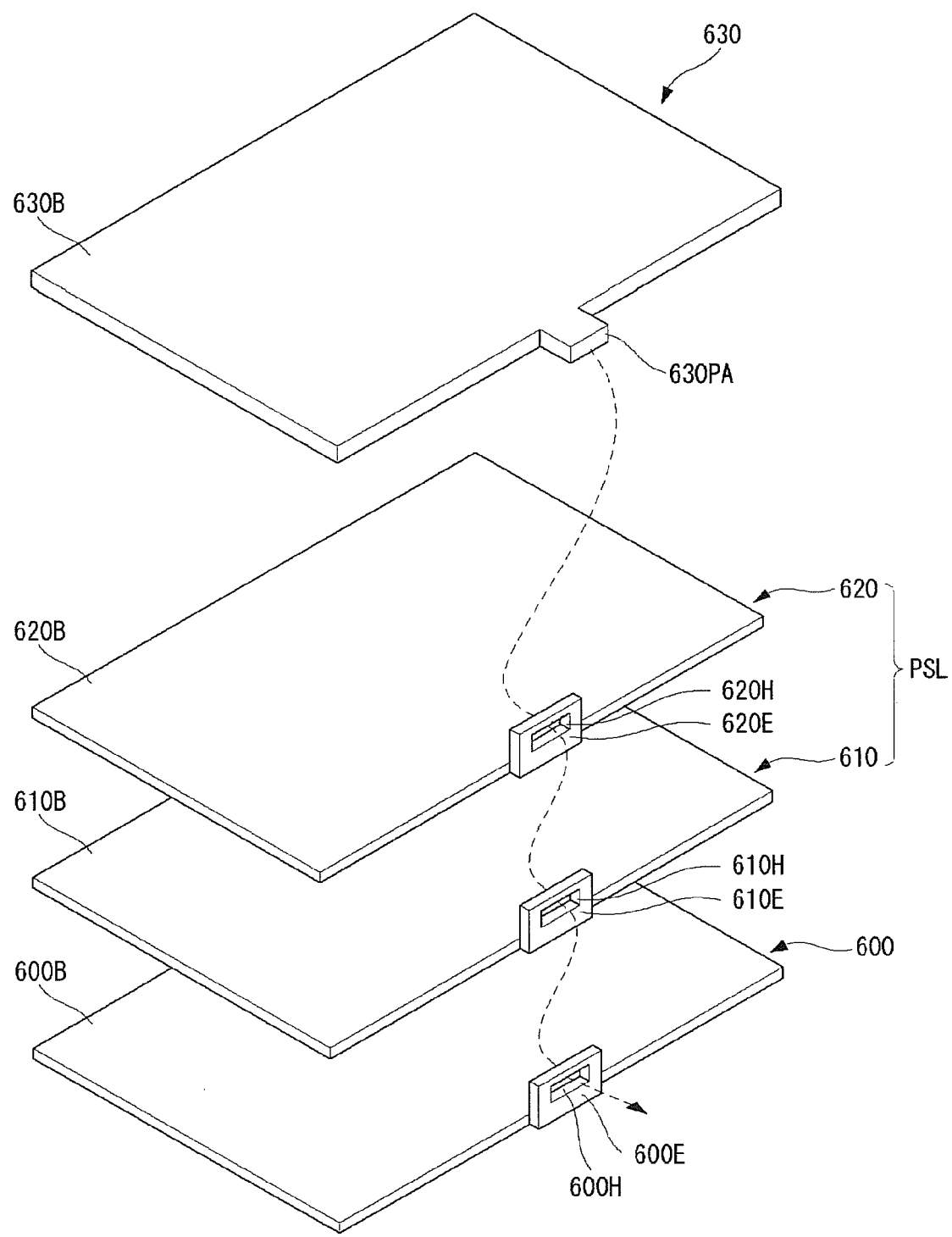

For example, as shown in FIG. 85, the diffusion plate 630 of the optical layer 110 may include the protuberance 630PA. A vertical prism sheet 610, a horizontal prism sheet 620, and the reflective polarizer 600 may respectively include body parts 610B, 620B, 600B, extension portions 610E, 620E, 600E, and openings 610H, 620H, 600H. Since configuration of the vertical prism sheet 610 and the horizontal prism sheet 620 may be sufficiently inferred from the description of FIG. 83, further description thereof is omitted. The vertical prism sheet 610 and the horizontal prism sheet 620 may correspond to the third optical sheet. In the following description, the vertical prism sheet 610 and the horizontal prism sheet 620 may be commonly referred to as a prism sheet layer PSL. As shown in FIG. 85, the openings 610H and 620H of the prism sheet PSL may overlap the opening 600H of the reflective polarizer 600.

Figure 86:
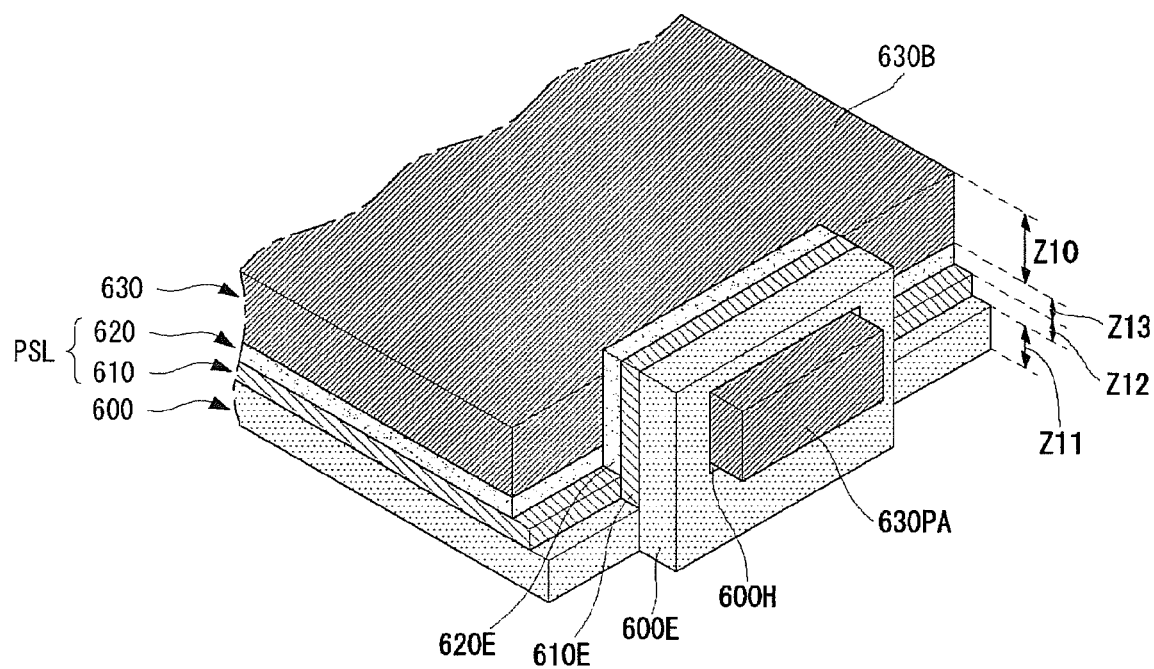

As shown in FIG. 86, the protuberance 630PA of the diffusion plate 630 may pass through the openings 610H and 620H of the prism sheet layer PSL and the opening 600H of the reflective polarizer 600.

As shown in FIG. 86, the thickness Z10 of the diffusion plate 630 may be greater than the thickness Z11 of the reflective polarizer 600, a thickness Z12 of the vertical prism sheet 610, and a thickness Z13 of the horizontal prism sheet 620, considering that the extension portion and the opening of the sheet are easily formed when the sheet is relatively thin. More specifically, the thickness Z10 of the body part 630B of the diffusion plate 630 may be greater than the thickness Z11 of the body part 600B of the reflective polarizer 600, the thickness Z12 of the body part 610B of the vertical prism sheet 610, and the thickness Z13 of the body part 620B of the horizontal prism sheet 620.

Figure 87:
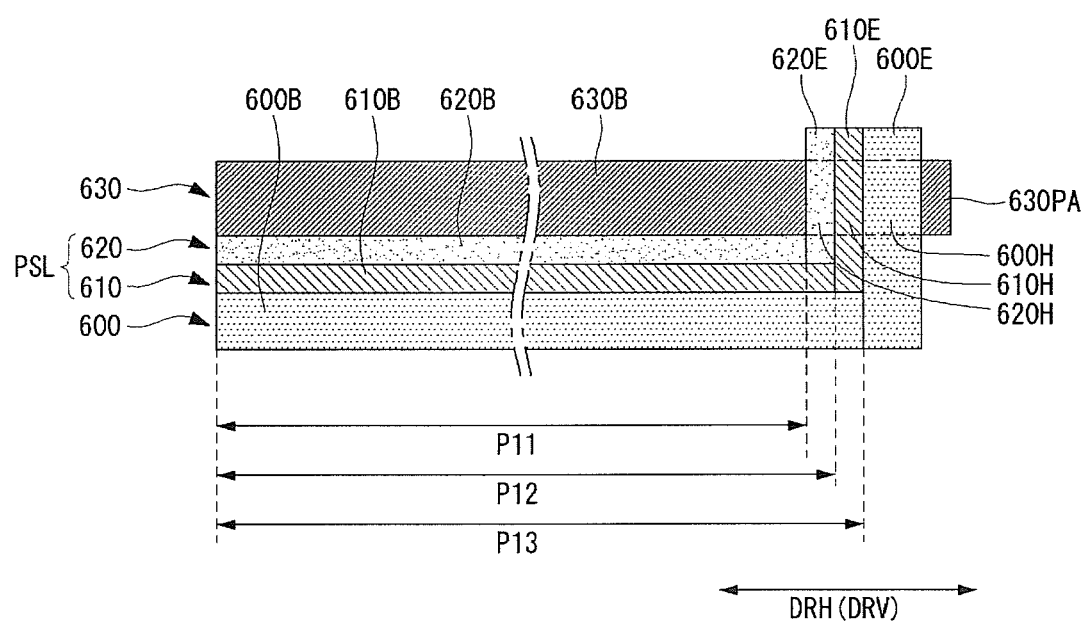

As shown in FIG. 87, when the openings 600H, 610H, and 620H of the reflective polarizer 600, the vertical prism sheet 610, and the horizontal prism sheet 620 overlap one another, a width P13 of the reflective polarizer 600 may be greater than a width P12 of the vertical prism sheet 610 in the horizontal directions DRH and DRV, and the width P12 of the vertical prism sheet 610 may be greater than a width P11 of the horizontal prism sheet 620 in the horizontal directions DRH and DRV because of the thicknesses of the extension portions 600E, 610E, and 620E.

More specifically, the width P13 of the body part 600B of the reflective polarizer 600 may be greater than the width P12 of the body part 610B of the vertical prism sheet 610 in the horizontal directions DRH and DRV. Further, the width P12 of the body part 610B of the vertical prism sheet 610 may be greater than the width P11 of the body part 620B of the horizontal prism sheet 620 in the horizontal directions DRH and DRV.

The sizes of the openings of the optical sheets may vary based on the stack order of the plurality of optical sheets. For example, when the third optical sheet having the opening is positioned between the second optical sheet having the protuberance and the first optical sheet having the opening, the size of the opening of the first optical sheet may be greater than or equal to the size of the opening of the third optical sheet.

Figure 88A:
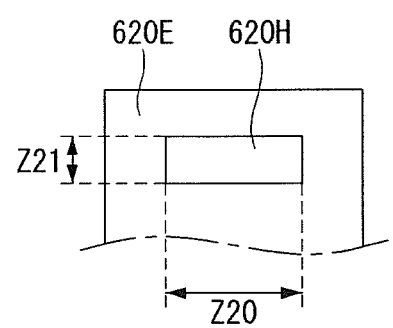
Figure 88B:
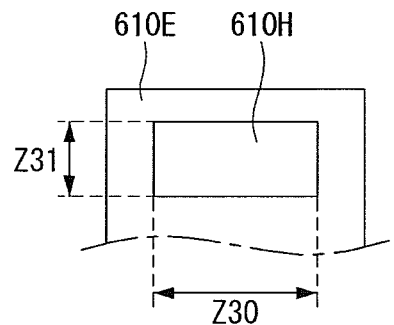
Figure 88C:
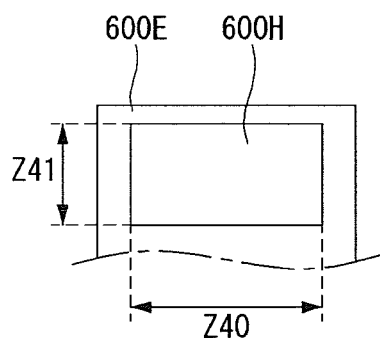

For example, as shown in FIGS. 88A-88C, a size Z40 of the opening 600H of the reflective polarizer 600 may be greater than a size Z30 of the opening 610H of the vertical prism sheet 610, and the size Z30 of the opening 610H of the vertical prism sheet 610 may be greater than a size Z20 of the opening 620H of the horizontal prism sheet 620. In this instance, the protuberance 630PA of the diffusion plate 630 may easily and sequentially pass through the opening 620H of the horizontal prism sheet 620, the opening 610H of the vertical prism sheet 610, and the opening 600H of the reflective polarizer 600.

At least one hole may be formed between a body part and an extension portion of at least one optical sheet. More specifically, at least one hole may be formed at a boundary of at least one body part and at least one extension portion, and the body part and the extension portion may be distinguished from each other by bending a portion of the sheet in which the hole is formed.

Figure 89A:
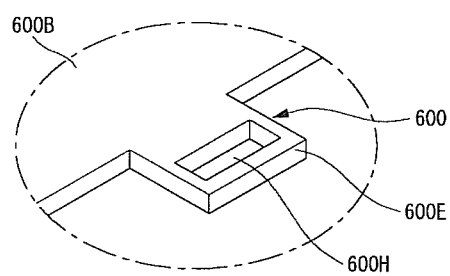
Figure 89B:
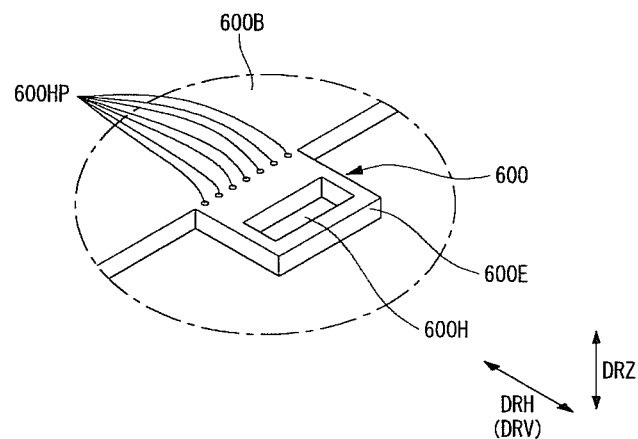
Figure 89C:
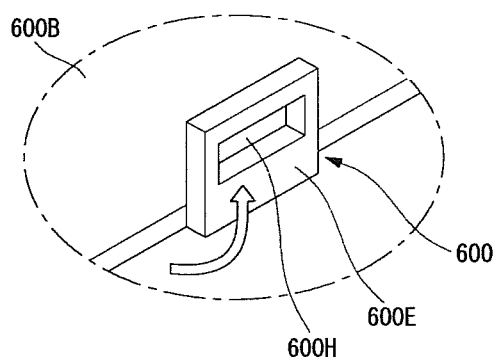

For example, as shown in FIG. 89A, the reflective polarizer 600 may include the extension portion 600E extending from the body part 600B in the horizontal directions DRH and DRV, and the opening 600H may be formed in the extension portion 600E. As shown in FIG. 89B, a plurality of holes 600HP may be formed at a boundary of the body part 600B and the extension portion 600E. As shown in FIG. 89C, the boundary of the body part 600B and the extension portion 600E may be bent so that the extension portion 600E extends from the body part 600B in the horizontal direction DRV. As described above, at least one hole 600HP between the body part 600B and the extension portion 600E may help the extension portion 600E to be bent.

Figure 90:
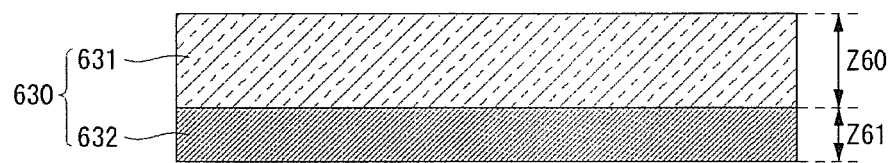

The diffusion plate 630 may include a plurality of sheets. For example, as shown in FIG. 90, the diffusion plate 630 may include a first diffusion plate 631 and a second diffusion plate 632. A thickness Z60 of the first diffusion plate 631 may be different from a thickness Z61 of the second diffusion plate 632. FIG. 90 shows that the thickness Z60 of the first diffusion plate 631 is greater than the thickness Z61 of the second diffusion plate 632. However, the thickness Z61 of the second diffusion plate 632 may be greater than the thickness Z60 of the first diffusion plate 631. Alternatively, the thickness Z60 of the first diffusion plate 631 and the thickness Z61 of the second diffusion plate 632 may be almost the same.

Figure 91:
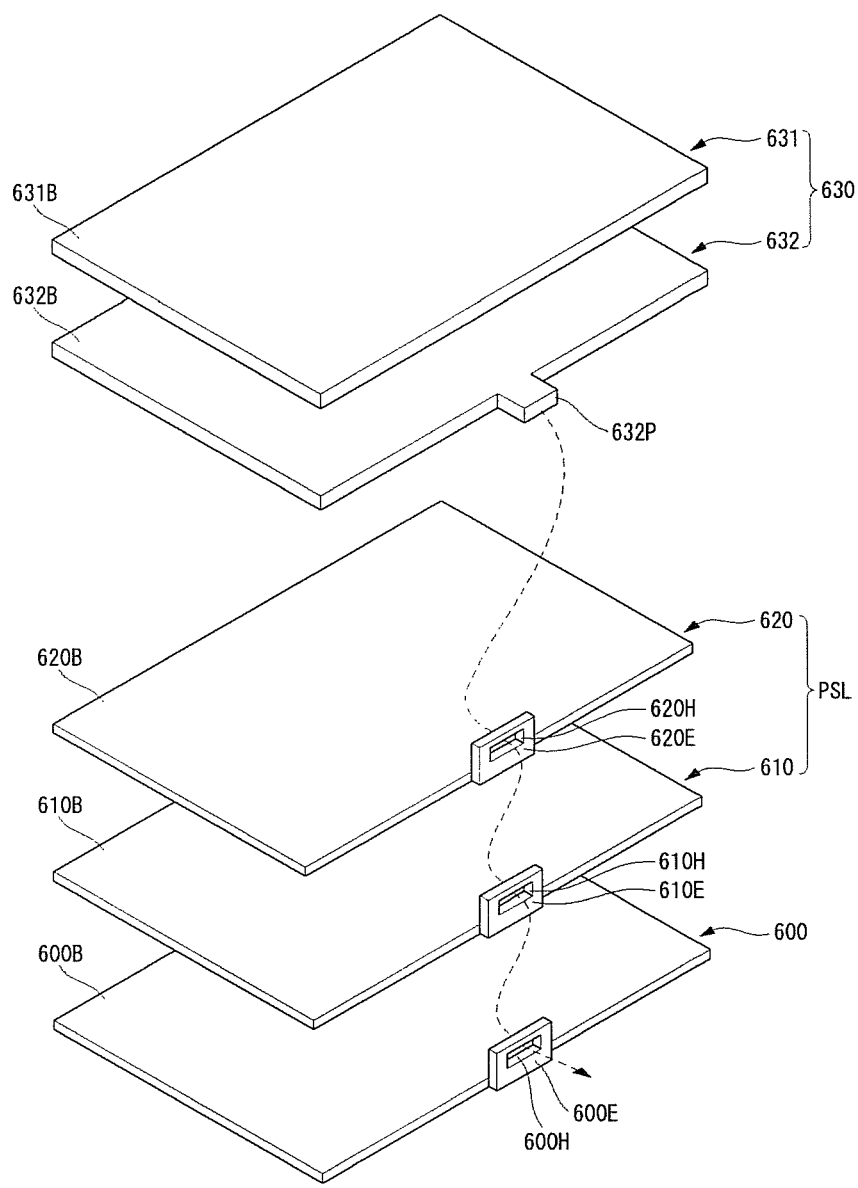

As shown in FIG. 91, the second diffusion plate 632 may have a protuberance 632P, and the first diffusion plate 631 may be formed without a protuberance. In this instance, the protuberance 632P of the second diffusion plate 632 may correspond to the openings 610H and 620H of the prism sheet layer PSL and the opening 600H of the reflective polarizer 600. The first diffusion plate 631 may be simply placed on the second diffusion plate 632.

Figure 92:
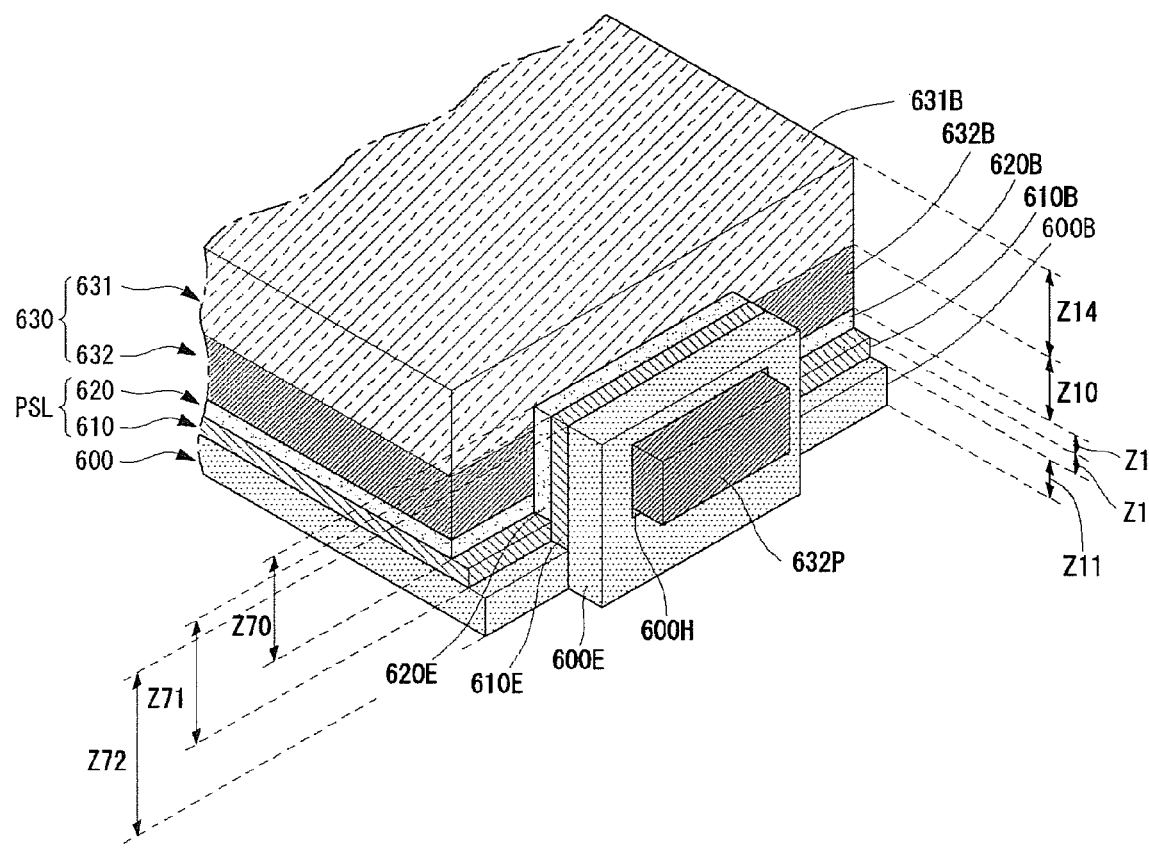

In this instance, the optical layer may have a configuration as illustrated in FIG. 92. A thickness Z14 of the first diffusion plate 631 formed without the protuberance may be greater than a thickness Z10 of the second diffusion plate 632 having the protuberance 632P so as to easily perform a process for forming the protuberances. An end of at least one of the extension portion 600E of the reflective polarizer 600, the extension portion 610E of the vertical prism sheet 610, or the extension portion 620E of the horizontal prism sheet 620 may be positioned on the side of the first diffusion plate 631. In this instance, the detachment of the first diffusion plate 631 may be prevented.

At least one of a length Z72 of the extension portion 600E of the reflective polarizer 600, a length Z71 of the extension portion 610E of the vertical prism sheet 610, or a length Z70 of the extension portion 620E of the horizontal prism sheet 620 may be greater than the thickness Z10 of the second diffusion plate 632 and may be less than a sum (Z10 +Z14) of the thickness Z14 of the first diffusion plate 631 and the thickness Z10 of the second diffusion plate 632, so that the end of at least one of the extension portion 600E of the reflective polarizer 600, the extension portion 610E of the vertical prism sheet 610, or the extension portion 620E of the horizontal prism sheet 620 is positioned on the side of the first diffusion plate 631.

This configuration is described below in another manner.

It is assumed that first, third, second, and fourth optical sheets are sequentially disposed, with the first optical sheet positioned adjacent to the display panel 100, the fourth optical sheet positioned adjacent to the back cover 130, the first and third optical sheets each including an extension portion and an opening, the second optical sheet including a protuberance, and the fourth optical sheet does not including a protuberance.

In this instance, a thickness of the fourth optical sheet may be greater than thicknesses of the first, second, and third optical sheets.

In this instance, ends of the extension portions of the first and third optical sheets may be positioned on the side of the fourth optical sheet. At least one of lengths of the extension portions of the first and third optical sheets may be greater than a thickness of the second optical sheet and may be less than or equal to a sum of the thickness of the second optical sheet and a thickness of the fourth optical sheet.

In such embodiments disclosed herein, the first optical sheet may correspond to the reflective polarizer 600, the third optical sheet layer may correspond to the prism sheet PSL, the second optical sheet may correspond to the second diffusion plate 632, and the fourth optical sheet may correspond to the first diffusion plate 631.

Alternatively, when first, third, and second optical sheets are sequentially disposed, the first optical sheet includes an extension portion and an opening, and the second optical sheet includes a protuberance, the third optical sheet between the first and second optical sheets may include a protuberance.

Figure 93:
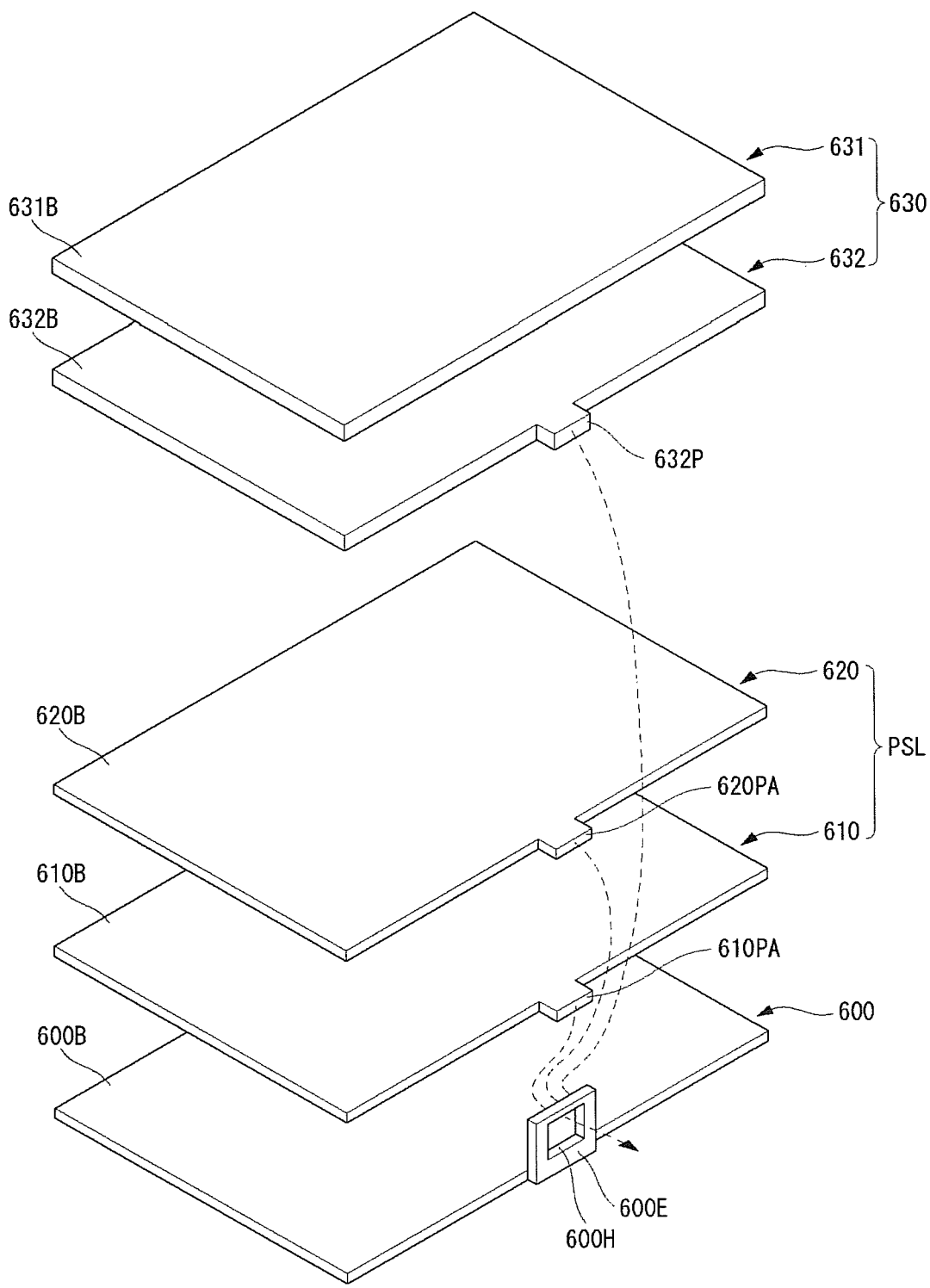

For example, as shown in FIG. 93, the vertical prism sheet 610 and the horizontal prism sheet 620 as well as the second diffusion plate 632 may respectively include protuberances 610PA, 620PA and 632P.

Figure 94:
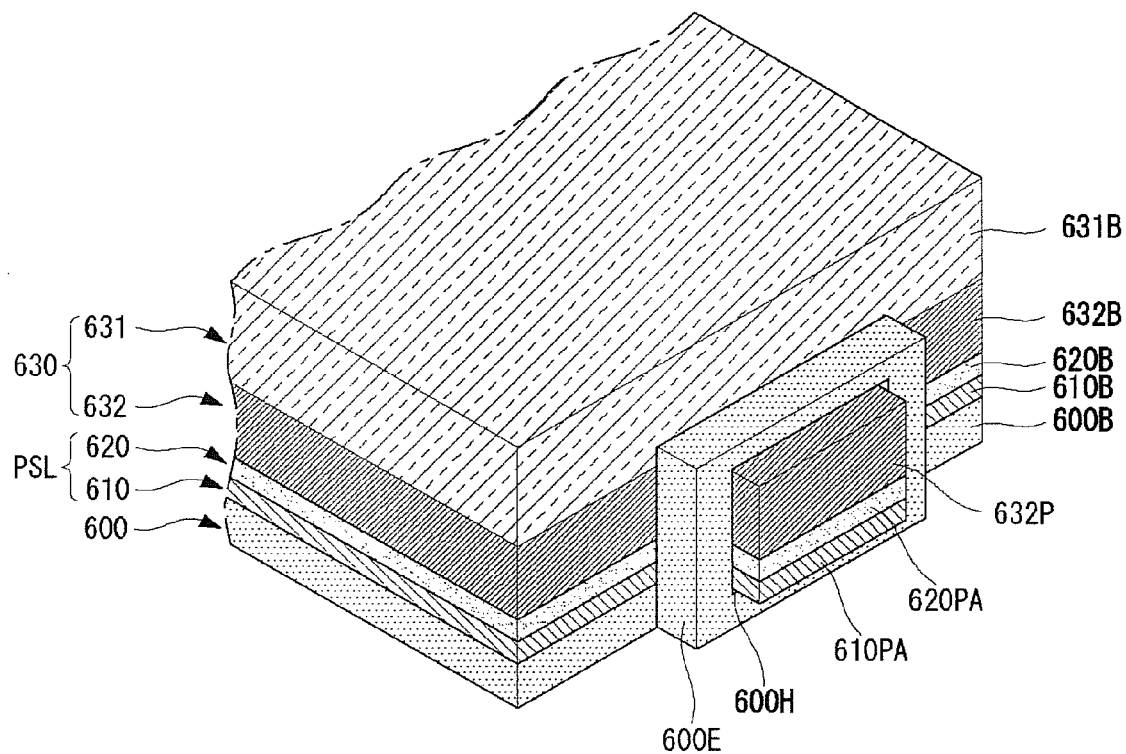

Further, as shown in FIG. 94, the protuberance 632P of the second diffusion plate 632, the protuberance 610P of the vertical prism sheet 610, and the protuberance 620P of the horizontal prism sheet 620 may pass through the opening 600H of the reflective polarizer 600.

Figure 95:
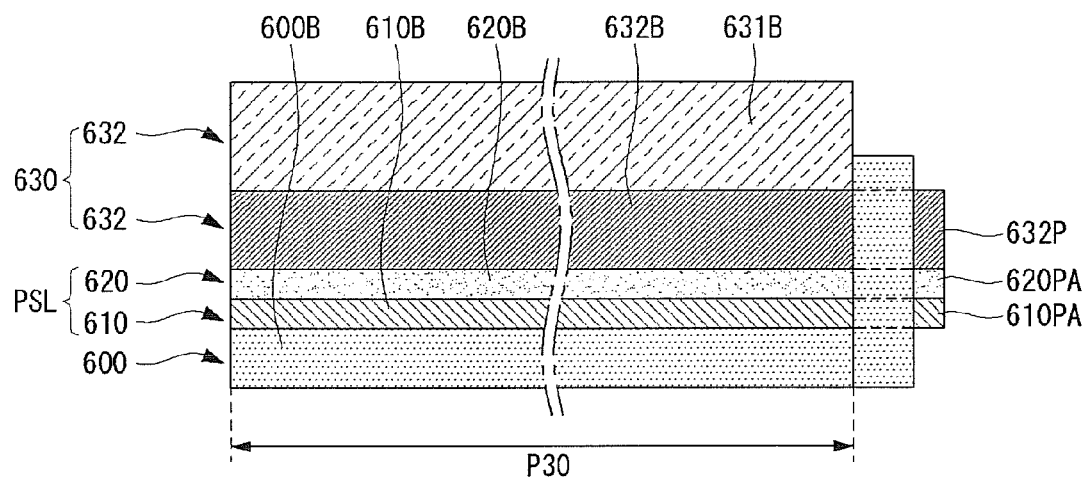

In this instance, as shown in FIG. 95, the body part 632B of the second diffusion plate 632, the body part 610B of the vertical prism sheet 610, and the body part 620B of the horizontal prism sheet 620 may have substantially the same length P30.

Figure 96:
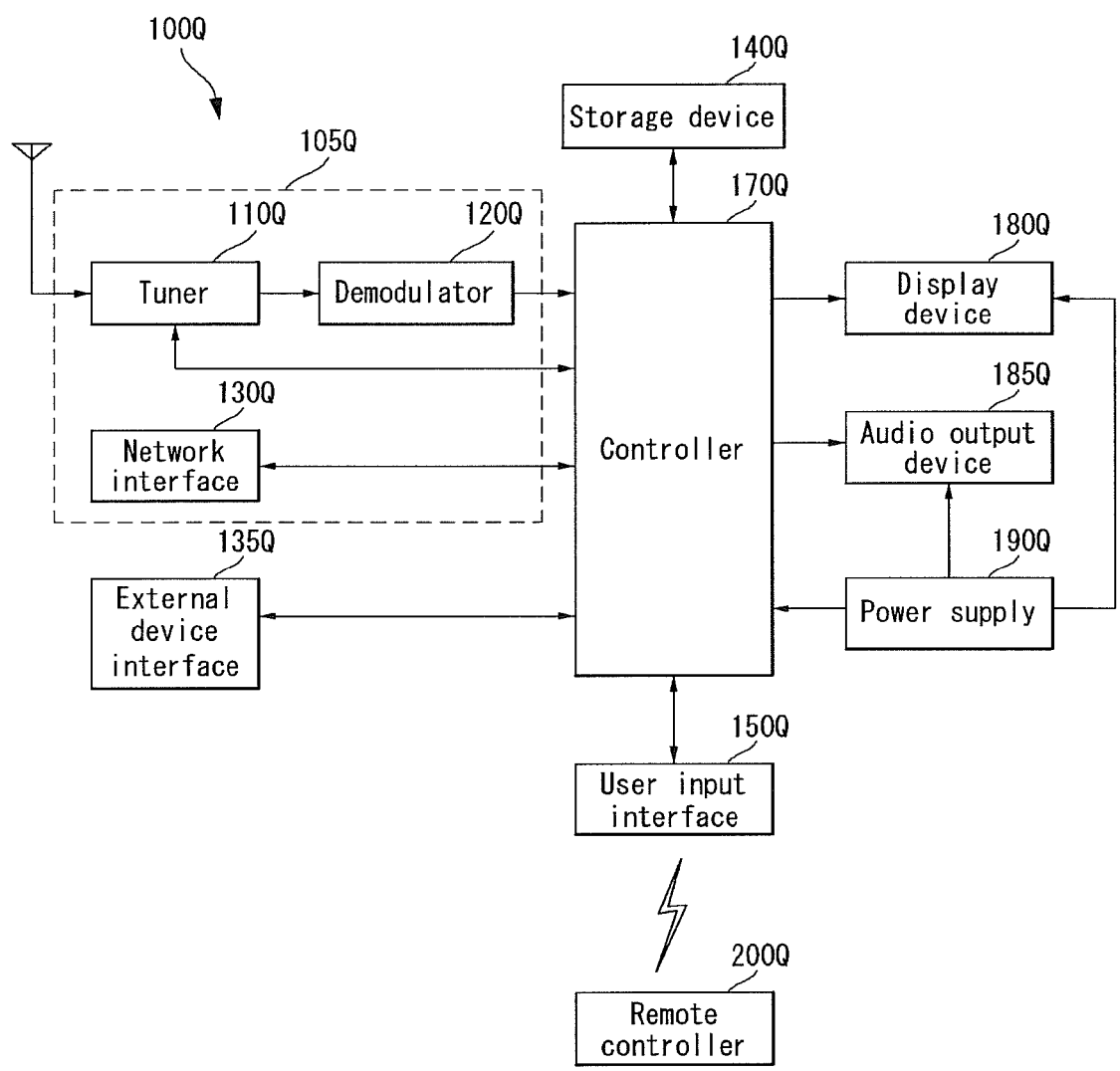
FIG. 96 is a block diagram of a display device according to an exemplary embodiment as broadly described herein.

FIG. 96 is a block diagram of a display device according to an exemplary embodiment as broadly described herein. In the following description, duplicative descriptions of the configuration and the structure described above are omitted. Hereinafter, a broadcasting signal receiver is employed as an electronic device to which the display device as embodied and broadly described herein is applied. The display device according to the embodiment may be applied to other electronic devices such as cell phones.

A display device 180Q shown in FIG. 96 may correspond to the display device shown in FIGS. 2 to 95. Thus, the display device as embodied and broadly described herein may be referred to as the display device 180Q shown in FIG. 96.

As shown in FIG. 96, a broadcasting signal receiver 100Q may include a broadcasting receiving device 105Q, an external device interface 135Q, a storage 140Q, a user input interface 150Q, a controller 170Q, a display device 180Q, an audio output device 185Q, a power supply 190Q, and a photographing device. The broadcasting receiving device 105Q may include a tuner 110Q, a demodulator 120Q, and a network interface 130Q.

If necessary, the broadcasting signal receiver 100Q may be designed so that it includes the tuner 110Q and the demodulator 120Q and does not include the network interface 130Q. On the contrary, the broadcasting signal receiver 100Q may be designed so that it includes the network interface 130Q and does not include the tuner 110Q and the demodulator 120Q.

The tuner 110Q tunes a radio frequency (RF) broadcasting signal, which corresponds to a channel selected by the user or all of previously stored channels, among RF broadcasting signals received through an antenna. Further, the tuner 110Q converts the tuned RF broadcasting signal into a middle frequency signal, a base band image signal, or a voice signal.

The demodulator 120Q receives a digital IF signal converted by the tuner 110Q and performs a demodulating operation.

A stream signal output by the demodulator 120Q may be input to the controller 170Q. The controller 170Q performs demultiplexing, image/voice signal processing, etc. Then, the controller 170Q outputs an image to the display unit 180Q and outputs a voice to the audio output unit 185Q.

The external device interface 135Q may connect an external device to the broadcasting signal receiver 100Q. The external device interface 135Q may include an audio-visual (AV) input/output unit (not shown) or a wireless communication unit (not shown).

The network interface 130Q provides an interface for connecting the broadcasting signal receiver 100Q to a wired/wireless network including, for example, an internet network. The network interface 130Q may correspond to the wireless communication device described in detail above.

The storage device 140Q may store one or more programs for the signal processing of the controller 170Q and the control operation of the controller 170Q or may store processed image signals, processed voice signals, or data signals.

The user input interface 150Q may transfer user input signals to the controller 170Q, or may transfer the signal from the controller 170Q to the user. For example, the user input interface 150Q may receive and process a control signal indicating a turn-on or turn-off operation, channel selection, screen setting, etc. from a remote controller 200Q based on various communication manners such as, for example, a RF communication manner, an infrared communication manner and the like. Alternatively, the user input interface 150Q may operate so that the control signal from the controller 170Q is transmitted to the remote controller 200Q.

For example, the user input interface 150Q may transfer a control signal, which is input from a power key, a channel key, a volume key, a local key, etc., to the controller 170Q. The controller 170Q may perform the demultiplexing processing on the stream input through the tuner 110Q, the demodulator 120Q, or the external device interface 135Q or may perform the processing of demultiplexed signals, thereby generating or outputting the signals for outputting the image or the voice.

The image signal processed by the controller 170Q may be input to the display device 180Q and may display an image corresponding to the image signal. Further, the image signal processed by the controller 170Q may be input to an external output device through the external device interface 135Q.

The voice signal processed by the controller 170Q may be output to the audio output device 185Q. Further, the voice signal processed by the controller 170Q may be input to the external output device through the external device interface 135Q.

The controller 170Q may control overall operation of the broadcasting signal receiver 100Q. For example, the controller 170Q may control the tuner 110Q, so that the tuner 110Q tunes a RF broadcasting signal corresponding to a channel selected by the user or a previously stored channel.

The controller 170Q may control the broadcasting signal receiver 100Q using a user command or an internal program input through the user input interface 150Q.

The display device 180Q may convert the image signal, the data signal, and an OSD signal, which are processed by the controller 170Q, or the image signal and the data signal which are received from the external device interface 135Q, into red, green, and blue signals and may generate a driving signal.

The audio output device 185Q may receive the voice signal (for example, stereo signal, 3.1 channel signal, or 5.1 channel signal) processed by the controller 170Q and may output corresponding audio, such as voice.

The power supply 190Q supplies power required by all of the components of the broadcasting signal receiver 100Q.

The remote controller 200Q transmits the user commands and user inputs to the user input interface 150Q. For this, the remote controller 200Q may use Bluetooth, RF communication, infrared communication, Ultra-wideband (UWB), Zigbee, and the like. The remote controller 200Q may receive image, voice, or data signals output from the user input interface 150Q and may display the image, voice, or data signals or may output voice or vibration.

The broadcasting signal receiver 100Q may not include the tuner 110Q and the demodulator 120Q. Further, the broadcasting signal receiver 100Q may receive image contents through the network interface 130Q or the external device interface 135Q and may reproduce the image contents.

In one aspect, there is provided a display device including a display panel including a front substrate and a back substrate, a frame positioned in the rear of the display panel, an optical layer positioned between the display panel and the frame, and a supporting film which is attached to the display panel and is connected to the frame.

The display device may also include a fastening member configured to fasten the supporting film to the frame.

The display panel may also include a front polarizing film attached to a front surface of the front substrate, and a back polarizing film attached to a back surface of the back substrate. The supporting film may be attached to the back polarizing film.

The supporting film may include a portion attached to the display panel, a back portion positioned on a back surface of the frame, and a side portion positioned on the side of the optical layer.

The side portion of the supporting film may include at least one opening.

The frame may include a first long side area, a second long side area opposite the first long side area, a first short side area adjacent to the first and second long side areas, and a second short side area opposite the first short side area. The back portion of the supporting film may include a first back portion positioned in the first short side area, a second back portion positioned in the second short side area, and a third back portion positioned in the first long side area.

The first back portion and the third back portion of the supporting film may overlap each other in the corner between the first long side area and the first short side area of the frame, or the second back portion and the third back portion of the supporting film may overlap each other in the corner between the first long side area and the second short side area of the frame.

Each of the first back portion and the third back portion may include a hole in an overlap portion between the first back portion and the third back portion, or each of the first back portion and the second back portion may include a hole in an overlap portion between the first back portion and the second back portion.

The frame may include a protrusion inserted into the hole, and the protrusion of the frame may include a hole, into which a fastening member is inserted. The fastening member may fasten the first back portion, the third back portion, and the protrusion to one another or may fasten the first back portion, the second back portion, and the protrusion to one another.

The first back portion and the third back portion of the supporting film may be separated from each other in the corner between the first long side area and the first short side area of the frame, or the second back portion and the third back portion of the supporting film may be separated from each other in the corner between the first long side area and the second short side area of the frame.

The display device also include a back cover positioned in the rear of the frame, and a side cover which covers the side portion of the supporting film and is connected to the back cover.

The side cover may include a vertical part extending in a vertical direction, and a horizontal part extending from the vertical part in a horizontal direction crossing the vertical direction.

The optical layer may be separated from the supporting film by a predetermined distance in a horizontal direction.

The display device may also include a plate which is connected to the frame and presses the back portion of the supporting film.

The supporting film may include a first connection portion provided on a first surface of the plate, and a second connection portion provided on a second surface opposite the first surface of the plate.

The display device may also include a fastening member configured to fasten the plate to the back portion of the supporting film.

The display device may also include a fastening member configured to fasten the frame, the back portion of the supporting film, and the plate to one another.

The back portion of the supporting film may include a portion positioned between the plate and the frame.

The display device may also include a fastening member configured to fasten the frame and the back portion of the supporting film to each other and a fastening member configured to fasten the plate and the frame to each other.

The display device may also include a buffer which is disposed between the plate and the back portion of the supporting film and is formed of a material having elasticity.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
  a display panel;
  a frame provided at a rear of the display panel;
  a film including a first portion attached to at least a portion of the display panel, a second portion positioned at a side of the frame and a third portion positioned at a rear of the frame;
  a plate fixed to the frame by a fastening member, the third portion of the film being fixed on a part of the plate; and
  a pressure plate pressing the third portion of the film at the rear of the frame,
  wherein the third portion of the film is positioned between the frame and the pressure plate.

2. The display device of claim 1, wherein the third portion of the film is attached on a rear surface of the plate.

3. The display device of claim 1, wherein the pressure plate includes at least one depression area.

4. The display device of claim 1, further comprising a back cover positioned on the rear of the frame and covering the pressure plate.

5. The display device of claim 1, wherein the plate is bent such that the third portion of the film is attached to the part of the plate.

6. The display device of claim 5, wherein a bent portion of the plate is fixed to the frame by the fastening member.

7. The display device of claim 1, wherein the pressure plate includes a first area, a second area that extends and bends from the first area and a third area that extends and bends from the second area, the third area being parallel to the first area.

8. The display device of claim 1, wherein the second and third portions of the film are extended from edges of the first portion of the film, the edges being opposite edges on the film.

9. The display device of claim 1, wherein the first portion of the film includes a transparent area to transmit light of the backlight device.

10. The display device of claim 1, wherein a light transmittance of at least one portion of the film is different from a light transmittance of at least another portion of the film.

11. The display device of claim 1, wherein the backlight device includes a plurality of light source modules and at least one optical sheet.

12. The display device of claim 11, wherein the plurality of light source modules are fixed to the frame and disposed separately from each other and connected electrically.

13. The display device of claim 1, further comprising a backlight device provided on the rear of the display panel, the backlight device comprising a plurality of light source modules provided along at least one side of the frame, and a light guide plate facing the plurality of light source modules.

14. The display device of claim 1, wherein the second portion of the film extends from the first portion and the third portion extends from the second portion, and
the second and third portions extend from at least one of side edge and top edge of the film.

15. The display device of claim 1, wherein the pressure plate and the frame are fixed by a fastening member passing through a first hole formed on the pressure plate and a second hole formed on the frame.

16. The display device of claim 1, wherein the pressure plate directly contacts with at least a portion of the third portion of the film.

17. The display device of claim 1, wherein the pressure plate is only positioned on the rear of the frame.

18. The display device of claim 1, wherein the pressure plate is in plural.

19. The display device of claim 1, wherein the pressure plate is in plural and each of the pressure plates are separately provided along an edge of the frame.

* * * * *